US011116156B2

(12) United States Patent
Volpe et al.

(10) Patent No.: US 11,116,156 B2
(45) Date of Patent: Sep. 14, 2021

(54) STACKED SHALLOW WATER CULTURE (SSWC) GROWING SYSTEMS, APPARATUS AND METHODS

(71) Applicant: Upward Enterprises Inc., Brooklyn, NY (US)

(72) Inventors: Dan Volpe, Brooklyn, NY (US); Nico Hawley-Weld, Brooklyn, NY (US); Matt Larosa, Brooklyn, NY (US); Rachael Klepner, Brooklyn, NY (US); Aftab Alam, Brooklyn, NY (US); Ben Silverman, Brooklyn, NY (US); Jason Green, Brooklyn, NY (US)

(73) Assignee: Upward Enterprises Inc., Brooklyn, NY (US)

( * ) Notice: Subject to any disclaimer, the term of this patent is extended or adjusted under 35 U.S.C. 154(b) by 0 days.

(21) Appl. No.: 15/689,035

(22) Filed: Aug. 29, 2017

(65) Prior Publication Data
US 2018/0042192 A1 Feb. 15, 2018

Related U.S. Application Data

(63) Continuation of application No. PCT/US2017/028999, filed on Apr. 21, 2017.
(Continued)

(51) Int. Cl.
*A01G 31/06* (2006.01)
*A01G 31/02* (2006.01)
(Continued)

(52) U.S. Cl.
CPC ............ *A01G 31/06* (2013.01); *A01G 7/045* (2013.01); *A01G 31/00* (2013.01); *A01G 31/02* (2013.01);
(Continued)

(58) Field of Classification Search
CPC ........ A01G 31/06; A01G 31/02; A01G 9/022; A01G 9/033; A01G 9/12; A01G 9/1423;
(Continued)

(56) References Cited

U.S. PATENT DOCUMENTS 2,917,867 A * 12/1959 Bailey ................... A01G 31/06
47/16
3,667,159 A 6/1972 Todd
(Continued)

FOREIGN PATENT DOCUMENTS

EP 2 540 156 A1 1/2013
JP 2005021065 A * 1/2005
(Continued)

OTHER PUBLICATIONS

Machine translation for JP 2015-213438 (Year: 2015).*
(Continued)

*Primary Examiner* — Son T Nguyen
(74) *Attorney, Agent, or Firm* — Smith Baluch LLP

(57) ABSTRACT

A vertically-stacked growing system includes vertical beams and horizontal shelves respectively arranged on different vertical levels, Each horizontal shelf has a length and a width, and includes horizontal structural supports coupled to at least some of the vertical beams, decking coupled to the horizontal structural supports, and multiple walls to form a shallow pond when the horizontal shelf contains a plant nutrient water culture, thereby constituting a growing layer of the growing system. The walls include two side walls along the length and two end walls along the width. Each horizontal shelf further includes a loading and/or unloading apparatus to facilitate loading and/or unloading of a plurality of rafts into and/or out of the shallow pond, via the two end walls, wherein respective rafts of the plurality of rafts include a plurality of germinated plants. At least a first
(Continued)

horizontal shelf further comprises a raft conveyance system to move at least a first raft of the plurality of rafts through a first shallow pond contained in the first horizontal shelf.

81 Claims, 30 Drawing Sheets

Related U.S. Application Data

(60) Provisional application No. 62/325,957, filed on Apr. 21, 2016.

(51) Int. Cl.
  A01G 31/00 (2018.01)
  A01G 31/04 (2006.01)
  A01G 7/04 (2006.01)
  A01K 63/04 (2006.01)

(52) U.S. Cl.
  CPC ........... *A01G 31/04* (2013.01); *A01G 31/042* (2013.01); *A01K 63/045* (2013.01); *Y02P 60/21* (2015.11)

(58) Field of Classification Search
  CPC .......... A01G 9/26; A01G 27/00; A01G 31/00; A01G 31/04; A01G 31/042
  See application file for complete search history.

(56) References Cited

U.S. PATENT DOCUMENTS

| | | | |
|---|---|---|---|
| 4,034,506 A | 7/1977 | Kasahara et al. | |
| 4,793,096 A | 12/1988 | Todd, Sr. | |
| 4,917,227 A * | 4/1990 | Matsuo | B61B 13/00 198/347.1 |
| 4,930,253 A | 6/1990 | Todd, Sr. | |
| 5,261,185 A | 11/1993 | Koide et al. | |
| 5,435,098 A | 7/1995 | Koide et al. | |
| 5,664,369 A | 9/1997 | Kertz | |
| 5,979,111 A | 11/1999 | Brown et al. | |
| 6,508,033 B2 | 1/2003 | Hessel et al. | |
| 8,145,330 B2 | 3/2012 | Emoto | |
| 8,151,517 B2 | 4/2012 | Emoto | |
| 8,234,814 B2 | 8/2012 | Kertz | |
| 8,533,992 B2 | 9/2013 | Harwood | |
| 8,731,734 B2 | 5/2014 | Hage | |
| 9,010,022 B2 | 4/2015 | Brusatore | |
| 9,032,664 B2 | 5/2015 | Yusibov et al. | |
| D741,217 S | 10/2015 | Kernahan | |
| D744,371 S | 12/2015 | Lucey et al. | |
| 9,220,206 B2 | 12/2015 | Walliser | |
| 9,241,453 B1 | 1/2016 | Martin et al. | |
| 9,565,812 B2 | 2/2017 | Wilson | |
| 9,603,316 B1 | 3/2017 | Mansey et al. | |
| 9,609,811 B2 | 4/2017 | Saumweber et al. | |
| 9,668,434 B2 | 6/2017 | Kernahan | |
| 9,693,512 B2 | 7/2017 | Chen et al. | |
| 9,730,397 B2 | 8/2017 | Houweling et al. | |
| 9,986,697 B1 * | 6/2018 | Gurin | A01G 31/06 |
| 2006/0053691 A1 | 3/2006 | Harwood et al. | |
| 2010/0126063 A1 | 5/2010 | Emoto | |
| 2011/0252705 A1 | 10/2011 | Van Gemert | |
| 2012/0023821 A1 * | 2/2012 | Kao | A01G 31/02 47/62 R |
| 2012/0060416 A1 * | 3/2012 | Brusatore | A01G 31/06 47/62 A |
| 2014/0017043 A1 | 1/2014 | Hirai | |
| 2014/0115958 A1 * | 5/2014 | Helene | A01G 31/06 47/17 |
| 2014/0115960 A1 | 5/2014 | Kantola et al. | |
| 2014/0155958 A1 | 6/2014 | Dong et al. | |
| 2014/0318012 A1 | 10/2014 | Fujiyama | |
| 2014/0325908 A1 | 11/2014 | Farris | |
| 2014/0325909 A1 | 11/2014 | Farris | |
| 2014/0352211 A1 | 12/2014 | Liotta | |
| 2014/0366443 A1 | 12/2014 | Brusatore | |
| 2015/0000192 A1 | 1/2015 | Jönsson | |
| 2015/0005964 A1 | 1/2015 | Liotta | |
| 2015/0113875 A1 | 4/2015 | Liotta | |
| 2015/0150202 A1 | 6/2015 | Hessel et al. | |
| 2015/0237810 A1 | 8/2015 | Van Gemert et al. | |
| 2015/0282437 A1 | 10/2015 | Ohara et al. | |
| 2015/0342133 A1 | 12/2015 | Nakajima et al. | |
| 2016/0014977 A1 | 1/2016 | Esaki et al. | |
| 2016/0021836 A1 | 1/2016 | Kernahan | |
| 2016/0028442 A1 | 1/2016 | Kernahan | |
| 2016/0128289 A1 | 5/2016 | Wong et al. | |
| 2016/0157447 A1 | 6/2016 | Hanzawa et al. | |
| 2016/0235018 A1 | 8/2016 | Motoyama et al. | |
| 2016/0242372 A1 | 8/2016 | Wong et al. | |
| 2016/0255781 A1 | 9/2016 | Chen et al. | |
| 2016/0295820 A1 | 10/2016 | Aykroyd et al. | |
| 2016/0338272 A1 | 11/2016 | Hage et al. | |
| 2016/0345518 A1 * | 12/2016 | Collier | A01G 9/143 |
| 2016/0353672 A1 | 12/2016 | Hoffman | |
| 2016/0366838 A1 | 12/2016 | Hanzawa et al. | |
| 2016/0366845 A1 | 12/2016 | Visser et al. | |
| 2017/0027110 A1 | 2/2017 | Ito et al. | |
| 2017/0027112 A1 | 2/2017 | Vail et al. | |
| 2017/0049064 A1 | 2/2017 | Griffin | |
| 2017/0051924 A1 | 2/2017 | Saumweber et al. | |
| 2017/0055460 A1 | 3/2017 | Brusatore | |
| 2017/0127627 A1 | 5/2017 | Miyabe et al. | |
| 2017/0127628 A1 | 5/2017 | Miyabe et al. | |
| 2017/0127629 A1 | 5/2017 | Miyabe et al. | |
| 2017/0188531 A1 | 7/2017 | Daniels | |
| 2017/0196176 A1 | 7/2017 | Griffin | |
| 2018/0007850 A1 * | 1/2018 | Dufresne | A01G 31/06 |
| 2018/0235156 A1 * | 8/2018 | Blair | A01G 9/18 |

FOREIGN PATENT DOCUMENTS

| | | | |
|---|---|---|---|
| JP | 2006-262750 A | | 10/2006 |
| JP | 2008154512 A | * | 7/2008 |
| JP | 2008271886 A | * | 11/2008 |
| JP | 2009-011232 A | | 1/2009 |
| JP | 2009-106208 A | | 5/2009 |
| JP | 2012080783 A | * | 4/2012 |
| JP | 2012120455 A | * | 6/2012 |
| JP | 5095348 B2 | | 12/2012 |
| JP | 2013051942 A | * | 3/2013 |
| JP | 2013-179906 A | | 9/2013 |
| JP | 5290241 B2 | | 9/2013 |
| JP | 2014-064522 A | | 4/2014 |
| JP | 2014-168420 A | | 9/2014 |
| JP | 2014-198003 A | | 10/2014 |
| JP | 2015-035974 A | | 2/2015 |
| JP | 2015037383 A | * | 2/2015 |
| JP | 5713758 B2 | | 5/2015 |
| JP | 2015136344 A | * | 7/2015 |
| JP | 5761821 B2 | | 8/2015 |
| JP | 2015-211658 A | | 11/2015 |
| JP | 2015-213438 A | | 12/2015 |
| JP | 2016-013107 A | | 1/2016 |
| JP | 2017-212939 A | | 6/2016 |
| JP | 5994162 B1 | | 9/2016 |
| JP | 5994163 B1 | | 9/2016 |
| JP | 2016-202110 A | | 12/2016 |
| JP | 2017-018149 A | | 1/2017 |
| JP | 6084827 A2 | | 2/2017 |
| JP | 2017-042055 A | | 3/2017 |
| JP | 6106315 B1 | | 3/2017 |
| KR | 10-2016-0014876 A | | 2/2016 |
| WO | WO 83/018888 A1 | | 6/1983 |
| WO | WO 2007/058062 A1 | | 5/2007 |
| WO | WO 2009/066991 A2 | | 5/2009 |
| WO | WO 2011/013892 A2 | | 2/2011 |
| WO | WO 2011/080819 A1 | | 7/2011 |
| WO | WO 2011/118550 A1 | | 9/2011 |
| WO | WO 2012/005121 A1 | | 1/2012 |
| WO | WO 2012/067499 A1 | | 5/2012 |
| WO | WO 2013/018460 A1 | | 2/2013 |

(56) References Cited

FOREIGN PATENT DOCUMENTS

| | | |
|---|---|---|
| WO | WO 2013/072990 A1 | 5/2013 |
| WO | WO 2014/148654 A1 | 9/2014 |
| WO | WO 2014/192331 A1 | 12/2014 |
| WO | WO 2015/045045 A1 | 4/2015 |
| WO | WO 2015/082924 A1 | 6/2015 |
| WO | WO 2015/107697 A1 | 7/2015 |
| WO | WO 2016/138075 A1 | 9/2016 |
| WO | WO 2016/166311 A1 | 10/2016 |
| WO | WO 2016/181699 A1 | 11/2016 |
| WO | WO 2016/207900 A1 | 12/2016 |
| WO | WO 2017/012644 A1 | 1/2017 |
| WO | WO 2017/024079 A2 | 2/2017 |
| WO | WO 2017/024353 A1 | 2/2017 |
| WO | WO 2017/041757 A1 | 3/2017 |
| WO | WO 2017/042891 A1 | 3/2017 |
| WO | WO 2017/047186 A1 | 3/2017 |
| WO | WO 2017/062918 A1 | 4/2017 |
| WO | WO 2017/098776 A1 | 6/2017 |

OTHER PUBLICATIONS

Jensen, M. H., "Deep Flow Hydroponics—Past, Present and Future," Controlled Environment Agriculture Center, University of Arizona, Tucson, AZ, 2002, 7 pages.
http://web.archive.org/web/20150727185720/http:/agrivolution.co/v014/index.html, 2014, 1 page.
https://beta.theglobeandmail.com/report-on-business/small-business/sb-growth/the-challenge/in-pictures-fish-and-greens-help-each-other-thrive-in-urban-aquaponics-farm/article30219840/, Jun. 1, 2016, 8 pages.
http://seedstock.com/2015/03/02/toronto-aquaponics-startup-works-toward-a-new-normal-in-local-food-production/, Mar. 2, 2015, 2 pages.
http://ediblewow.ediblecommunities.com/shop/artesian-farms-blossoms-brightmoor, Mar. 1, 2016, 2 pages.
http://www.njbiz.com/article/20170501/njbiz01/170509975/green-for-greens-bowery-though-a-newcomer-to-indoor-vertical-farming-has-won-over-some-bigname-backers-for-its-kearny-operation, May 1, 2017, 3 pages.
http://www.asa-agency.com/en/-/galleries/asa-imagenes/asa-fotografos/steinmetz-george/medioambiente/ganaderia-extrema-alimentando-al-planeta/-/medias/457fa4eb-7079-4596-bf45-795cdd04e1e5-left-over-aeroponic-salad-is-scraped-from-fleece-like-fabric-b, 2012, 1 page.
http://www.publicnewsservice.org/2014-07-24/rural-farming/vertical-farming-taking-root-in-pennsylvania/a40740-1, Jul. 24, 2014, 2 pages.
http://web.archive.org/web/20100616042617/http:/www.hydronov.com/2010/English/E-02-003.htm, Jun. 6, 2010, 1 page.
http://web.archive.org/web/20140908181950/http://www.ecogrow.ca/intro.html, Sep. 8, 2014, 2 pages.
http://hortamericas.com/horti-facts-case-studies/local-by-atta-rebuilds-vertical-farm-with-ge-leds-after-devastating-fire/, Aug. 16, 2017, 3 pages.
http://web.archive.org/web/20160320022344/https:/www.logiqs.nl/en/greencube, Mar. 20, 2016, 2 pages.
https://technical.ly/philly/2016/02/03/metropolis-farms-south-philly-vertical-farming/, Feb. 3, 2016, 4 pages.
https://www.facebook.com/SCATIL/photos/a.476702992479905.1073741827.476577912492413/476700769146794/?type=3&theater, Mar. 20, 2015, 1 page.
http://www.businessinsider.com/spreads-robot-farm-will-open-soon-2016-1, Jan. 28, 2016, 3 pages.
http://www.hortidaily.com/article/24546/Belgium-Urban-Crops-opens-largest-automated-plant-factory-in-Europe, Feb. 26, 2016, 3 pages.
http://www.hortidaily.com/article/26188/Urban-Crops-wins-at-Gault-&-Millau%E2%80%99s-Culinary-Innovators-Awards, May 13, 2016, 3 pages.
http://web.archive.org/web/20170610231947/https:/urbancropsolutions.com/farm-systems/plant-factory/, Feb. 26, 2016, 3 pages.
http://minnesotaconnected.com/lifestyle/food/urban-organics-providing-local-year-round-produce_209265/, Apr. 9, 2014, 3 pages.
http://web.archive.org/web/20140628155802/http:/www.verticalfarms.com.au/sites/default/files/XA-Brochure.pdf, Jan. 26, 2014, 4 pages.
https://www.buffalorising.com/2015/03/buffalos-vertical-fresh-farms/, Mar. 28, 2015, 4 pages.
https://www.theverge.com/2015/2/26/8112889/vertical-farm-wyoming-hydroponics-grow-food, Feb. 26, 2015, 3 pages.
https://www.theverge.com/2016/6/15/11937882/verticulture-aquaponic-farm-brooklyn-fish-poop-fertilizer, Jun. 15, 2015, 3 pages.
https://www.facebook.com/verticulturefarms/photos/a.658890117548608.1073741826.178954308875527/658890134215273/?type=3&theater, Mar. 27, 2015, 1 page.
http://web.archive.org/web/20160307005136/http:/www.visconhydroponics.eu:80/production-on-deep-water/, Mar. 7, 2016, 1 page.
https://beta.theglobeandmail.com/report-on-business/small-business/sb-growth/agriculture-tech-companies-look-to-the-future-offarming/article31443097/, Aug. 22, 2016, 3 pages.
http://web.archive.org/web/20141203041922/http:/www.plantplant.jp/en/solution/index.html, Dec. 3, 2014, 1 page.
http://www.kingpengintl.com/news/the-minister-of-industry-of-thailand-visit-kin-3276895.html, Dec. 9, 2016, 2 pages.
http://en.people.cn/90001/90776/90882/7115437.html, Aug. 24, 2010, 2 pages.
https://www.cnet.com/pictures/the-future-of-farming-local-organic-and-high-tech/, May 27, 2017, 39 pages.
https://www.slideshare.net/anis_bedda/gus-van-der-feltz-phlips-city-farming, Dec. 16, 2014, 14 pages.
https://inhabitat.com/philips-uses-leds-to-bolster-urban-farming/, Mar. 24, 2015, 12 pages.
http://web.archive.org/web/20151116091809/http:/growup.org.uk:80/all-posts/photos-and-videos/gallery/unit-84/hydroponics/, Nov. 15, 2015, 3 pages.
http://web.archive.org/web/20160130151853/https:/indoorharvest.com/products/ifair-indoor-farm-air, Jan. 30, 2016, 5 pages.
https://www.japantimes.co.jp/news/2014/08/11/business/tech/future-appears-bright-indoor-veggie-farms/, Aug. 11, 2014, 2 pages.
http://www.dailymail.co.uk/sciencetech/article-2831841/Farming-future-Toshiba-s-clean-factory-farm-three-million-bags-lettuce-grown-without-sunlight-soil.html, Nov. 12, 2014, 56 pages.
https://inhabitat.com/verticrop-processes-10000-plants-every-3-days-using-vertical-hydroponic-farming/, Jun. 13, 2014, 10 pages.
International Search Report and Written Opinion issued by the International Searching Authority in regards to International Application No. PCT/US2017/028999, dated Jul. 17, 2017, 16 pages.
https://www.youtube.com/watch?v=gEfyPlyJfKA, published Dec. 20, 2017, 2 pages.
https://www.youtube.com/watch?v=wHQqtL3g-pE&t=9s, published May 9, 2017.
https://www.youtube.com/watch?v=spTmJ7rzUCA, published Jun. 12, 2017.
https://www.youtube.com/watch?v=9OgyX8AWeQY, published Nov. 9, 2015.

* cited by examiner

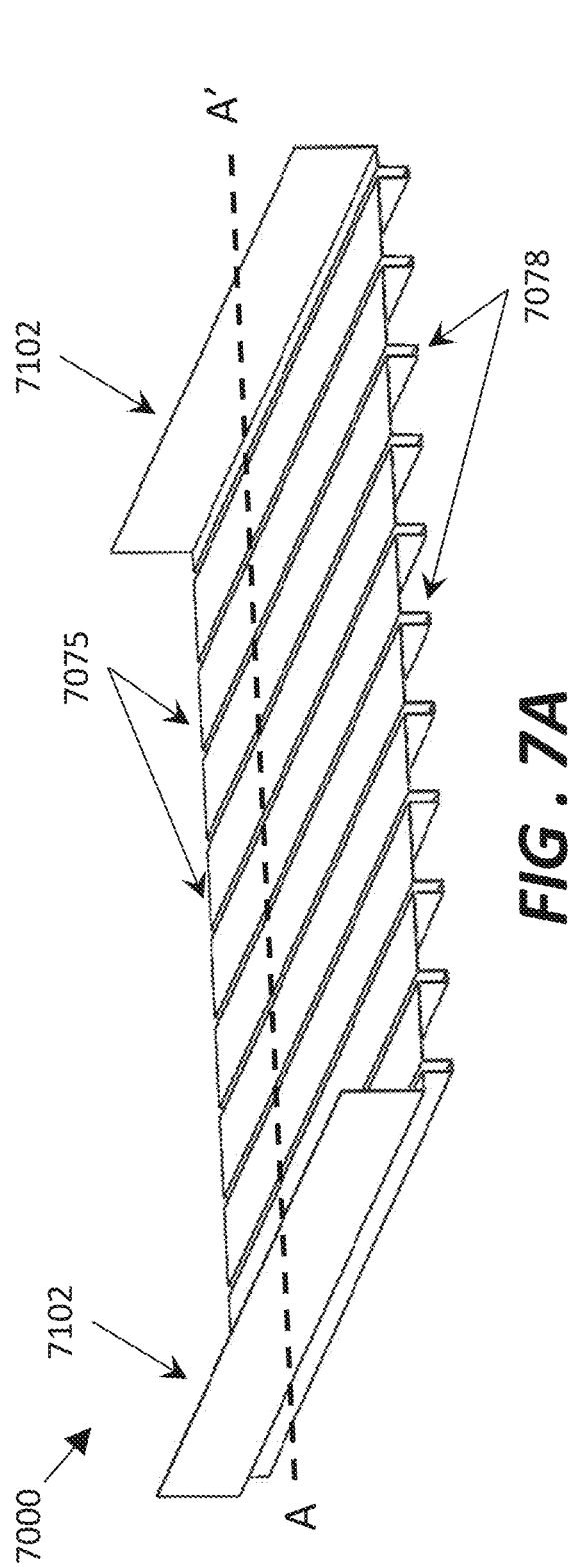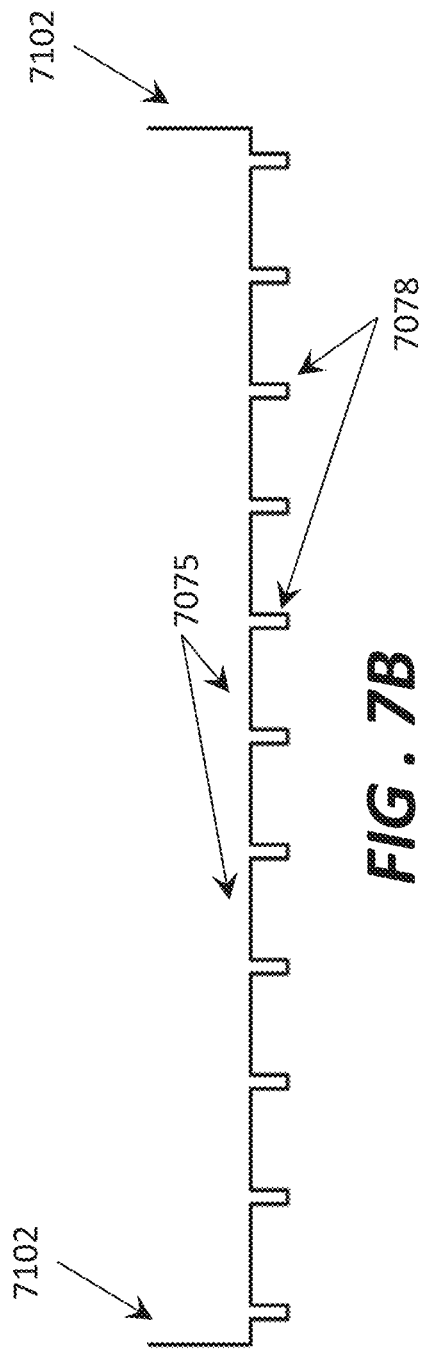
FIG. 7A
FIG. 7B

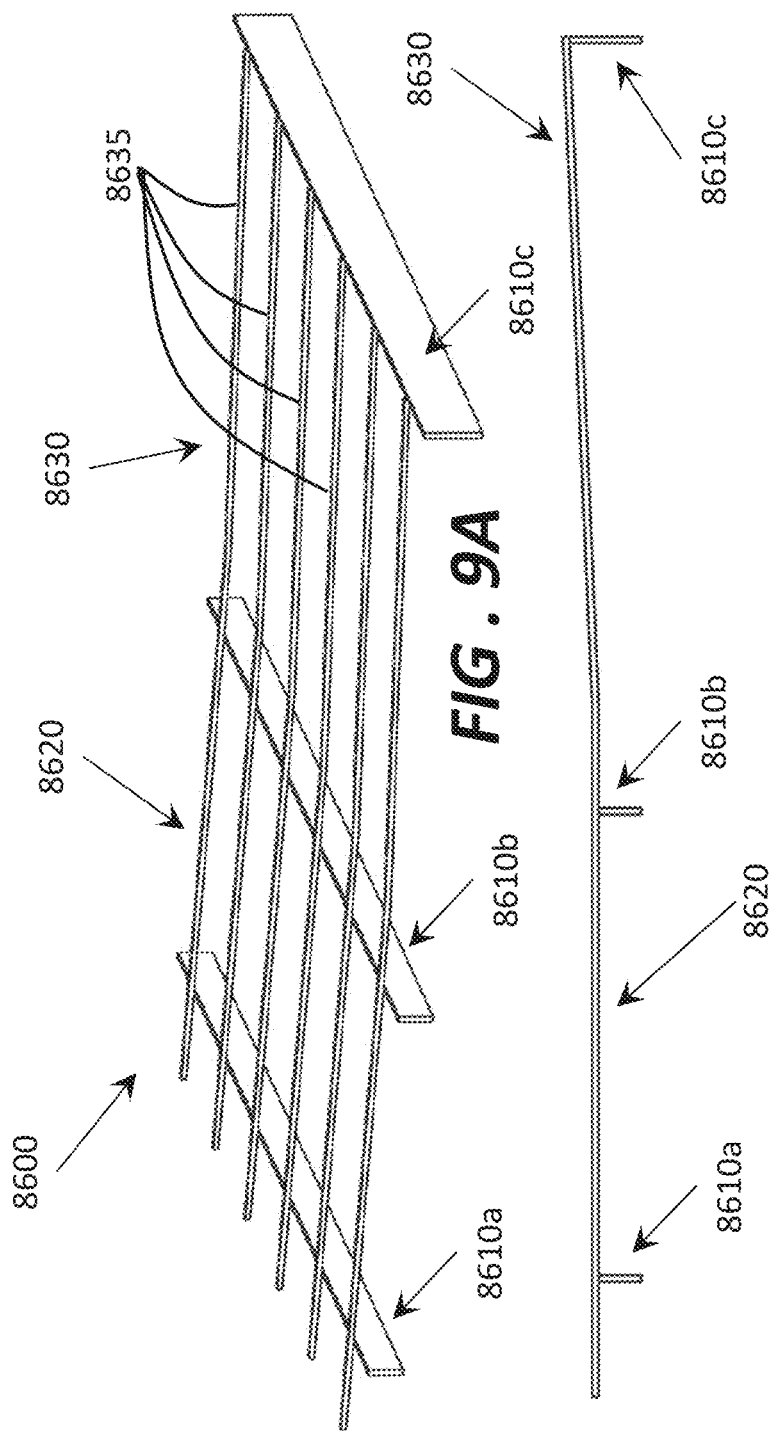

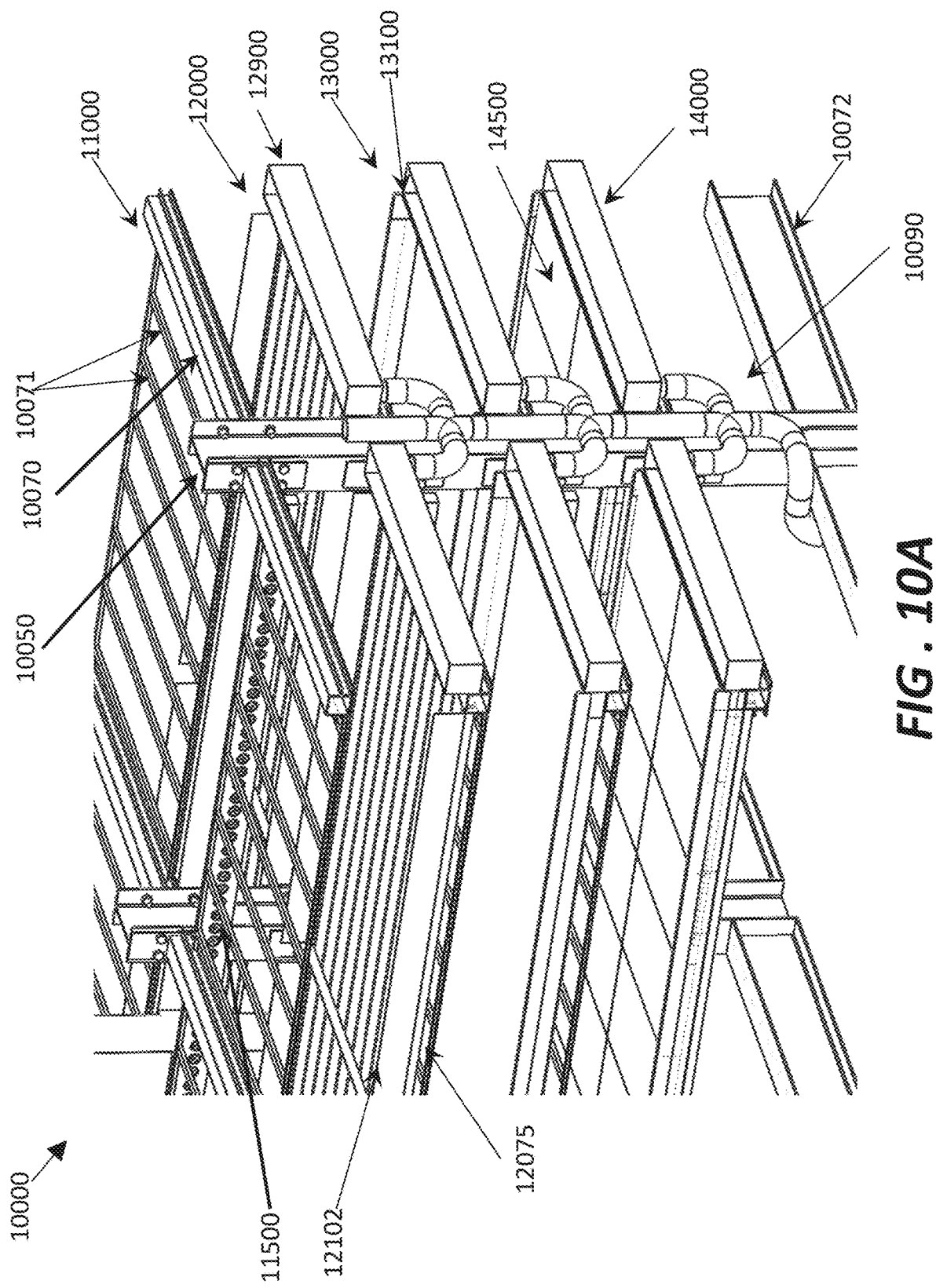

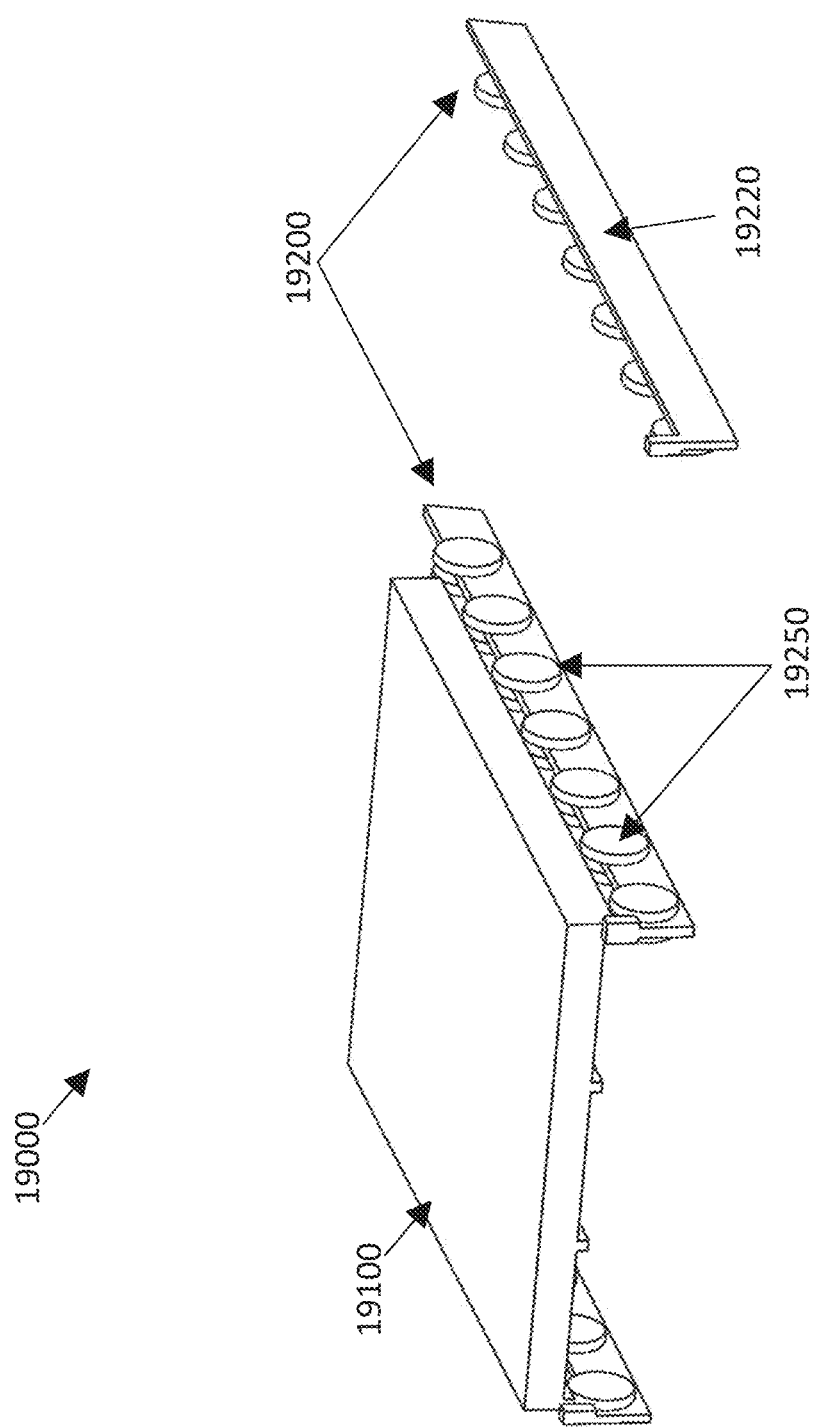

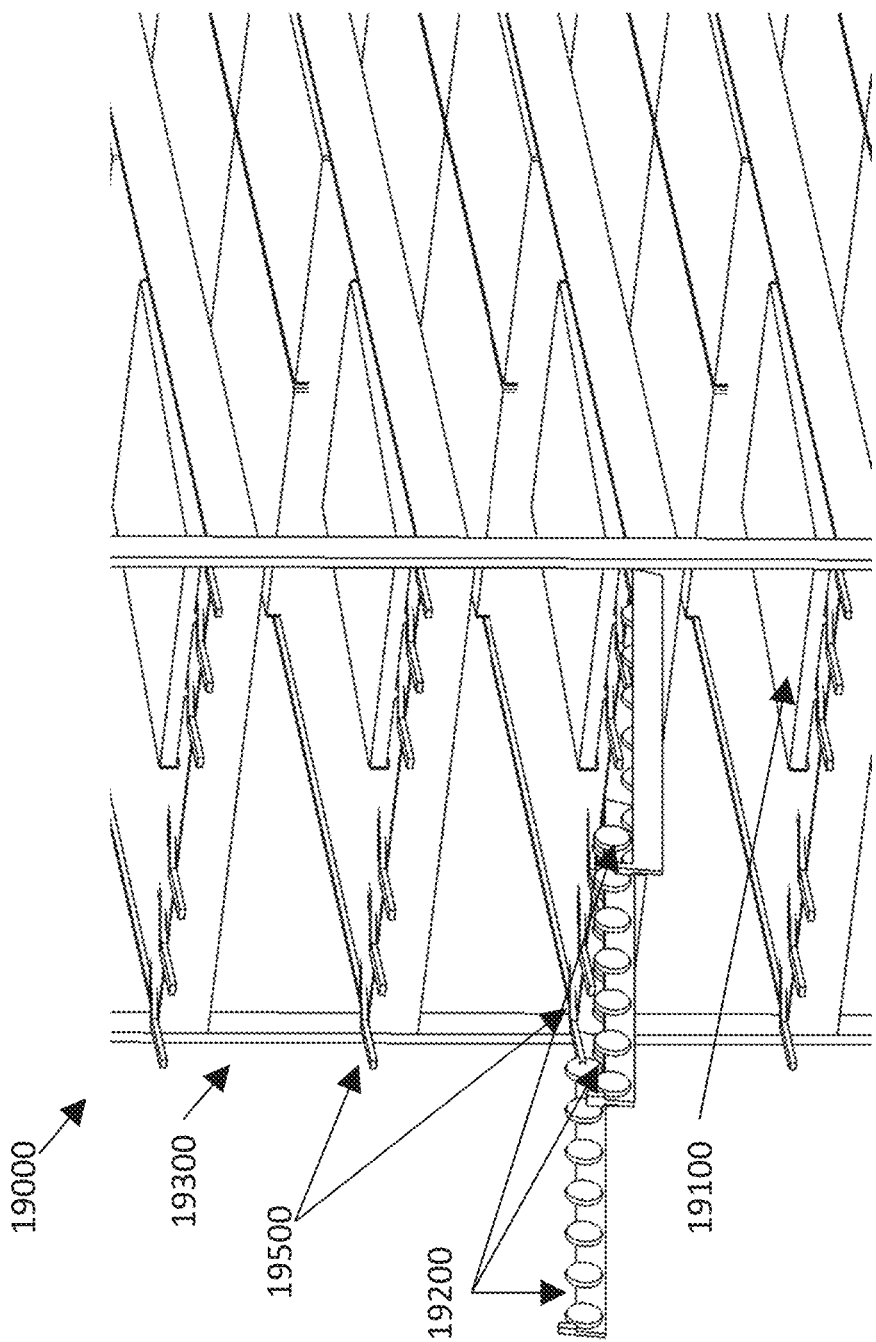

STACKED SHALLOW WATER CULTURE (SSWC) GROWING SYSTEMS, APPARATUS AND METHODS

CROSS-REFERENCES TO RELATED APPLICATIONS

This application is a continuation application of International Application No. PCT/US2017/028999, filed on Apr. 21, 2017, entitled "STACKED SHALLOW WATER CULTURE (SSWC) GROWING SYSTEMS, APPARATUS AND METHODS," which claims priority to U.S. application Ser. No. 62/325,957, filed Apr. 21, 2016, entitled "APPARATUSES, METHODS AND SYSTEMS FOR STACKED, SHALLOW WATER CULTURE CONVEYANCE, INTEGRATED FERTIGATION, AND MATERIAL HANDLING." Each of the foregoing references is hereby incorporated herein by reference in its entirety.

BACKGROUND

Agriculture is unique among manufacturing arts in that the finished product, being at one stage a living organism, can self-assemble from raw materials under the right growing conditions. Accordingly, the agricultural arts in general focus on delivering these right growing conditions, as well as storage, handling, and conveyance (collectively referred to as "material handling") of the organism (the "work in process" or "crop" and any associated containers or materials across time and space in the production chain.

For indoor agriculture, efficient material handling is desired for several reasons. First, efficient material handling can increase space efficiency, which is usually the major justification of the cost of an enclosing structure, such as a greenhouse, warehouse, or other container. Second, production throughput velocities are often extremely high, due to optimized growth and lower cycle times characteristic of the younger, higher value, non-commodity crops suitable for indoor production. Third, efficient material handling can clear from the growing area agricultural residues after each crop cycle so as to rapidly create space for the next crop and also prevent the propagation of disease. Both result in a higher profit margin for indoor agriculture. Fourth, a substantial number of unit operations are often involved in indoor farming, such as seeding, transplanting, harvesting, washing, drying, mixing, and packaging. Each of these unit operation is typically implemented onsite, especially when the finished product is a consumer packaged product as opposed to a commodity that is sold to processors. Automation of these operations can reduce the cost of labor. However, even if each unit operation is fully automated, the storage, handling, and conveying of material between unit operations still comprises about 80% of the remaining labor.

SUMMARY

Embodiments of the present disclosure relate to controlled environment and/or indoor agriculture. More particularly, the present disclosure relates to storage, handling, and conveyance systems (also known as "material handling systems") utilized in the hydroponic or aquaponics production of organisms such as plants and fungi. In one example, a vertically-stacked growing system includes a plurality of vertical beams and a plurality of horizontal shelves mechanically coupled to the plurality of vertical beams and respectively arranged on different vertical levels of the growing system. Each horizontal shelf of the plurality of horizontal shelves has a length and a width. Each horizontal shelf includes a plurality of horizontal structural supports coupled to at least some of the plurality of vertical beams and decking coupled to the plurality of horizontal structural supports. Each horizontal shelf also includes a plurality of walls to form a shallow pond when the horizontal shelf contains a plant nutrient water culture, thereby constituting a growing layer of the growing system. The plurality of walls includes two side walls along the length of the horizontal shelf and two end walls along the width of the horizontal shelf. Each horizontal shelf further includes at least one ramp, disposed proximate to at least one end wall of the two end walls and above the decking, to facilitate loading and/or unloading of a plurality of rafts into and/or out of the shallow pond when the horizontal shelf contains the plant nutrient water culture. Respective rafts of the plurality of rafts include a plurality of germinated plants.

In another example, a vertically-stacked growing system includes a plurality of vertical beams and a plurality of horizontal shelves mechanically coupled to the plurality of vertical beams and respectively arranged on different vertical levels of the growing system. Each horizontal shelf of the plurality of horizontal shelves has a length and a width and includes a plurality of horizontal structural supports coupled to at least some of the plurality of vertical beams. Each horizontal shelf also includes decking, coupled to the plurality of horizontal structural supports, and a plurality of walls to form a shallow pond when the horizontal shelf contains a plant nutrient water culture, thereby constituting a growing layer of the growing system. The plurality of walls includes two side walls along the length of the horizontal shelf; and two end walls along the width of the horizontal shelf. Each horizontal shelf further includes at least one ramp, disposed proximate to at least one end wall of the two end walls and above the decking, to facilitate loading and/or unloading of a plurality of rafts into and/or out of the shallow pond when the horizontal shelf contains the plant nutrient water culture. Respective rafts of the plurality of rafts include a plurality of germinated plants. The vertically-stacked growing system also includes a mechanical ventilation system having a plurality of fans or duct openings disposed along the length of each horizontal shelf. At least a first horizontal shelf of the plurality of horizontal shelves further includes a raft conveyance system to move at least a first raft of the plurality of rafts through a first shallow pond contained in the first horizontal shelf when the first shallow pond and the first raft are present in the growing system. The raft conveyance system includes a mechanical pusher to move the first raft through the first shallow pond. At least some of the horizontal shelves further includes a plurality of lights embedded between at least some of the plurality of horizontal structural supports In yet another example, a vertically-stacked growing system includes a plurality of vertical beams and a plurality of horizontal shelves mechanically coupled to the plurality of vertical beams and respectively arranged on different vertical levels of the growing system. Each horizontal shelf of the plurality of horizontal shelves has a length and a width and includes a plurality of horizontal structural supports coupled to at least some of the plurality of vertical beams and decking, coupled to the plurality of horizontal structural supports. Each horizontal shelf also includes a plurality of walls to form a shallow pond when the horizontal shelf contains a plant nutrient water culture, thereby constituting a growing layer of the growing system. The vertically-stacked growing system also includes a mechanical ventilation system having a plurality of fans or duct openings disposed along the length of each horizontal shelf and a plurality of lights embedded between at least some of the plurality of horizontal structural supports of each horizontal shelf.

In yet another example, a vertically-stacked growing system includes a plurality of vertical beams and a plurality of horizontal shelves mechanically coupled to the plurality of vertical beams and respectively arranged on different vertical levels of the growing system. Each horizontal shelf of the plurality of horizontal shelves has a length and a width and includes a plurality of horizontal structural supports coupled to at least some of the plurality of vertical beams. Each horizontal shelf also includes decking coupled to the plurality of horizontal structural supports and a plurality of walls to form a shallow pond when the horizontal shelf contains a plant nutrient water culture, thereby constituting a growing layer of the growing system. The plurality of walls includes two side walls along the length of the horizontal shelf and two end walls along the width of the horizontal shelf. Each horizontal shelf also includes a loading and/or unloading apparatus to facilitate loading and/or unloading of a plurality of rafts into and/or out of the shallow pond when the horizontal shelf contains the plant nutrient water culture. Respective rafts of the plurality of rafts include a plurality of germinated plants. At least a first horizontal shelf of the plurality of horizontal shelves further includes a raft conveyance system to move at least a first raft of the plurality of rafts through a first shallow pond contained in the first horizontal shelf when the first shallow pond and the first raft are present in the growing system. The raft conveyance system comprises a mechanical pusher to move the first raft through the first shallow pond.

In yet another example, a vertically-stacked growing system includes a plurality of vertical beams and a plurality of horizontal shelves mechanically coupled to the plurality of vertical beams and respectively arranged on different vertical levels of the growing system. Each horizontal shelf of the plurality of horizontal shelves having a length and a width and includes a plurality of horizontal structural supports coupled to at least some of the plurality of vertical beams. Each horizontal shelf also includes decking coupled to the plurality of horizontal structural supports and a plurality of walls to form a shallow pond when the horizontal shelf contains a plant nutrient water culture, thereby constituting a growing layer of the growing system. The plurality of walls includes two side walls along the length of the horizontal shelf and two end walls along the width of the horizontal shelf. For at least a first horizontal shelf of the plurality of horizontal shelves, one end wall of the two end walls constitutes a weir for a first shallow pond when the first horizontal shelf contains the plant nutrient water culture. The first horizontal shelf further comprises a catchment area proximate to the weir to collect and divert the plant nutrient water culture flowing freely over a top of the weir.

In yet another example, a vertically-stacked growing system includes a plurality of vertical beams and a plurality of horizontal shelves mechanically coupled to the plurality of vertical beams and respectively arranged on different vertical levels of the growing system. Each horizontal shelf of the plurality of horizontal shelves has a length and a width and includes a plurality of horizontal structural supports coupled to at least some of the plurality of vertical beams and decking, coupled to the plurality of horizontal structural supports. Each horizontal shelf also includes a plurality of walls to form a shallow pond when the horizontal shelf contains a plant nutrient water culture, thereby constituting a growing layer of the growing system. The plurality of walls includes two side walls along the length of the horizontal shelf and two end walls along the width of the horizontal shelf. Each horizontal shelf also includes at least one robotic arm, disposed proximate to at least one end wall of the two end walls and above the decking, to facilitate loading and/or unloading of a plurality of rafts into and/or out of the shallow pond when the horizontal shelf contains the plant nutrient water culture. Respective rafts of the plurality of rafts include a plurality of germinated plants.

In yet another example, a method for handling a plurality of rafts of germinated plants in a vertically-stacked growing system is disclosed. The vertically-stacked growing system includes a plurality of elongated shallow ponds of plant nutrient water culture respectively arranged on different vertical levels of the vertically-stacked growing system. At least a first elongated shallow pond of the plurality of elongated shallow ponds has a length and a width smaller than the length. The first elongated shallow pond also includes two side walls along the length of the elongated shallow pond and two end walls along the width of the elongated shallow pond. The first shallow pond further includes at least one ramp, disposed proximate to at least one end wall of the two end walls, to facilitate loading and/or unloading of the plurality of rafts into and/or out of the first elongated shallow pond. The method includes loading and/or unloading the plurality of rafts into and/or out of at least the first elongated shallow pond, via the at least one ramp, from the two end walls of the first elongated shallow pond and not the two side walls of the first elongated shallow pond.

In yet another example, a method for handling a plurality of rafts of germinated plants in a vertically-stacked growing system is disclosed. The vertically-stacked growing system includes a plurality of elongated shallow ponds of plant nutrient water culture respectively arranged on different vertical levels of the vertically-stacked growing system. At least a first elongated shallow pond of the plurality of elongated shallow ponds has a length and a width smaller than the length. The first elongated shallow pond includes two side walls along the length of the elongated shallow pond, two end walls along the width of the elongated shallow pond, and at least one ramp, disposed proximate to at least one end wall of the two end walls, to facilitate loading and/or unloading of the plurality of rafts into and/or out of the elongated shallow pond. The method includes A) loading and/or unloading the plurality of rafts into and/or out of at least the first elongated shallow pond, via the at least one ramp, from the two end walls of the first elongated shallow pond and not the two side walls of the first elongated shallow pond. The method also includes B) moving at least a first raft of the plurality of rafts through at least the first elongated shallow pond of the plurality of elongated shallow ponds. Step B) also includes using a mechanical pusher to move at least the first raft through the first elongated shallow pond. The method further includes C) ventilating the germinated plants in the respective rafts of the plurality of rafts in at least the first elongated shallow pond via a plurality of fans or duct openings disposed along the length of the first elongated shallow pond.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appealing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 7A and 7B show a perspective view and a side view, respectively, of a decking that can be used in a vertically-stacked growing system.

FIGS. 9A and 9B show a perspective view and a side view, respectively, of a ramp that can be used in a vertically-stacked growing system.

FIGS. 10A and 10B show a schematic of a vertically-stacked growing system including horizontal ventilation to achieve desired temperature, humidity, and $CO_2$ levels between stacked layers.

FIGS. 19A and 19B illustrate schematic of a vertical conveyor attached to the growing system to load rafts into growing shelves and/or to collect rafts from the growing shelves and rafts onto a growing shelf including shallow water ponds.

DETAILED DESCRIPTION

Overview

Figure 1:
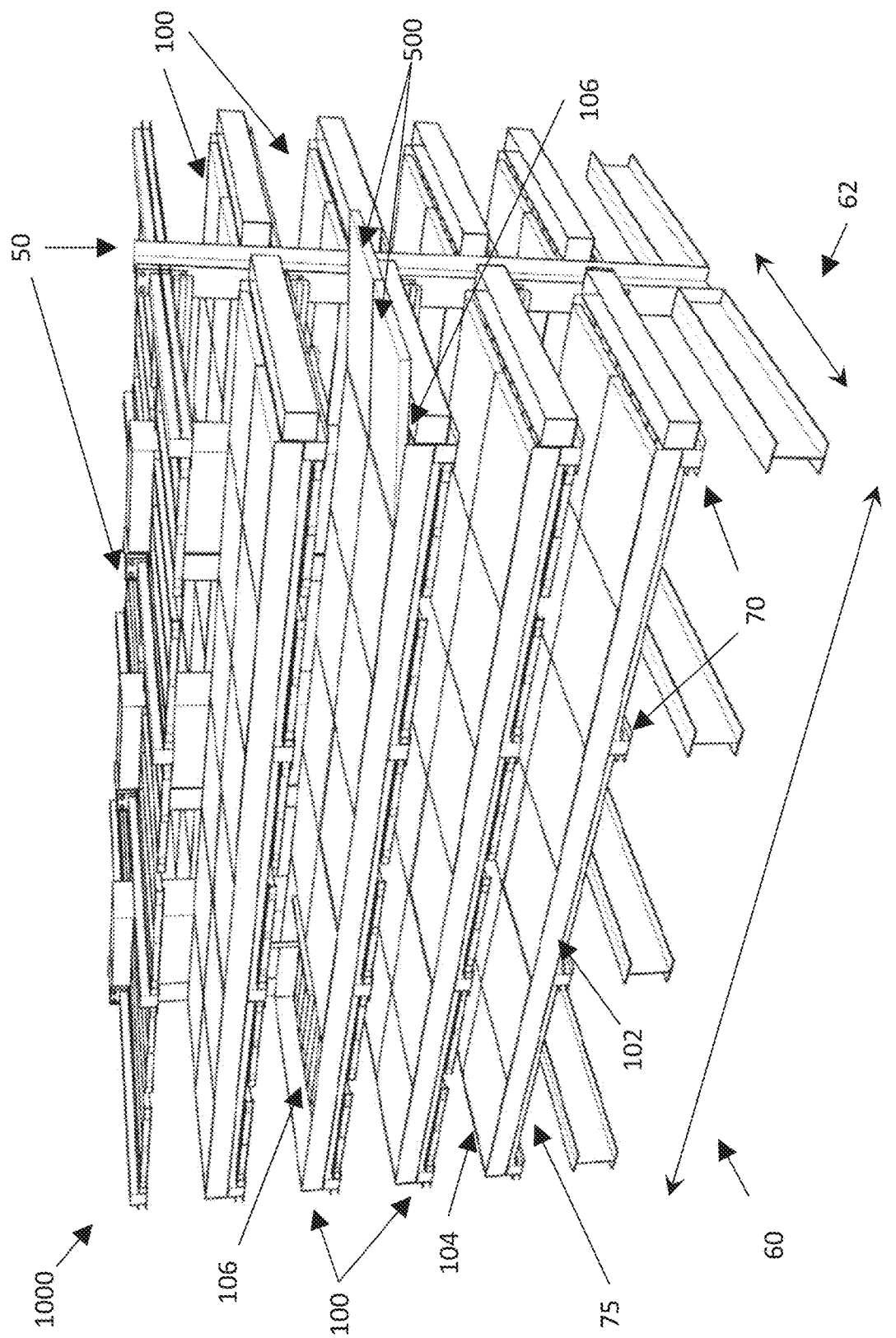
FIG. 1 shows a schematic of a vertically-stacked growing system using shallow water ponds for conveyance of plants.

Material handing in indoor agriculture can benefit from several techniques. In one example, material handling can use vertical stacking, in which plants are grown in vertically stacked layers. Each stacked layer can be either partially or fully illuminated by artificially controlled light. The vertical layers are fertigated (i.e., fertilized and irrigated) to provide nutrients and water to the roots of the plants. Advantages of vertical stacking include efficient use of three-dimensional space, the ability to confer lighting and environmental conditions differentially and precisely, and the ability to employ different crop cycle lengths for each layer, thereby optimizing both nutrient production and yields. However, it might be difficult to visually inspect plants and maintain higher and lower than waist height growing areas in vertical stacking. In addition, conveying plants to and from the vertically stacked layers may also pose a challenge in large-scale indoor farming. It may also be difficult to ventilate the tightly confined air volume above each growing layer.

In another example, material handling can use a flow-through approach. Typically, the time duration for the growing stage is about one or two orders of magnitude longer than the time for pre- and post-grow processing stages in crop production. Therefore, there is usually an acute need for storing and conveying the crop, or work in process, during the growing stage, in a manner that is efficient both in time and space. Because production is generally strictly a feed-forward process (i.e. harvesting always follows seeding), growing systems can be designed such that the work in process "flows through" the growing area, both conceptually and physically, on its way from an earlier to a later stage processing area. For crops with long cycles (e.g., longer than 5 weeks), it can be economical to use physical agents such as human workers or powered vehicles to convey the crop across the growing area, typically in batches. For crops with short cycles, it can be more advantageous to autonomously convey the crop across the growing area, without the means of physical agents shuttling back and forth.

Examples of the flow-through approach include, for example, a mobile gully system, in which the entire channels (i.e., "gullies") of crops are moved by robotic conveyors spanning the entire length and width of a growing facility. Alternatively or additionally, the flow-through approach can use a powered flow rack, in which trays ("flats") containing plants are mechanically moved along rails and irrigated from above or below. A deep flow system can also be used for implementing the flow-through approach. In this case, plants are grown on floating rafts placed atop a long rectangular pond, allowing the water to act as a near frictionless conveyor belt for the rafts to move from one end of the pond to the other.

Deep flow systems eliminate rails, belts, and rollers, and therefore can significantly reduce the cost of conveyance. Typically, deep flow ponds are 12 to 16 inches deep, 12 to 30 feet wide, and up to several hundreds of feet long. The ponds are used not just to hold the rafts, but also for irrigation and nutrient delivery. To accomplish this, plants are typically seeded within media filled slots, holes, or containers built into the raft. Alternatively, plants can also be seeded into the structural matrix of porous rafts.

In deep flow systems, there is usually a substantial mass of water within the growing facility. A larger mass water can make the deep flow system less vulnerable to fluctuations in ambient temperature, nutrient level, dissolved oxygen level, water hardness, and pH value. In other words, the mass of water can function as a buffer against unwanted environmental fluctuations.

However, deep flow systems also have limitations. For example, the depth of the water increases the overall height of each shelf, thereby limiting the number of deep flow systems (or deep flow layers) that can be stacked within a given space. Additionally, the weight of the water requires larger structural supports, which can further increase the height of each shelf. Yet another example of a limitation of deep flow systems is the high volumetric flow rate used in circulating water, which in turns involves large expensive pumps and high electricity use. A further disadvantage is the high nutrient load in absolute terms in order to achieve the required concentrations of those nutrients. Another example of a limitation is the need to raise the rafts up over the lip of pond (which is necessarily higher than the water level) in order to remove the raft from the pond. This requires additional space between shelves in order to prevent plants from the plants from hitting the bottom of the next shelf and becoming damaged.

In many mobile gully systems and some deep flow systems, one material handling feature is the progressive adjustment of plant-to-plant spacing as the plant grows in size, in order to minimize empty space between plants in a responsive manner. This can be done in a single or multiple discrete steps via, for example, transplanting. Alternatively, spacing adjustment can be carried out gradually and continuously. Gullies can easily be positioned progressively wider from one another over time. However, due to the high aspect ratio and the underlying conveyance systems often already in place, this positioning system usually includes a substantial number of additional equipment, such as a device to move plants into a new raft with lower planting density, in order to be implemented in a deep flow system.

To further improve the material handling process for indoor agriculture, systems and methods disclosed herein effectively take advantage of the vertical stacking, flow-through, and water conveyance approaches described above with improvements made to each approach. For example, a material handling architecture for an indoor hydroponic farm includes multiple growing shelves vertically stacked along a supporting structure. Adjacent growing shelves are disposed close together vertically (e.g., with spacing less than 18 inches) to fully exploit the indoor space. Horizontal ventilation (i.e. perpendicular to the long side of the shelf) can be employed to improve heat dissipation in the growing space between shelves. The growing shelves use culture ponds to provide nutrients to plants disposed in rafts floating in the culture ponds, as well as to convey the rafts during growth. The depth of the culture ponds is usually less than 6 inches to facilitate vertical stacking. A ramp and or weir is included in each growing shelf to facilitate loading rafts on and off the growing shelves. The ramp can also prevent the plants on the rafts from being dipped into the growing culture, thereby preventing accidental contamination to the plants.

Systems and methods based on the above approach have several benefits. For example, the shallow culture ponds leads to reduced resource consumption. The ramp can decrease the probability of food contamination due to preventing rafts from dipping into water upon exit of ponds. The close spacing between growing shelves makes efficient use of both vertical and horizontal space.

Vertically-Stacked Growing Systems

FIG. 1 shows a schematic of a vertically-stacked growing system 1000 using vertical stacking, flow-through, and water conveyance approaches. The system 1000 includes an array of vertical beams 50, each of which holds multiple horizontal shelves 100 (also referred to as growing shelves) disposed into multiple layers vertically along the vertical beam 50. The horizontal shelf 100 has a length 60 and a width 62. Each horizontal shelf 100 is supported by multiple horizontal structural supports 70 mechanically coupled to a corresponding vertical beam 50 (see more details in FIG. 2).

The horizontal shelf 100 includes decking 75, which is coupled to the multiple horizontal structural supports 70 and functions as a base or bottom for the shelf 100. The horizontal shelf 100 also includes at least two side walls 102 along the length 60 of the horizontal shelf 100 and at least two end walls 104 along the wide 62 of the horizontal shelf 100. The side walls 102 and the end walls 104 form a shallow pond when the horizontal shelf 100 contains a plant nutrient water culture (also referred to as a culture), thereby constituting a growing layer of the growing system. Multiple rafts 500 are used to support plants (e.g., germinated plants) that are grown in the system 1000. The rafts 500 can float the plants above the culture, while at the same time allowing the roots of the plants to acquire nutrients from the culture underneath of the rafts 500.

Each horizontal shelf 100 also includes at least one ramp 106 (underneath the two rafts 500 angled up and moving out of the system) to facilitate loading and/or unloading of the rafts 500 into and/or out of the shallow pond including the culture. In one example, each horizontal shelf 100 includes a ramp 106 at the beginning of the shelf 100 to facilitate loading of the rafts 500. In another example, each horizontal shelf 100 includes a ramp 106 at the end of the shelf 100 to facilitate unloading of the rafts 500. In yet another example, each horizontal shelf 100 can include one ramp 106 at the beginning and another ramp 106 at the end.

The length 60 of the shelf 100 can depend on factors such as the available space in the farm. In some examples, the length 60 of the shelf 100 can be about 5 feet to hundreds of feet (e.g., about 5 feet, about 10 feet, about 20 feet, about 50 feet, about 100 feet, about 200 feet, about 300 feet, or about 500 feet, including any values and sub ranges in between). Multiple vertical beams 50 can be used to construct a long shelf 100. The spacing between adjacent vertical beams 50 can be about 5 feet to about 20 feet (e.g., about 5 feet, about 10 feet, about 15 feet, or about 20 feet, including any values and sub ranges in between).

The width 62 of the shelf 100 can be about 3 feet to about 6 feet (e.g., about 3 feet, about 3.5 feet, about 4 feet, about 4.5 feet, about 5 feet, about 5.5 feet, or about 6 feet, including any values and sub ranges in between). In one example, the width 62 of the shelf 100 can hold only one raft 500, in which case the width of the raft 500 is substantially similar to the width 62 of the shelf 100. In another example, the width 62 of the shelf 100 can hold more than one raft 500 (e.g., two rafts, three rafts, or more).

The depth of the shallow pond in the shelf 100 can be substantially equal to or less than 6 inches (e.g., about 6 inches, about 5.5 inches, about 5 inches, or less, including any values and sub ranges in between). The shallow pond can reduce the amount of water used in each shelf 100, thereby facilitating the construction of multiple shelves 100 within each system 1000. In some examples, the system 1000 can include four or more shelves 100 (e.g., 4 shelves, 5 shelves, 6 shelves, 7 shelves, 8 shelves, 9 shelves, 10 shelves, or more).

The spacing between adjacent shelves 100 can be substantially equal to or less than 18 inches (e.g., about 18 inches, about 16 inches, about 14 inches, about 12 inches, about 10 inches, or less, including any values and sub ranges in between). In one example, the multiple shelves 100 are disposed vertically in a periodic manner, i.e. the spacing between adjacent shelves is fixed. In another example, the multiple shelves 100 can have more than one spacing between adjacent shelves 100. For example, the first two shelves can have a first spacing and the next two shelves can have another spacing. This multi-spacing configuration can accommodate, for example, growth of different plants on different levels in the system 1000.

The rafts 500 as used in the system 1000 can be made of foam, plastics, or any other material that can float on water. The thickness of the rafts 500 can be substantially equal to or less than 4 inches (e.g., about 4 inches, about 3.5 inches, about 3 inches, or less, including any values and sub ranges in between). The rafts 500 can have a rectangular shape to maximize the use of the space in the shelves 100. The length of each raft 500 can be, for example, about 10 inches to about 50 inches (e.g., about 10 inches, about 20 inches, about 30 inches, about 40 inches, or about 50 inches, including any values and sub ranges in between). The width of each raft 500 can be, for example, about 5 inches to about 48 inches or the full width of the pond (e.g., about 5 inches, about 10 inches, about 20 inches, about 30 inches, about 40 inches, or about 48 inches, including any values and sub ranges in between).

In one example, the side walls 102 can be part of the decking 75 (see, e.g., FIGS. 7A and 7B). In this case, each shelf 100 can include multiple decking 75 disposed and aligned along the length 60. In another example, the decking 75 can include only the bottom of the shelf 100 and the side walls 102 can be assembled separately. The material of the decking 75 can include, for example, metal (e.g., aluminum or steel), plastic, or glass.

Figure 2:
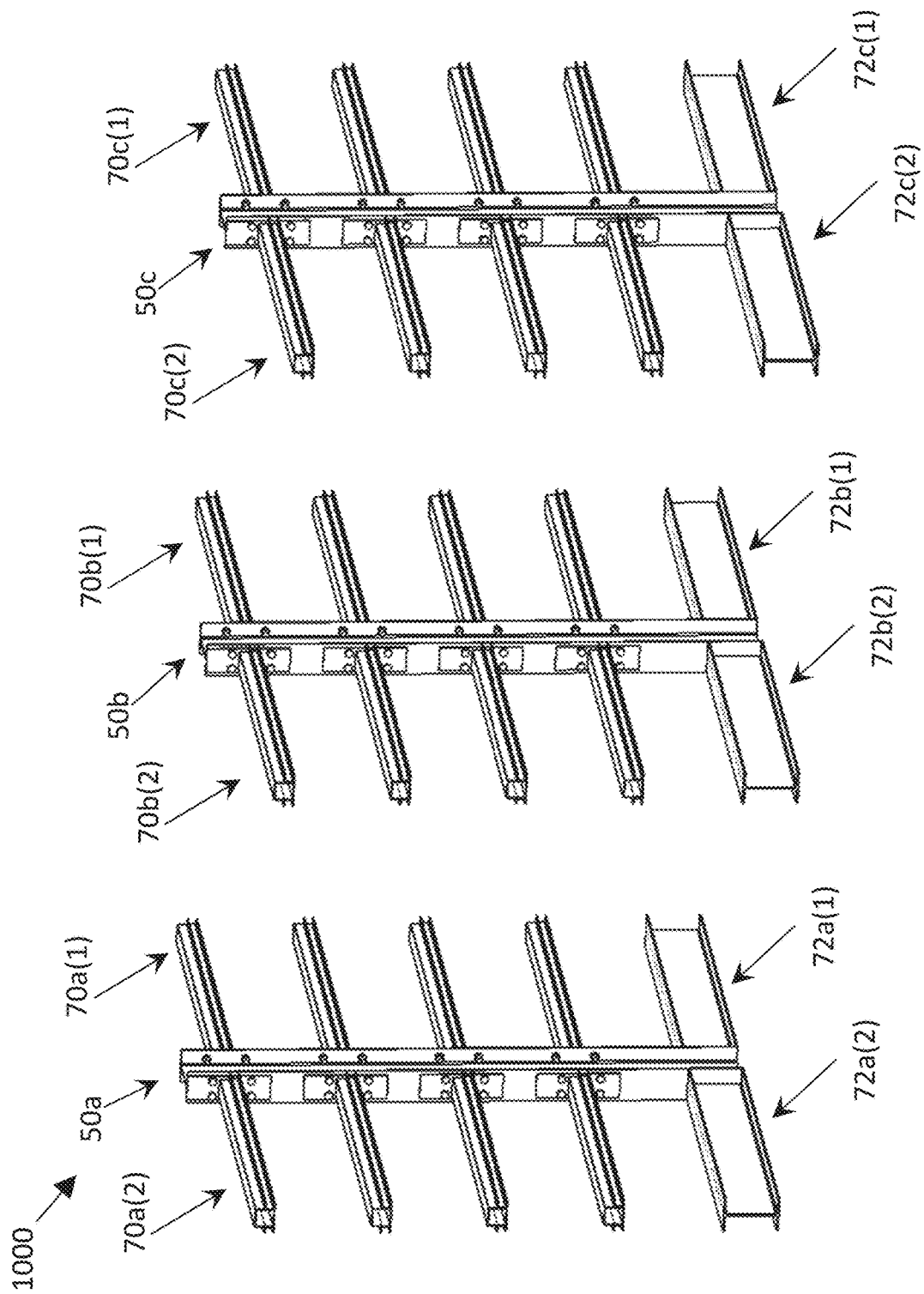
FIG. 2 shows a schematic of vertical and horizontal supporting structures that can be used in a vertically-stacked growing system.

FIG. 2 shows a schematic of vertical and horizontal supporting structures that can be used in the system shown in a vertically-stacked growing system. The illustration shows three vertical beams 50a, 50b, and 50c. Two arrays of horizontal structural support 70a(1) and 70a(2) are mechanically coupled to the two sides of the vertical beam 50a. Similarly, horizontal structural supports 70b(1) and 70b(2) are coupled to the vertical beam 50b, and horizontal structural supports 70c(1) and 70c(2) are coupled to the vertical beam 50c. Each beam 50a/b/c also includes two base support structures 72a/b/c(1) and 72a/b/c(2) (collectively referred to as base support structures 72). The base support structures 72 can include "I" shape beams to secure the vertical beams 50 (as well as components disposed directly or indirectly on the vertical beams 50) to the floor.

Figure 3:
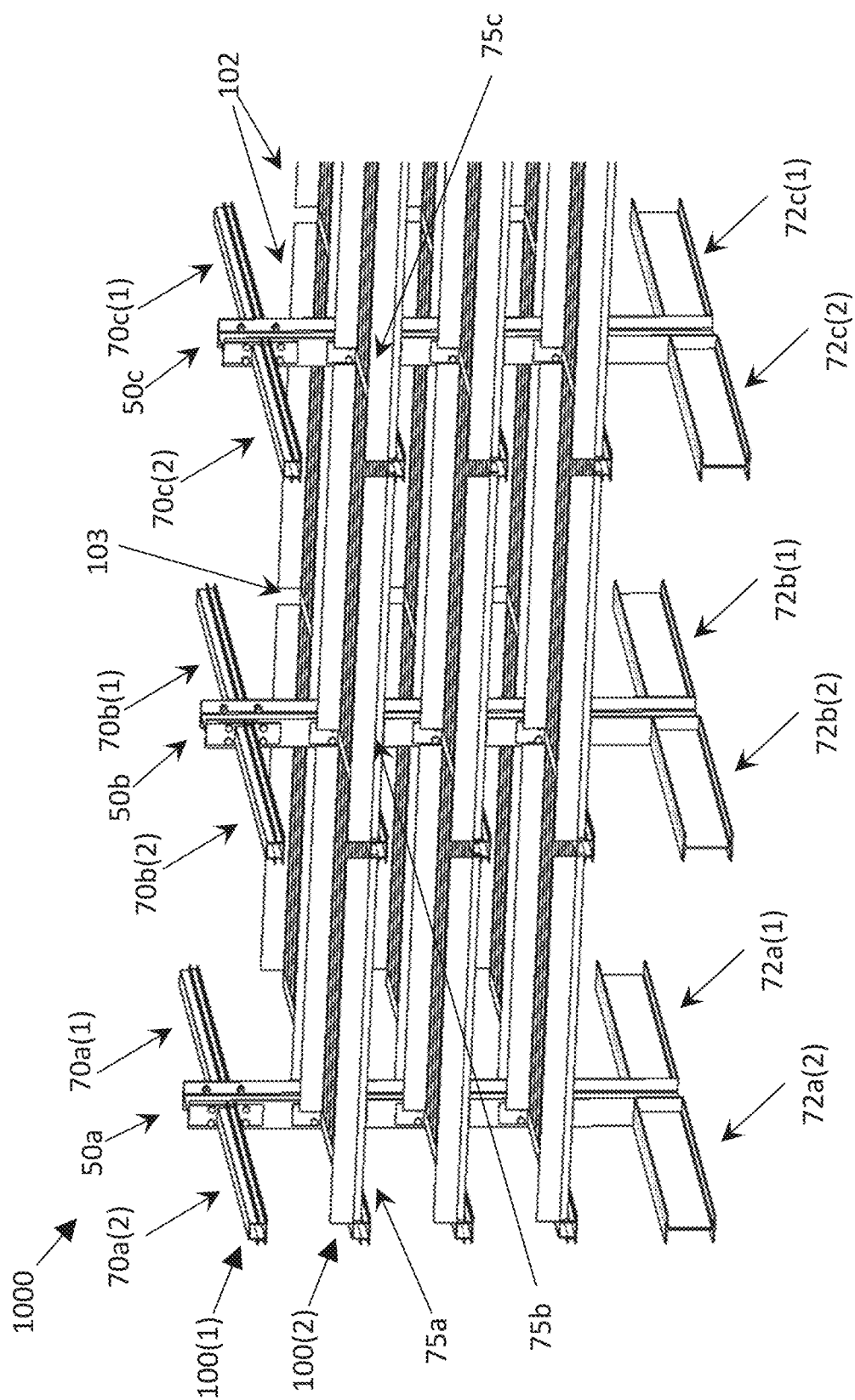
FIG. 3 shows a perspective view of a system including decking disposed on supporting structures that can be used in a vertically-stacked growing system.

FIG. 3 shows a perspective view of a system including decking disposed on supporting structures that can be used in the system in a vertically-stacked growing system. The first shelf 100(1) does not include any decking to illustrate the underlying supporting structures, including the horizontal structural support 70. The second shelf 100(2) includes three decking 75a, 75b, and 75c, aligned along the length of the shelf. Each decking 75a/b/c has its own side walls 102 and adjacent side walls 102 define a gap 103. A liner can be used to cover the decking 75 so as to form a water-proof container to hold the shallow pond (see, e.g., FIG. 10A). The piecewise configuration of the shelf 100 allows convenient construction of shelves 100 having an arbitrary length by increasing or decreasing the number of decking 75.

Figure 4:
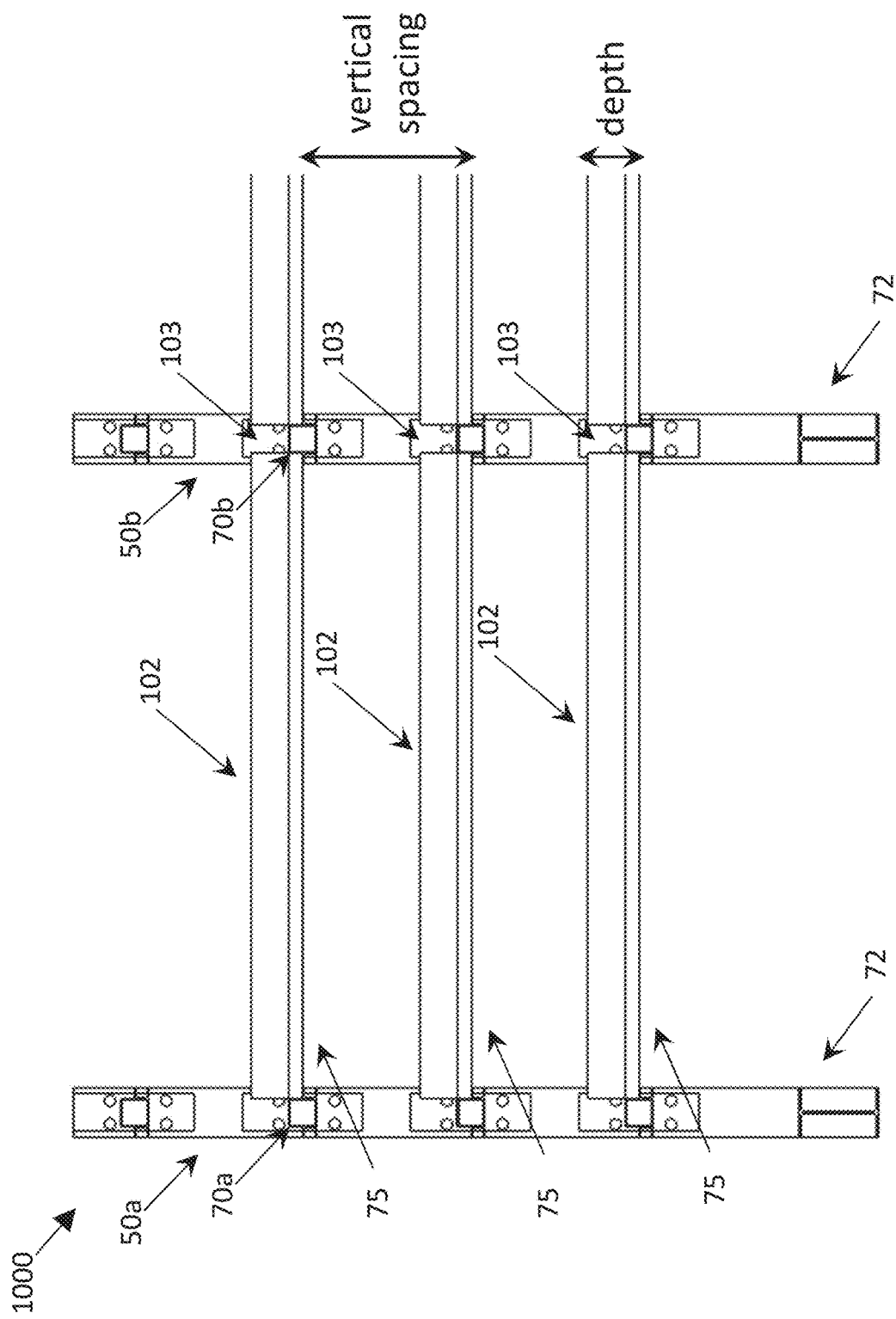
FIG. 4 shows a side view of a system including decking disposed on supporting structures that can be used in a vertically-stacked growing system.

FIG. 4 shows a side view of a system including decking disposed on supporting structures that can be used in a vertically-stacked growing system. FIG. 4 illustrates two vertical beams 50a and 50b. On each level, a corresponding decking 75 is disposed between the two vertical beams 50a and 50b, and the decking 75 is supported by the two horizontal structural supports 70a and 70b coupled to the vertical beams 50a and 50b, respectively.

Figure 5A:
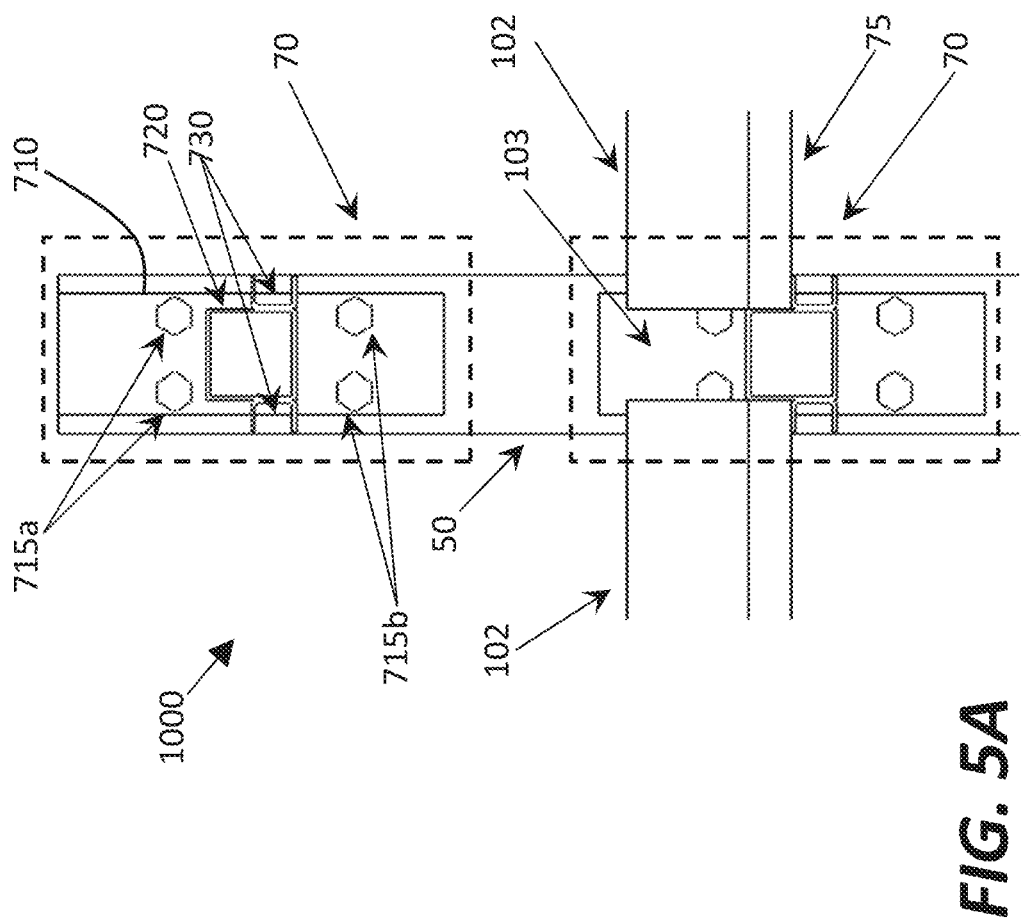
FIG. 5A shows a side view of a horizontal structural support disposed on a vertical beam that can be used in a vertically-stacked growing system.
Figure 5B:
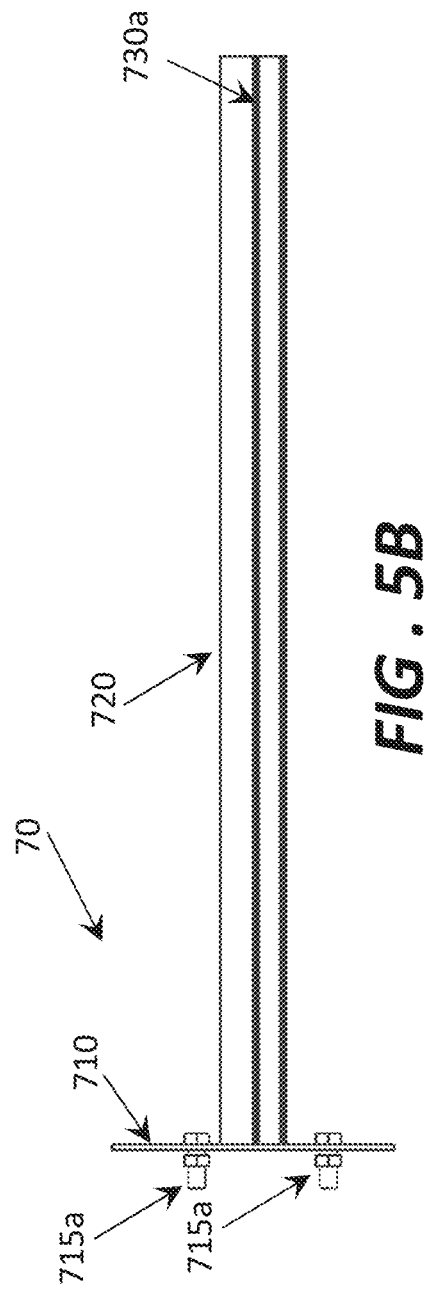
FIGS. 5B and 5C show a side view and a perspective view, respectively, of a horizontal structural support that can be used in a vertically-stacked growing system.
Figure 5C:
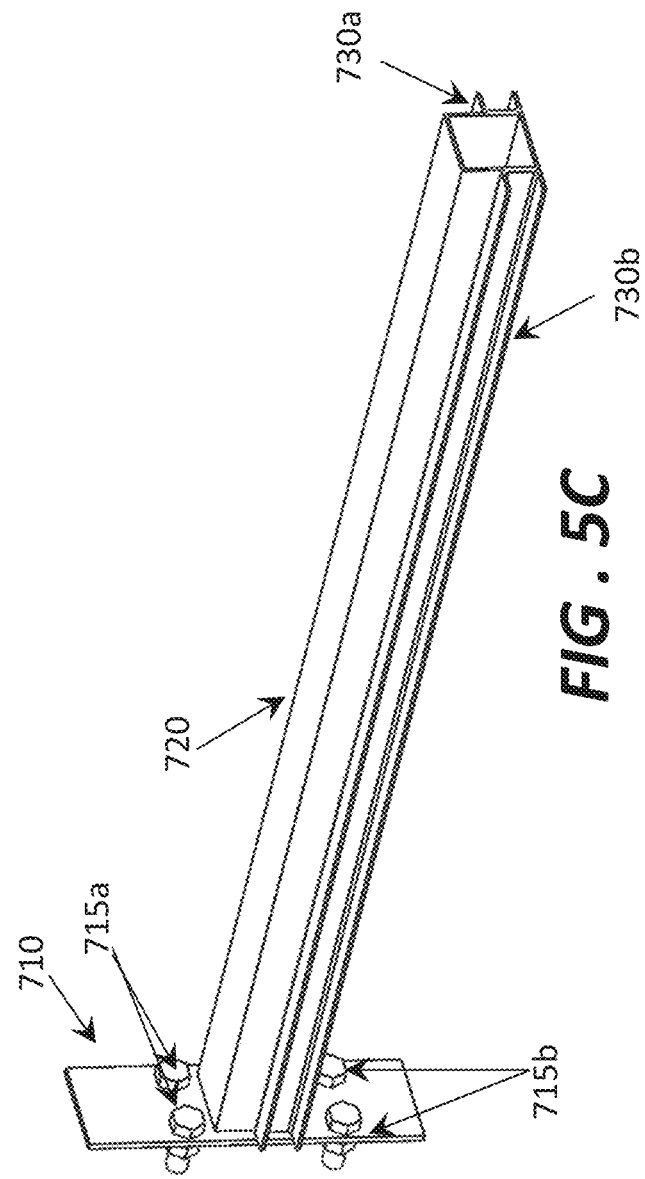

FIG. 5A shows a side view of a horizontal structural support 70 disposed on a vertical beam 50 that can be used in a vertically-stacked growing system. FIGS. 5B and 5C show a side view and a perspective view, respectively, of a stand-alone horizontal structural support 70 that can be used in a vertically-stacked growing system. Each horizontal structural support 70 includes a plate 710 to couple the horizontal structural support 70 to the vertical beam 50 via two sets of screws 715a and 715b. The horizontal structural support 70 also includes a horizontal arm 720 (also referred to as horizontal beam 720) and two U channels 730 coupled to the two sides of the horizontal arm 720. In some cases, the plate 710 can be coupled to the horizontal arm 720 via welding. In some cases, the U channels 730 can be coupled to the horizontal arm 720 via welding. As shown in FIG. 5A, the decking 75 is disposed on the two U channels 730 so that the horizontal portion of the decking 7075 is flush with the top of the horizontal arm 720. And the gap 103 defined by adjacent side walls 102 has the same width as of the horizontal arm 720. This configuration allows convenient alignment of multiple decking 75.

Figure 6:
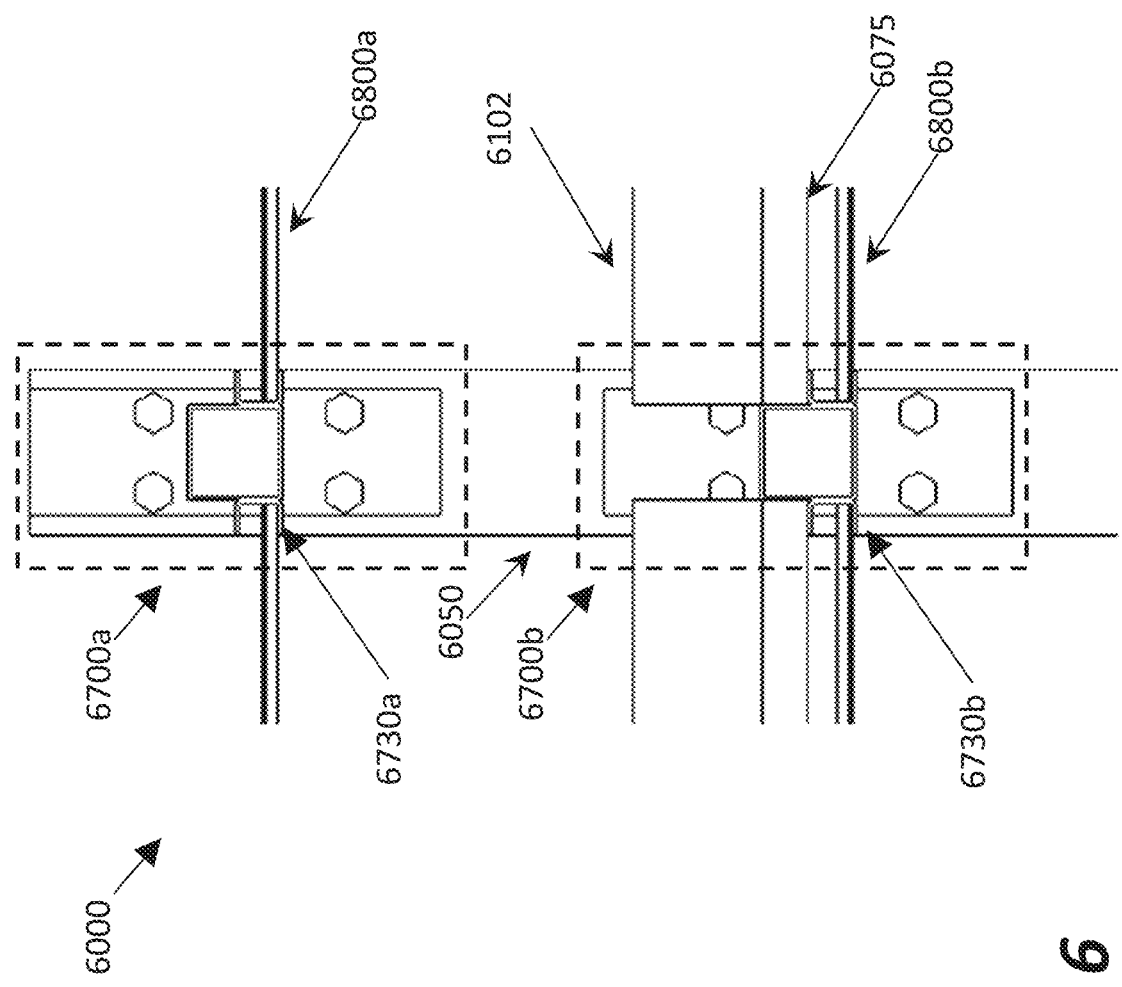
FIG. 6 shows a side view of a lighting system that can be used in a vertically-stacked growing system.

FIG. 6 shows a side view of a lighting system 6000 that can be used in a vertically-stacked growing system. The system 6000 includes a vertical beam 6050 and two horizontal structural supports 6700a and 6700b disposed on the vertical beam 6050. A decking 6075 is disposed on the second horizontal structural support 6700b. A first horizontal support structure 6800a for light strips on a first level is mechanically coupled to the first horizontal structural support 6700a and a second horizontal support structure 6800b for light strips on a second level is mechanically coupled to the second horizontal structural support 6700b. In one example, the ends of the light strip horizontal support structures 6800a and 6800b can be disposed in the U channels 6730a and 6730b in the horizontal structural supports 6700a and 6700b, respectively, to acquire mechanical support. The supported light strips 10071 are shown in FIG. 10A.

The light strips 10071 can include light emitting diodes (LEDs) to provide artificial light for the plants. In one example, the light strips 10071 can include broadband light sources. In another example, the light strips 10071 can include single-color light sources, such as LEDs emitting a single color (e.g., pink LED, green LED, etc.).

FIGS. 7A and 7B show a perspective view and a side view, respectively, of a decking 7000 that can be used in a vertically-stacked growing system. The side view in FIG. 7B is along the AA' line indicated in FIG. 7A. The decking 7000 includes two side walls 7102 defining a bottom section in between. The bottom section includes flat portions 7075 and corrugated portions 7078 (also referred to as ridges). In operation, the corrugated portion 7078 can be disposed on horizontal structural supports (e.g., 730 in FIG. 5A). This corrugated configuration can provide improved mechanical strength to the decking 7000, especially when water culture is contained in the resulting growth system. In some examples, the height of the corrugations in the corrugated portion 7078 can be substantially equal to the distance between the top of 730 and the top of 720 shown in FIG. 5A. In this case, a continuous horizontal surface without gaps (e.g., gaps 103 in FIG. 3) in the side wall.

For each decking 7000, the corrugated portion 7078 can include 5 or more corrugations (e.g., 5 corrugations, 7 corrugations, 10 corrugations, 15 corrugations, or more, including any values and sub ranges in between). The area ratio of the corrugated portion 7078 width to the flat portion 7075 can be about 5% to about 50% (e.g., about 5%, about 10%, about 15%, about 20%, about 25%, about 30%, about 35%, about 40%, about 45%, or about 50%, including any values and sub ranges in between). As used herein, the area of the corrugated portion 7078 means the horizontal area without taking into account the area of the vertical walls in the corrugations.

Figure 8:
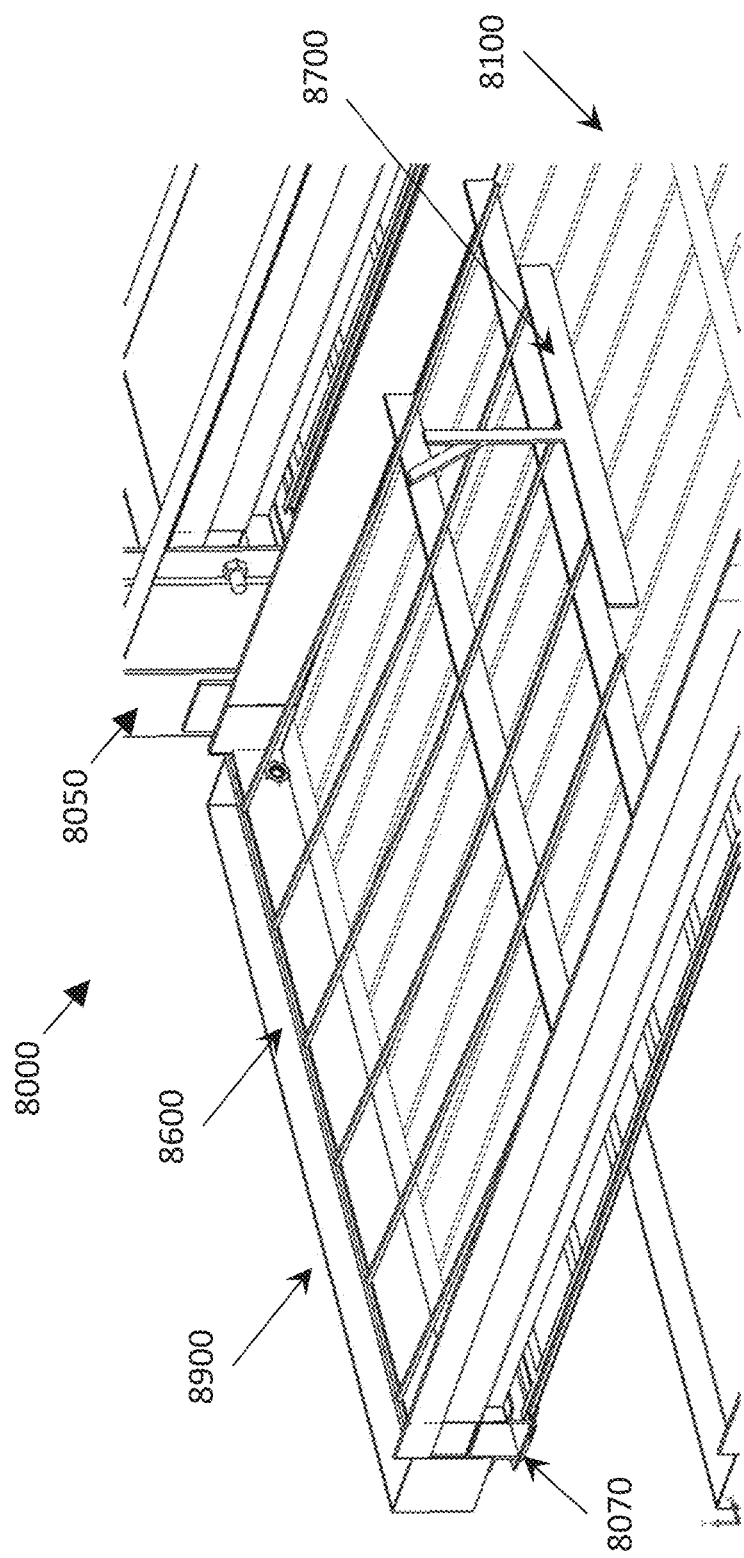
FIG. 8 shows a schematic of a ramp disposed in a growing shelf that can be used in a vertically-stacked growing system.

FIG. 8 shows a schematic of a ramp 8600 disposed in a growing shelf that can be used in a vertically-stacked growing system 8000. FIGS. 9A and 9B show a perspective view and a side view, respectively, of the ramp 8600. The system 8000 includes a vertical beam 8050 and horizontal structure support 8070 to support a growing shelf 8100. The ramp 8600 is disposed in the growing shelf 8100 and includes three supporting spacers 8610a, 8610b, and 8610c disposed on the floor of the growing shelf 8100 to support an array of rails 8635. The rails 8635 includes a flat region 8620 (also referred to as a horizontal region 8620) and an angled region 8630 (also referred to as a ramped region 8630). The third supporting spacer 8610c is higher than the other two supporting spacers 8610a and 8610b so as to create the angled region 8630. In some cases the third supporting spacer 8610c can be variable in height in order to allow the angled region 8630 to lowered to a horizontal position when not in use.

In one example, the flat region 8620 and the angled region 8630 use a continuous rail. In another example, the flat region 8620 includes a first piece of rail and the angled region 8630 includes a second piece of rail. The two pieces of rails can be mechanically coupled together or separated. The ramp 8600 can include 2 or more rails 8635 so as to support rafts (e.g., 2 rails, 3 rails, 4 rails, 5 rails, 6 rails, 7 rails, 8 rails, or more).

In operation, the rails 8635 can be underneath the surface of the shallow pond. The angled region 8630 can facilitate loading or unloading the rafts, while the flat region 8620 can support the rafts to maintain the rafts at certain level above the pond surface. In combination, the ramp 8600 can prevent the raft from dipping into the shallow pond and accordingly prevent contamination of plants by the growth culture in the shallow pond. The system 8000 also includes a catchment area 8900 (also referred to as a gutter 8900) to collect the growth culture that may be accidentally spilled due to loading and/or unloading of rafts. In some examples, a similar catchment area can also be included in the offloading end of the pond.

The system 8000 also includes a conveyer 8700 to move rafts in the growing shelf 8100. The conveyer 8700 includes a mechanical pusher to push rafts along the length of the shelf 8100. Other techniques can also be used. In one example, the raft conveyer 8700 includes a water pump to control a flow of the growing culture in the shallow pond and this flow can move the rafts. In another example, the conveyor 8700 can include an air flow apparatus to control a flow of air across the rafts so as to move the rafts.

Vertically-Stacked Growing Systems Including Horizontal Ventilation

Figure 10B:
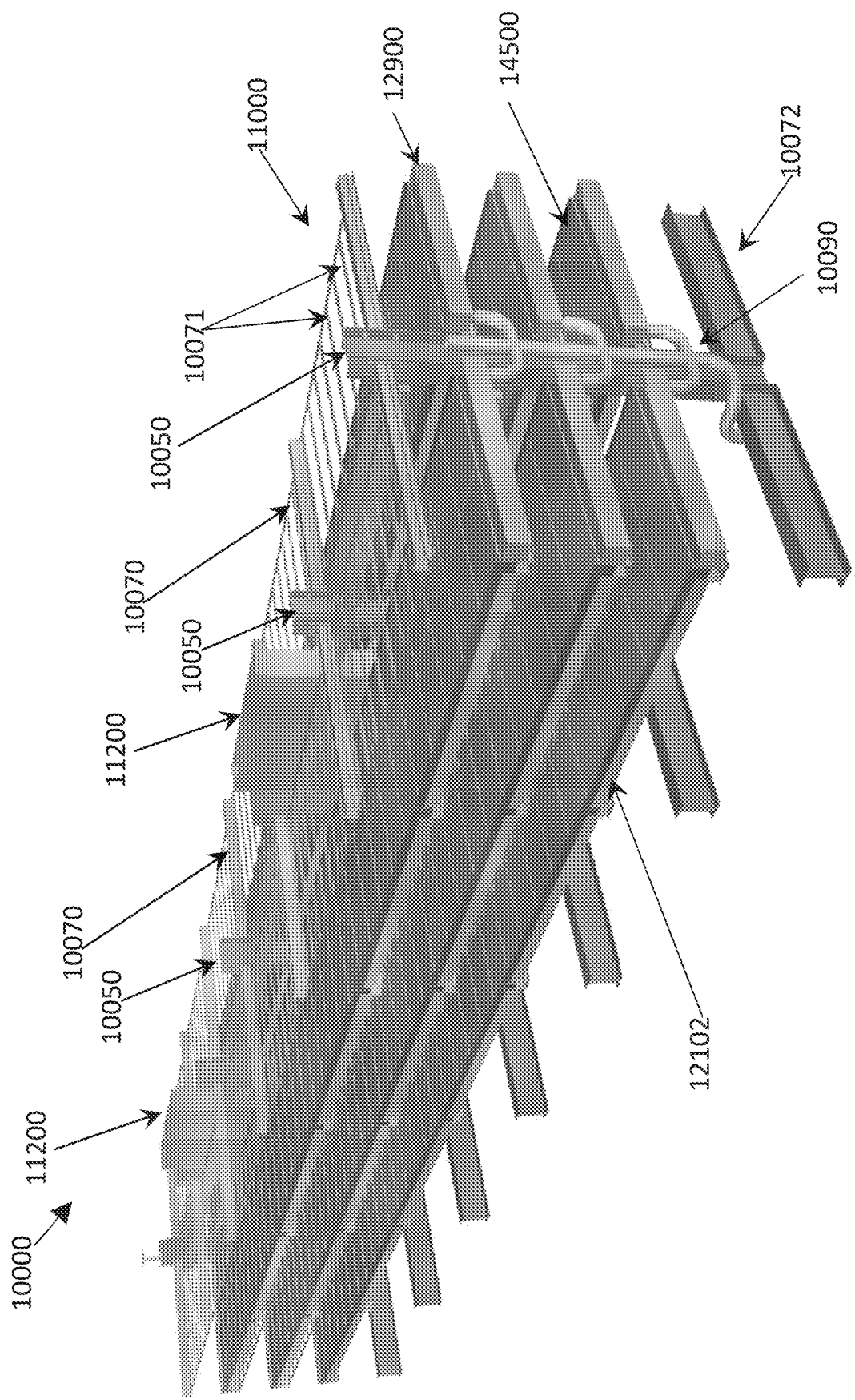

FIGS. 10A and 10B show a schematic of a vertically-stacked growing system 10000 including horizontal ventilation to achieve desired temperature, humidity, and $CO_2$ levels between stacked layers. FIG. 10A shows four growing shelves 11000, 12000, 13000, and 14000, each of which is in a different stage of construction, so as to illustrate the structures in the system 10000. The first shelf 11000 includes only the supporting structures, including vertical beams 10050 and horizontal structural support 10070 and base support 10072 mechanically coupled to the vertical beams 10050. The first shelf 11000 also shows an array of light strips 10071 disposed substantially parallel to the horizontal structural support 10070.

An array of horizontal ventilation ducts 11500 (also referred to as horizontal air ducts or air apertures) is disposed along the length of the first shelf 11000. In some cases, the horizontal ventilation ducts 11500 can be mechanically attached to the vertical beams 10050 and/or the horizontal structure support 10070. The horizontal ventilation ducts 11500 can acquire air flow from vertical ventilation ducts 11200 (see FIG. 10B). In one example, the vertical ventilation ducts 11200 are exposed to the ambient environment within the indoor farm. In another example, the vertical ventilation ducts 11200 can have opening(s) coupled to the outdoor environment. In this case, the vertical ventilation ducts 11200 may introduce cold air from the outdoor environment to efficiently dissipate heat generated by LEDs in the growing system. In yet another example, the vertical ventilation ducts 11200 can have opening coupled to an air handling system which can provide heating, cooling, humidification, dehumidification, carbon dioxide injection, or otherwise conditioned air as useful to provide desired environmental conditions in the growing area.

In operation, the horizontal ventilation ducts 11500 can produce air flows perpendicular to the length of the shelf 11000 (and other shelves as well). Since multiple horizontal ventilation ducts 11500 are disposed along the length of the shelf 11000, the temperature, humidity, or other environment parameters can be maintained at a substantially uniform level longitudinally. Alternatively, different horizontal ventilation ducts 11500 at different locations along the length of the shelf 11000 can be configured to produce different air flows so as to create different growth environments along the length of the shelf 11000. For example, the beginning of the shelf 11000 may have a higher temperature to facilitate growth of plants which are just germinated, while the end of the shelf 11000 may have a higher humidity to facilitate growth of nearly mature plants.

The second shelf 12000 includes decking 12075, including side walls 12102, disposed on the supporting structures, which are similar to the supporting structures shown in the first shelf 11000. In addition, a catchment area 12900 is also included in the second shelf 12000 to collect growth culture that might be spilled over the shallow pond in the growing shelves. The catchment area 12900 is coupled to a plumbing system 10090, which can be coupled to source tanks of growing cultures. The spillover can either be continuous as the primary draining method of the pond or non-continuous in the case of another drain such as a stand pipe located elsewhere in the pond. In both cases, one purpose of the spillover/catchment area 12900 is to create a lesser height to lift over the rafts 14500 so as to move the rafts 14500 out of the ponds.

In the third shelf 13000, a liner 13100 is disposed on the decking (e.g., 12075) so as to form a liquid container that can hold liquid growing culture and form a shallow pond. In the fourth shelf 14000, rafts 14500 used to hold plants are floating in the shallow pond. Two lanes of rafts 14500 are included in each side of the shelf 14000, but other numbers of lanes of rafts 14500 can also be used.

Figure 11:
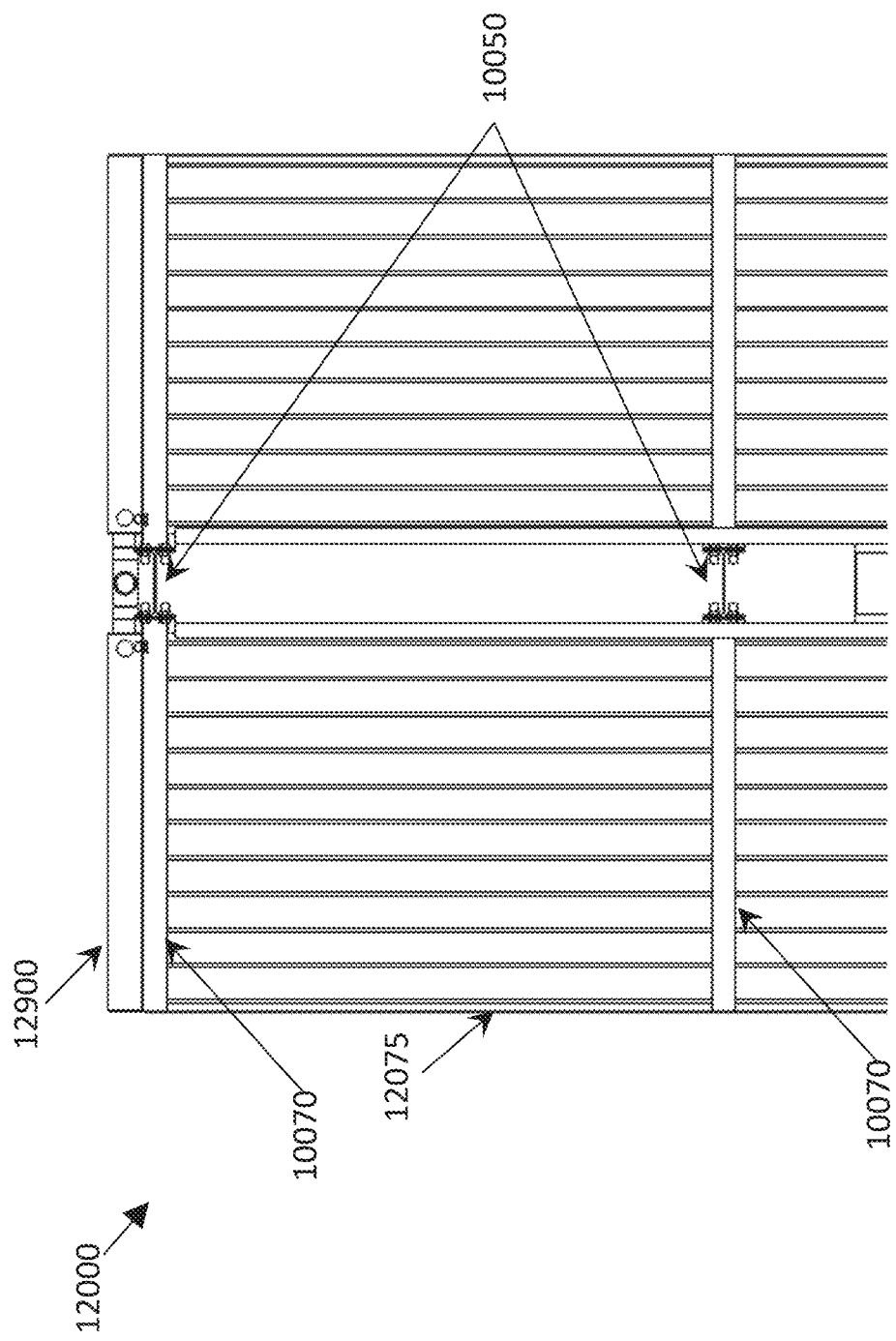
FIG. 11 shows a top view of the second growing shelf shown with only the support structure and decking in FIG. 10A.

FIG. 11 shows a top view of the second growing shelf 12000 shown in FIG. 10A. This top view shows the corrugated bottom of the decking 12075. The corrugations are disposed along the width of the shelf 12000, but each corrugation is parallel to the length of the shelf 12000. It can also be seen that the vertical beams 10050 can include "I" shape beams, which can have a simple mechanical structure and provide secure mechanical support for the rest of the system.

Figure 12:
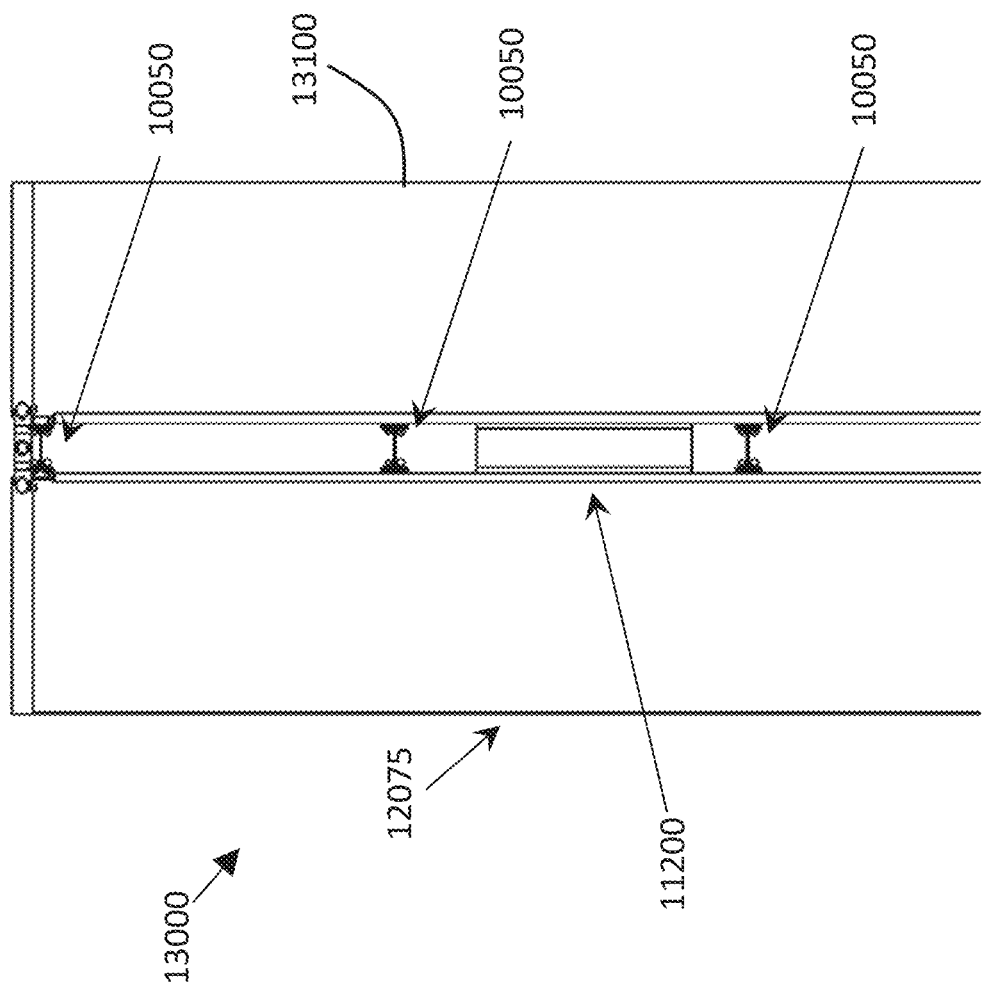
FIG. 12 shows a top view of the third growing shelf shown with a pond liner to contain the plant nutrient solution in FIG. 10A.
Figure 13:
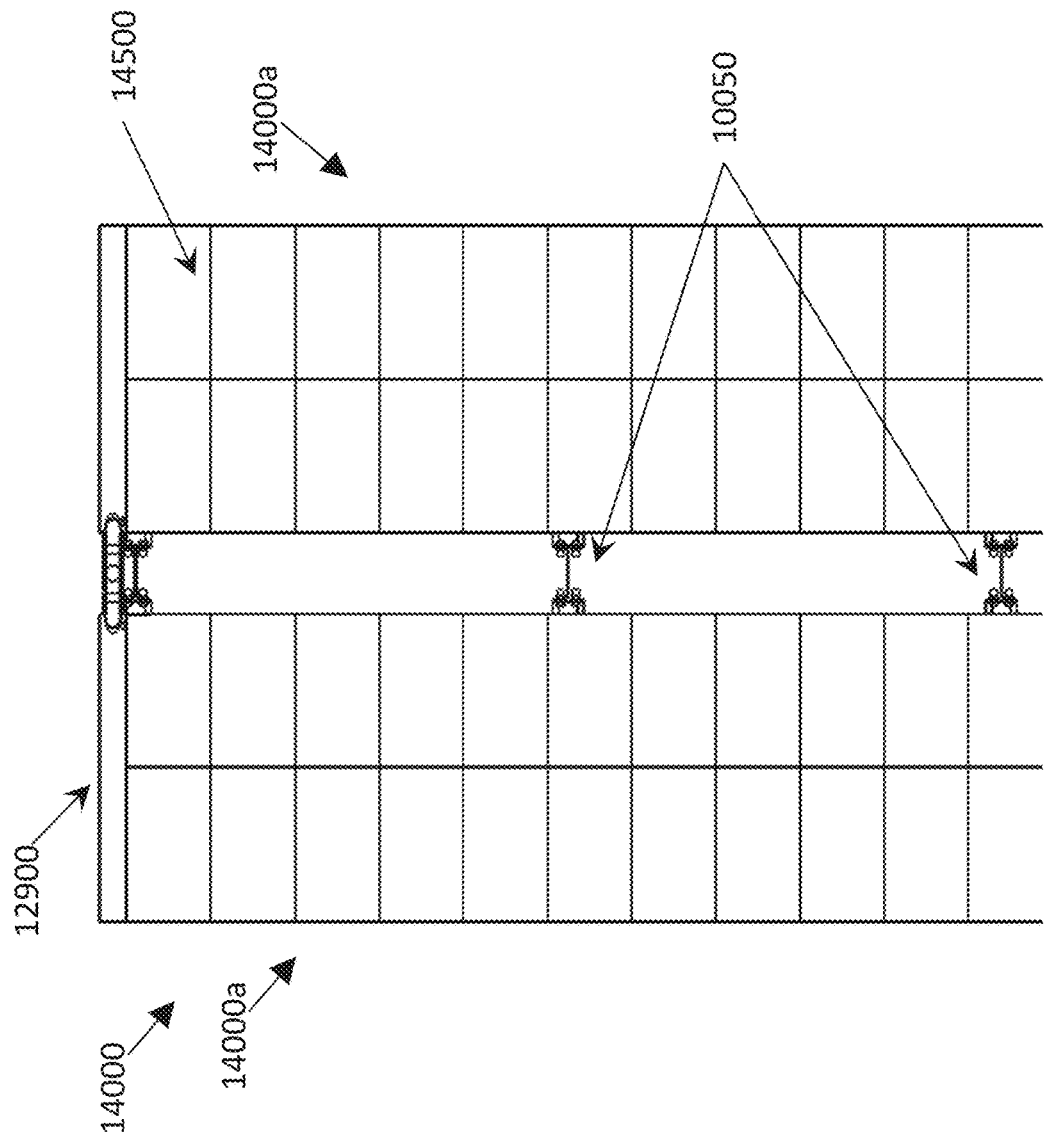
FIG. 13 shows a top view of the fourth growing shelf shown filled with rafts in FIG. 10A.

FIG. 12 shows a top view of the third growing shelf 13000 shown in FIG. 10A, The liner 13100 covers the corrugated bottom of the decking 12075 and forms a flat bottom for the shallow pond. FIG. 13 shows a top view of the fourth growing shelf 14000 shown in FIG. 10A. The shelf 14000 includes two sides 14000a and 14000b. Each side includes two lanes for rafts 14500, so four longitudinal sequences of rafts 14500 can be loaded into the shelf 14000.

Figure 14A:
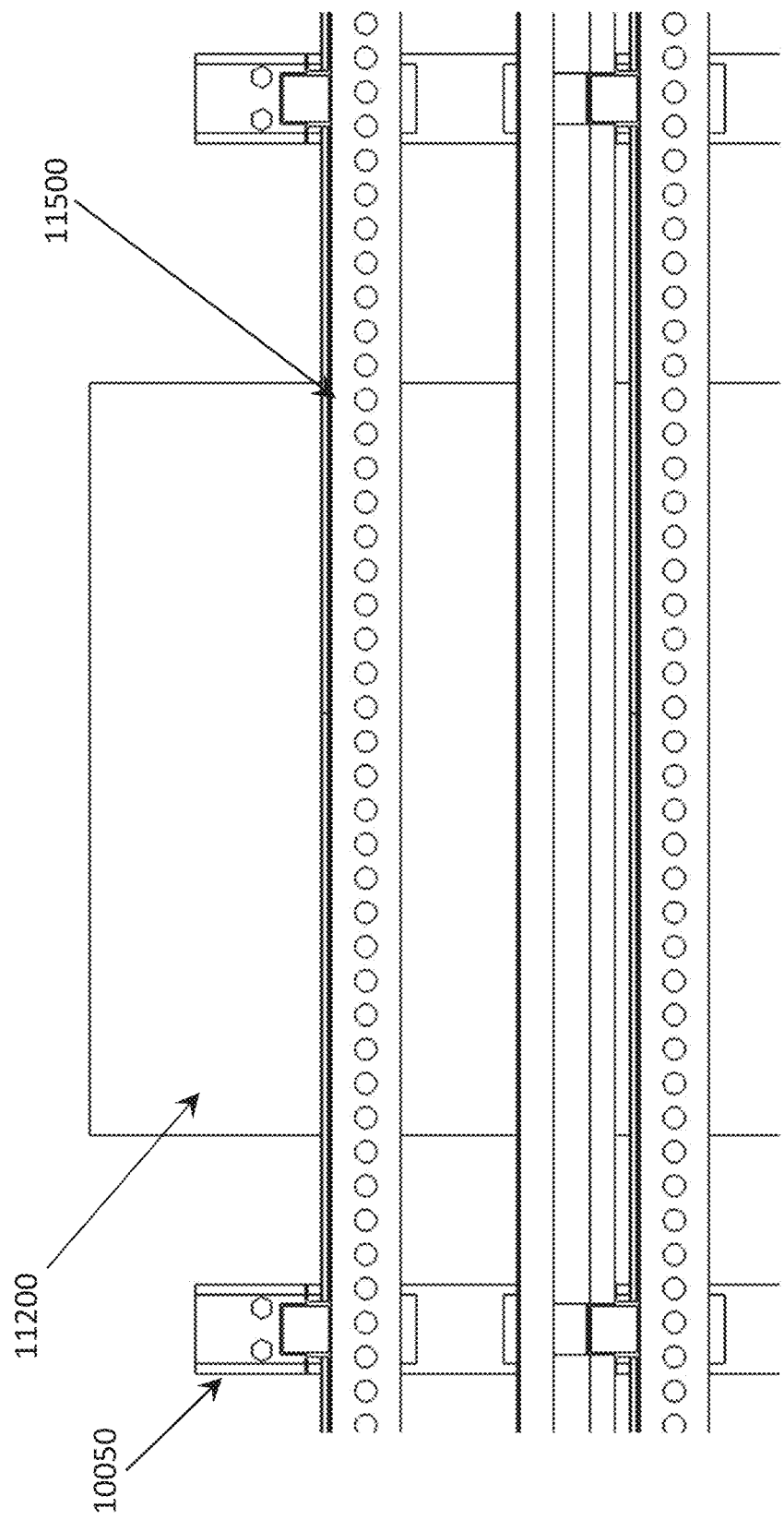
FIGS. 14A and 14B illustrate the ventilation system in the vertically-stacked growing system shown in FIGS. 10A and 10B.
Figure 14B:
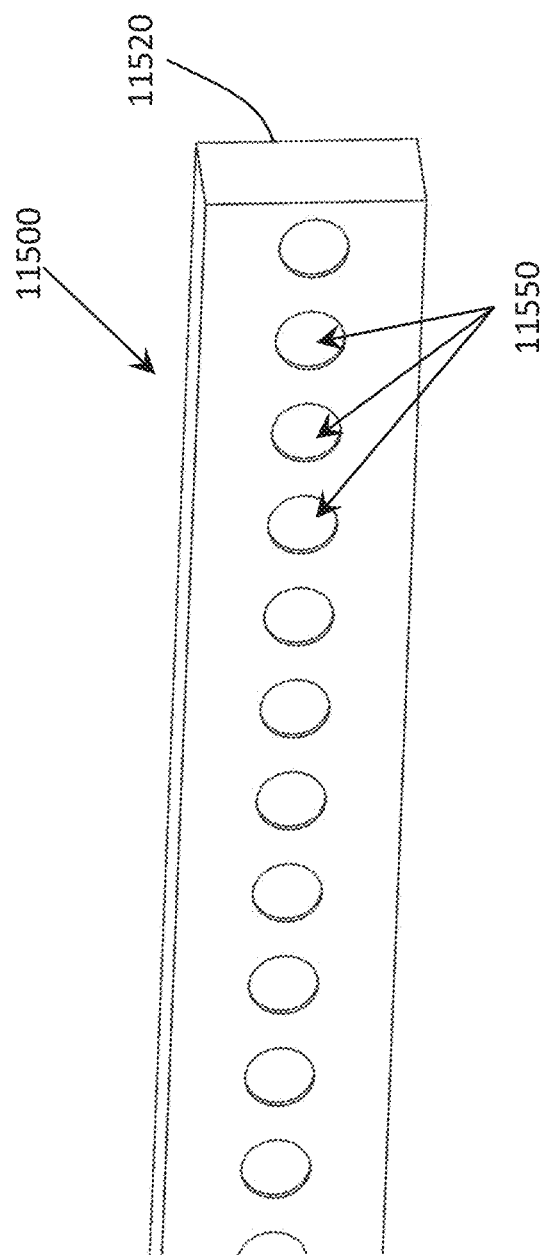

FIGS. 14A and 14B illustrate the ventilation system in the vertically-stacked growing system 10000 shown in FIGS. 10A and 10B. The horizontal ventilation ducts 11500 includes an array of apertures 11550 defined by a ventilation strip 11520. In one example, the ventilation strip 11520 can be a hollow rectangular or square tube. In another example, the ventilation strip 11520 can include a hollow cylindrical tube. The diameter of each aperture 11550 can be, for example, about 0.1 inch to about 5 inches (e.g., about 0.1 inch, about 0.2 inch, about 0.5 inch, about 1 inch, about 2 inches, about 3 inches, about 4 inches, or about 5 inches, including any values and sub ranges in between). In one example, all the apertures 11550 have the same diameter. In another example, different diameters can be used for different apertures so as to generate different growth conditions along the length of the shelf.

In some examples, the array of apertures 11550 can include a two-dimensional (2D) array of apertures. The 2D array of apertures can include, for example, two rows, three rows, four rows, five rows, six rows, seven rows, eight rows, nine rows, ten rows, or more.

In one example, the apertures 11550 are disposed into a periodic array and the pitch of the array can be about 1 inch to about 5 inches (e.g., about 1 inch, about 2 inches, about 3 inches, about 4 inches, or about 5 inches, including any values and sub ranges in between). In another example, the apertures 11550 are disposed into an aperiodic array. For example, the spacing between adjacent apertures 11550 can change at different locations along the ventilation strips 11520.

The apertures 11550 shown in FIGS. 14A and 14B have a round shape. In practice, other shapes can be used as well, including rectangular apertures, square apertures, and elliptical apertures, among others.

Figure 15A:
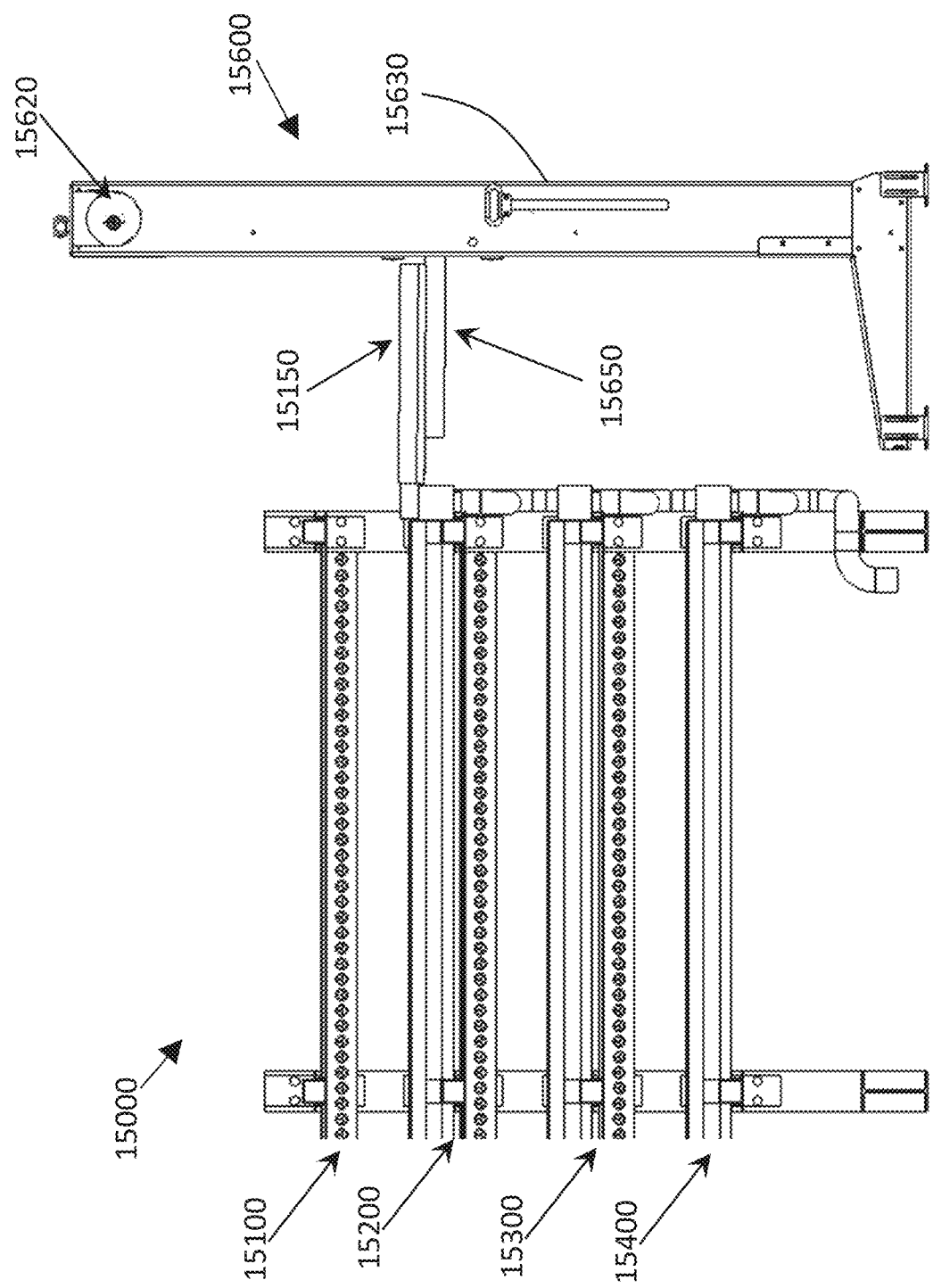
FIGS. 15A and 15B show a side view and a perspective view, respectively, of a free standing vertical conveyance system to load rafts into growing shelves and/or to collect rafts from the growing shelves.
Figure 15B:
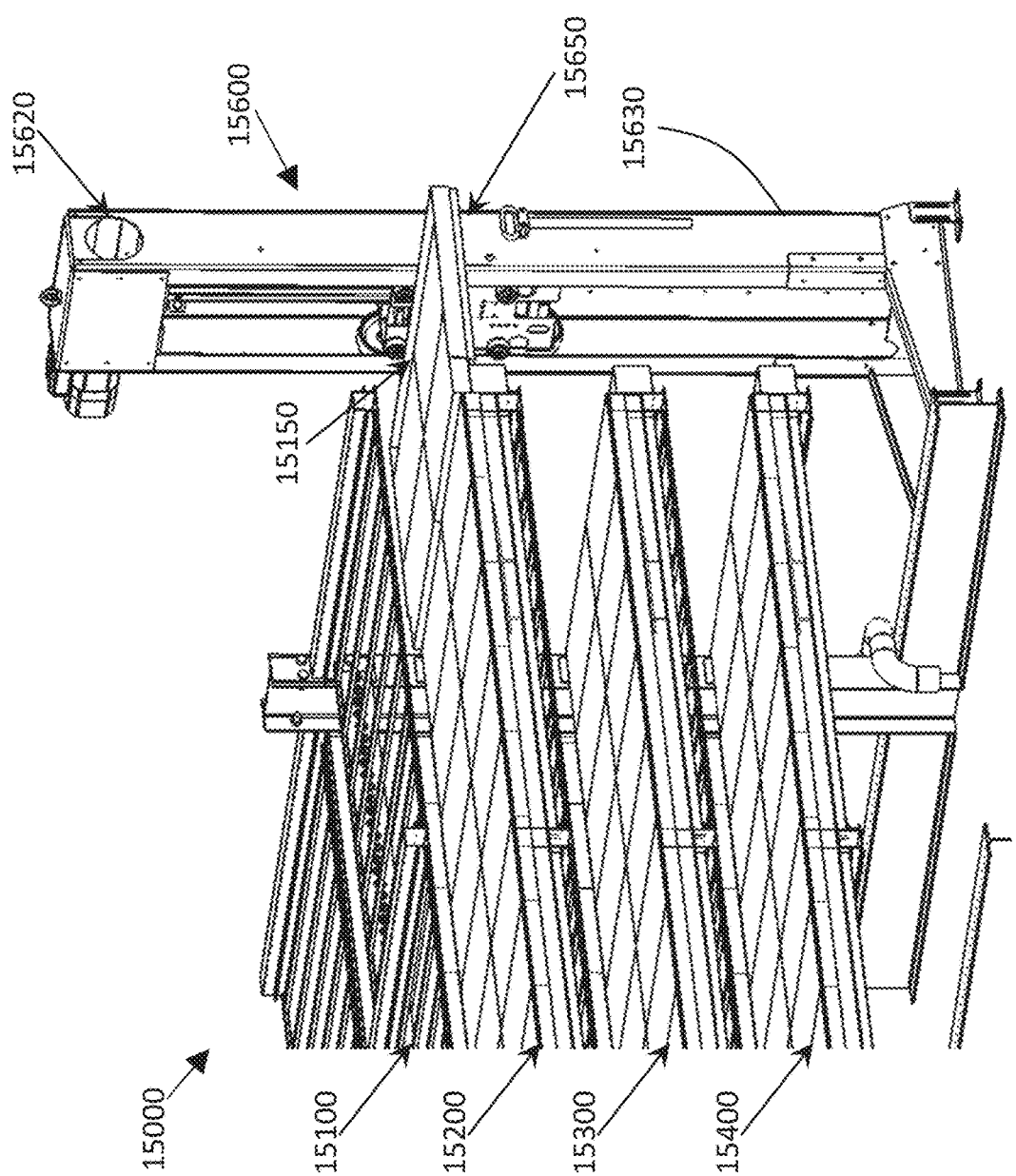

FIGS. 15A and 15B show a side view and a perspective view, respectively, of a vertical conveyance system 15600 to load rafts into growing shelves and/or to collect rafts from growing shelves 15100 to 15400. The conveyance system 15600 includes a vertical structure 15630 and a reception area 15650, which is disposed on the vertical structure 15630 and can move along the vertical structure 15630 via an actuator 15620 (e.g., a translation belt). The reception area 15650 can receive a raft 15150 from any one of the shelves 15100 to 15400 as the reception area 15650 is moving up and down along the vertical structure 15630. In some examples, the vertical conveyor system 15600 can move on the ground so as to reach different stacks for rafts loading and unloading. In some examples, each stack can have its own vertical conveyance system 15600. In some examples, one vertical conveyance system 15600 can be shared by multiple stacks.

Indoor Farming Systems Including A Vertically-Stacked Growing System

Figure 16:
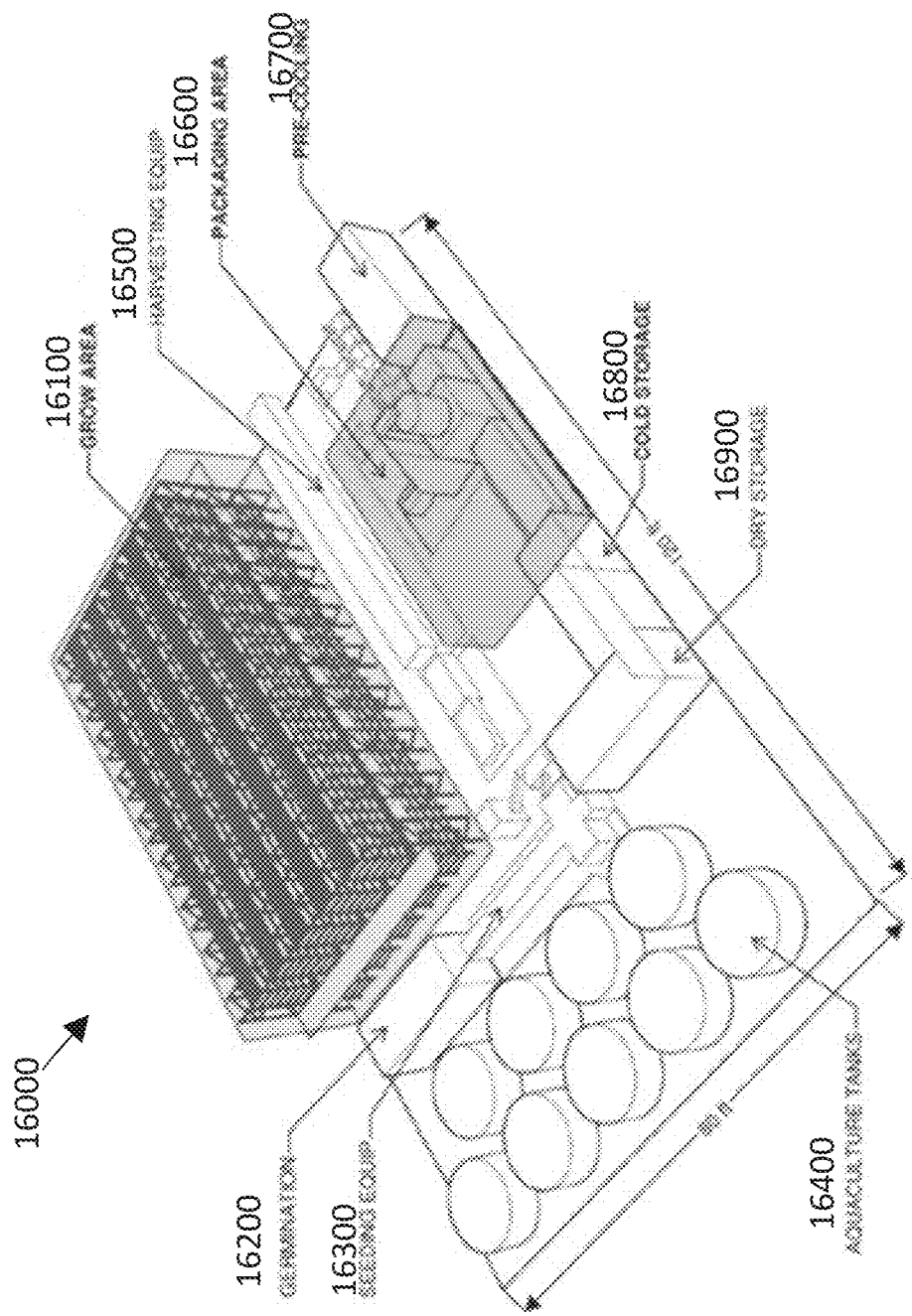
FIG. 16 shows a schematic of an indoor farming system including a vertically-stacked growing system.

FIG. 16 shows a schematic of an indoor farming system 16000 including a vertically-stacked growing system 16100 that can be substantially similar to any of the systems described above. The growing system 16100 receives germinated plants from a germination area 16200, where a seeding equipment 16300 plants seeds into rafts for the seeds to germinate. The nutrients to grow the plants are received from tanks 16400. In one example, the tanks 16400 can include pre-mixed nutrient growth culture. In another example, the tanks 16400 can include one or more fish tanks, where fish can grow and provide the plant nutrient growth culture. In addition, the fish tanks can also provide waters to water-cool LED lights in the growing system 16100.

The farming system 16000 also includes harvesting equipment 16500 to harvest mature plants delivered by the growing system 16100. The harvested plants can be sent to a pre-cooling area 16700. An optional dry storage area 16900 in the system 16000 can be used for long-term storage of other materials and supplies needed for the operation of the farming system.

The growing system 16100 can be substantially similar to any of the growing systems described above. In some examples, additional components can included to for environmental control. There may be aspects of a material handling architecture that can either prevent a closer spacing of shelves or are caused by closer shelf spacing. Issues preventing the closer spacing of shelves can include: (a) the height of lights structure and other components; (b) increased heating of the plants due to less distance between lights and the plats; (c) the ventilation of a small space to bring in carbon dioxide and remove heat and humidity (which can influence optimal plant growth); and (d) the depth of the pond.

The depth of the pond for embodiments disclosed herein has been reduced compared to deep water culture, and this allows for moving shelves closer together. The disclosed embodiments can be configured to avoid issues associated with such shortened ponds that could otherwise have problems, including reduced oxygenation of the water, reduced capacity to buffer changes in temperature, pH and other water chemistry, and gradients in nutrient availability.

The height of various system components can have a direct relationship to the overall space between shelves. The relevant components from bottom to top can be: the structural supports, the decking of the shelf, the height of the pond walls (and indirectly the height of the water), the space for the fully grown plants, an air gap for ventilation and variation in plant height, and the lights. By embedding the lights into the empty space between the structural supports, the height of the shorter of those two components can be reduced or eliminated. This can be accomplished partly through novel illuminators, such as LED lights. In some cases, the shelves may be adjustable, either manually or otherwise, to accommodate different implementations (e.g., growing plants of varying heights).

In some examples, the heat generated by artificial lights can be the major heat source in the space. If left unchecked, this heat can raise the air temperature beyond the upper limit tolerated by the plants. Heat dissipation can thus become an important factor in determining ventilation requirements. In some examples, water-cooled LED lights can be used. This method combines energy efficient LEDs, which produce less heat, with a more efficient heat removal system compared to ventilation. This water can also be, for example, routed to fish tanks to keep the temperature of tanks at optimal conditions for fish growth without the use of additional water heaters. Additionally, in some examples the lights can be in contact with and thermally coupled to the decking above to transfer the heat from the LEDs to the pond water to keep pond water and LEDs at optimal temperature in a passive manner. The reduction in the heat load can reduce power consumption for ventilation. In some cases, active dissipation (e.g., via air flows) can still be used to, for example, remove heat and water vapor introduced by the plants and replace carbon dioxide used by the plants.

Without proper ventilation, the plants may create an environment unsuitable for their continued growth. In some examples, as the shelves get closer together, natural ventilation of the plant environment becomes restricted and the need for mechanical ventilation may increase. Shelves of plants can be ventilated by fans moving air along the long axis of the shelf. This may result in gradients of temperature, humidity, and carbon dioxide as the air that moves across the plant canopy is depleted of carbon dioxide and altered from optimal temperature and humidity as the plants perform gas exchange with the air. These gradients can reduce growth rates of plants because only a small section of the shelf is under ideal conditions.

By moving rafts into and out of the ponds on the ends, fans or a duct with periodic openings can be placed along the long axis of the shelf. This is normally prevented by the need to access the plants along this side in conventional systems. The performance of longitudinal fans can be improved by placing fans at multiple points along a shelf which can allow them draw in more air outside the shelf. However, this approach can also use additional height to fit the fans between the plants and the lights. By placing the mechanical ventilation along the long axis, these gradients are reduced to negligible levels due to the distance air travels across the plants being reduced by orders of magnitude. For example, in one configuration, the distance is reduced from 80 feet to 4 feet. The reduced gradients can improve crop growth throughout the system. In some embodiments, sensors and valves (connected to one or more processors) can be utilized to automatically/programmatically control and maintain desired ventilation conditions.

In addition to improved crop growth, ventilating from the side can also reduce the air gap above the plants. Plants can typically only tolerate a small range of air velocities without suffering mechanical damage or having their growth pattern negatively affected. The volumetric flow rate of the air can be determined based on the requirements to bring new air to control temperature, humidity, and carbon dioxide levels. Moving across the short axis reduces this requirement because the air has less distance to be changed before being exhausted. Air velocity and volumetric flow rate are related by the cross sectional area of the space the air is moving through by the following equation: Volumetric Flow Rate=Velocity×Cross sectional Area. The cross sectional area is the height of the air gap multiplied by the width of the air gap. By moving air across the long axis instead of along it, the width of the air gap can be much longer, enabling a shorter gap with the same cross sectional area and thus the same velocity and flow rate. Additionally, the reduced flow rate requirements reduce the required cross sectional area which reduces the height of the gap.

Plumbing in Vertically-Stacked Growing Systems

The simplest plumbing configuration for a long narrow pond is to pump in water at one end and drain it from the other. However, in the shallow water culture as described herein, this can result in nutrient gradients as plants near the input take more nutrients and the roots of those plants block nutrient flow through the pond. In some examples, these gradients can be controlled and reduced by, for example, utilizing a customized pond with nutrient apertures, and/or by running one or more pipes or tubes along the bottom of the pond with holes along the length. Setting the size and/or spacing of those apertures/holes appropriately, water and nutrients can be added throughout the pond isometrically, i.e., with the same inflow rate to each portion of the pond. The pipe(s) or tube(s) can be straight or can follow a sinusoidal and/or other pattern.

In some examples, the pond can be configured with sensors and controls such that nutrient deficiencies in certain locations of the pond can be addressed individually. For example, if a processor, running a program and connected to a series of sensors and actuators, identifies a nutrient level outside of specified parameters, the program can issue instructions to one or more actuators to increase the nutrient level to a specified portion of the pond.

In the system shown in FIG. 16, water for the pond can be oxygenated to provide oxygen to the plant roots. A standard method of adding oxygen to water is through the use of air stones. However, air stones may be less effective in a short depth as disclosed herein because there may be insufficient time for the air bubbles to dissolve in the water before reaching the surface. Injecting air into the plumbing prior to the ponds allows time for the oxygen to be dissolved into the water, providing adequate oxygen to the plant roots. Additionally, as with the nutrients, some embodiments of the disclosure may use a processor-implemented system for monitoring and maintaining oxygenation throughout the pond within specified parameters.

As discussed above, some examples reduce the height of the water and can therefore be more efficient. However, the reduction in height of the water also reduces the volume of water in the system, and in turn can reduce the water's ability to buffer changes in water chemistry, such as pH or ammonia and nitrite levels. For example, adding 0.0003 L of ammonia to 0.9997 L of water changes the concentration of ammonia from 0 ppm (part per million) to 300 ppm. Adding the same amount of ammonia to 99.997 L of water changes the concentration of ammonia from 0 ppm (part per million)

to 3 ppm. The concentration of some compounds is what determines the effect. pH affects the ability of plants to uptake nutrients, while ammonia and nitrite are poisonous to fish and plants until it is converted to nitrate.

As disclosed herein, the reduction in buffer can be counteracted by increasing the size of the pump tank and/or increasing the flow rate of the water through the system to improve the effectiveness of the biological filters, which control these levels. The reduction in height of the water can also reduce the ability of the water to act as a temperature buffer for the water and maintain the appropriate temperature for the roots. According to some examples, this can also be mitigated by increasing the flow rate of the water.

Additionally or alternatively, water used to cool the lights can be routed into the ponds to transfer the heat from the lights into the water and maintain a higher temperature. In some implementations, processor-implemented methods, along with sensors and actuators, can be used to provide precise control over such parameters, as discussed above with reference to oxygenation and nutrients. For example, when temperature sensors measure a temperature below a specified parameter, the processor can issue an instruction to a valve to redirect some or all of the LED-heated water to a pond or portion thereof. This can be done continuously until the measured parameter is back within range or can be done stepwise/incrementally to avoid overshooting the desired temperature. Additionally or alternatively, the lights can be thermally coupled to the decking 75 in order to transfer heat to the pond water of shelf above and provide greater thermal dissipation for the lights.

Processor-Executed Methods

Some examples of the disclosure include method and systems that utilize a pond routing algorithm or process. Such a process or algorithm can be utilized for routing individual rafts into and out of ponds, based on a variety of parameters, such as: (a) keeping rafts in the ponds for specified times, such as a multiple of 7 days (or an alternating number such as 10 and 11 days that adds up to a multiple of 7 days, etc.), so that the same harvest and delivery schedule can be carried out on a weekly basis; (b) the length of time in the ponds plus the length of time spent in a germination area before the ponds can be chosen in general to optimize yield per square foot of growing space per time.

In some examples, each pond can be set up to contain only one species, in order to optimize the environmental conditions for that species. In some examples, multiple species can be used together if they are symbiotic, and such information recorded and tracked.

In some examples, when rafts are harvested, the order of harvest can follow the makeup of the finished product stock keeping unit (SKU). Many SKUs can be a mix of several crops, and each individual crop can be included in multiple SKUs. In some examples, to harvest by SKU, first all the rafts of the first crop in that SKU are harvested, then the next crop, and so on. In some other examples, the rafts for a particular SKU can be harvested in an order that optimizes freshness/taste. The harvest order can also be configured to minimize changeover time on both the harvesting machine (e.g., changing the height of the cutting blade, in between crops, somewhat costly in terms of time), and on the washing, drying and mixing steps (removing excess product, in between SKUs, very costly in terms of time). Some examples can be configured such that each SKU exactly or approximately includes specified proportions of ingredient crops that define the SKU.

Some examples described herein can include mobile sensors in a vertically stacked growing environment. In these cases, instead of having many sensors installed above each growing layer, a small number of "sensor assemblies" (e.g. one for multiple growing layers) are able to move along rails installed next to or above each growing layer, such that each layer is connected to adjacent layers via rails. Multiple sensor assemblies are able to move along the rails and thus throughout the entire growing area.

Sensors that can be used herein include, for example, imaging sensors, such as thermal imaging sensors, fluorescent imaging sensors, hyperspectral sensors, multispectral sensors, RCSB sensors, and Light Detection and Ranging (LIDAR) sensors, among others. Sensors for detecting the distance between the sensor assembly to the rafts can also be used. These sensors can be a proxy for yields as higher-yield rafts sink deeper in the ponds. In some examples, the system can use air chemistry sensors to measure temperature, humidity, and/or $CO_2$ in the area near the plants or in the ambient environment. In some examples, light sensors can be used for detecting performance or degradation of light fixtures. In some examples, sensors for identifying the location of individual rafts can be used to track the location of plants. In yet other examples, the sensor assembly may include one or more communication devices to communicate sensor information from the sensor assembly to one or more computing devices and/or other sensor assemblies, and/or receive information from one or more computing devices and/or other sensor assemblies.

In one example, these sensors can be placed on rails for the sensors to move from one shelf to another. Alternatively, sensors can be fixed instead of being mobile. In yet another example, mobile sensors can move throughout the growing area on unmanned aerial vehicles (UAVs) instead of rails.

Some examples described herein can include improved raft design that (a) use less media, (b) provide a better moisture profile for the plants, and (c) enable growing microgreens (7-14 day old crop) as opposed to baby greens (14-28 day old crop). Existing rafts feature either holes or slots. In one example, a raft can incorporate a common "top area" in which the root structure and surrounding media of each crop is connected horizontally to those of its neighbors, thus allowing a horizontal capillary wicking action in addition to vertical action. In another example, a raft can have slanted rather than vertically straight slots. This can balance moisture at the stem-root junction of the plant (since moisture at this junction and above can cause the plant to rot) while also minimizing the thickness of the raft and thus the amount of media used.

In some cases, the rafts can be injection blow molded plastic or otherwise molded plastic, rather than a foamed polystyrene resin, enabling the trays to last about five times longer. These trays also tend not to deform when subject to heat, and can be easier to recycle. Various air gaps can also be used in the profile of the raft.

Material Handling Process Using A Vertically-Stacked Growing System

Figure 17:
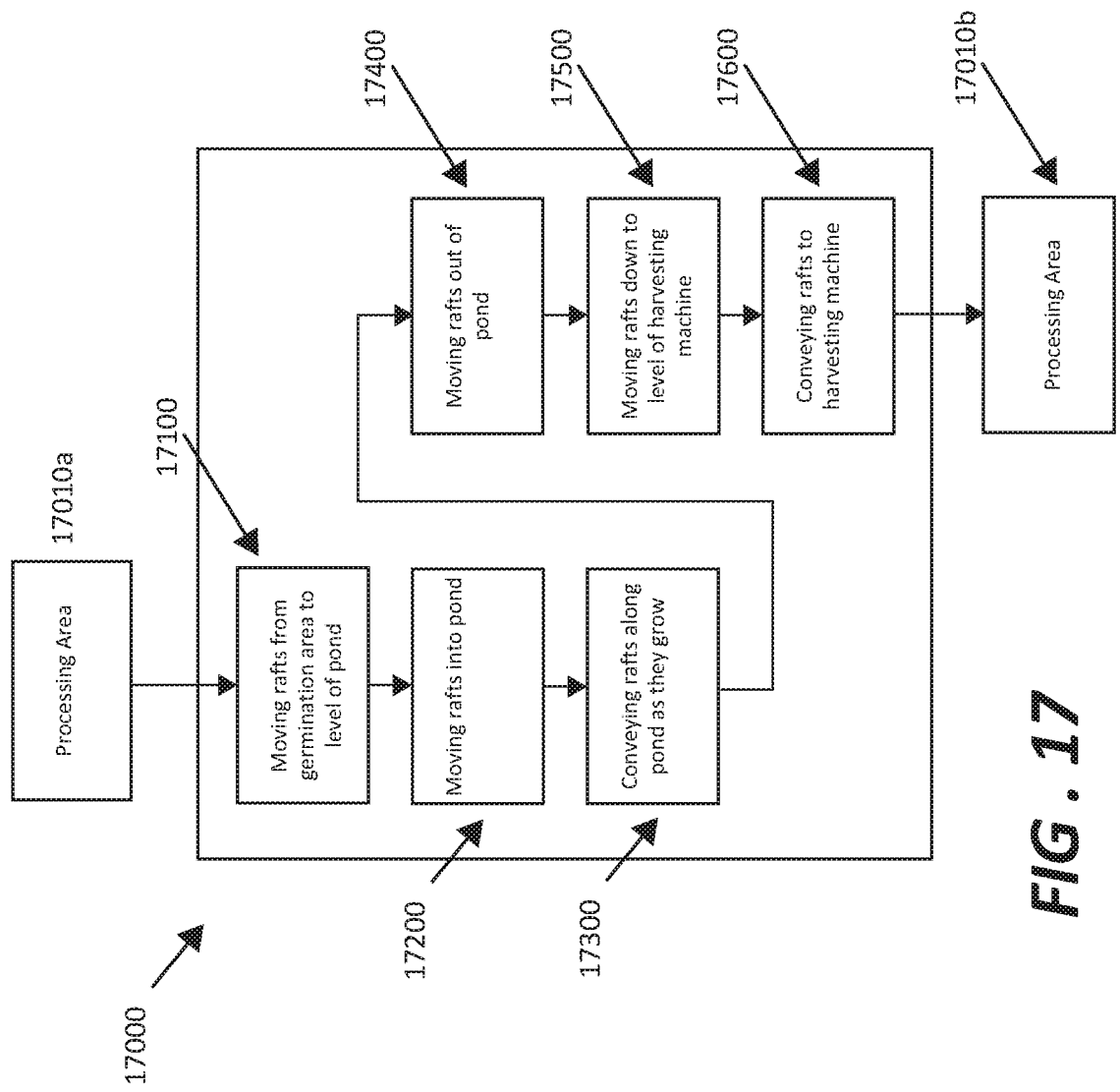
FIG. 17 illustrates a method of indoor farming using a vertically-stacked growing system.

FIG. 17 illustrates a method 17000 of material handling using a vertically-stacked growing system including processing areas 17010a and 17010b. The method 17000 includes, at step 17100, moving rafts from germination area (e.g., area 16200 shown in FIG. 16) to the level of ponds in the vertically-stacked grown system. The rafts are then loaded into the corresponding ponds, at step 17200. At step 17300, the rafts are conveyed along the ponds as the plants disposed in the rafts are growing. Once the plants are mature and ready for harvesting, the rafts are unloaded off the ponds, at step 17400. The unloaded rafts are transferred to the vertical level of a harvesting machine, at step 17500. At step 17600, the rafts are loaded into the harvesting machine for harvesting. More details of each step are described below.

Moving Rafts to Different Vertical Shelf Heights

Figure 18:
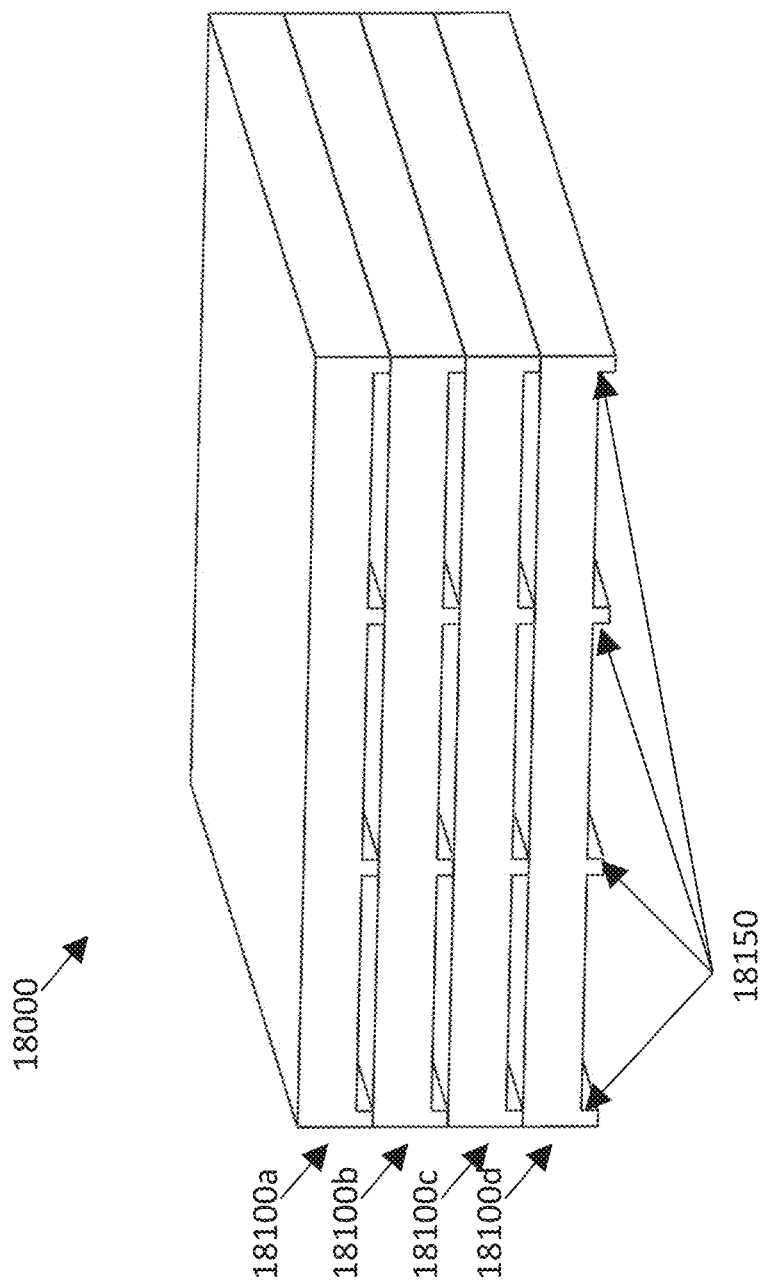
FIG. 18 illustrates a stack of rafts in germination that can be used in the method illustrated in FIG. 17.

In some cases, rafts can be initially stored in vertical stacks in a germination room so save space. FIG. 18 shows a stack 18000 of four rafts 18100*a*, 18100*b*, 18100*c*, and 18100*d* (collectively referred to as rafts 18100). Each raft 18100 includes spacers 18150 (also referred to as feet 18150) on the bottom, allowing for an air gap between adjacent rafts 18100 in the stack 18000. In this manner, the rafts 18100 can be stacked together without any shelving structure. This configuration also facilitates loading each raft 18100 into the growing system since there can be no need to move any shelf structure. Once the rafts are ready to be moved to the ponds (e.g., when the seed are germinated), they can be de-stacked and shuttled up to the vertical growing layers.

FIGS. 19A and 19B show a schematic of a vertical reciprocating conveyor 19000 to convey the rafts. In this technique, a raft 19100 can begin in a stacked position, resting within of on top of a de-stacker. The de-stacker can release the raft 19100 out of the stack of rafts from the bottom of the raft and place the released raft onto a short conveyor. The raft 19100 is then conveyed onto an arm 19200 of the vertical reciprocating conveyor 19000. The arm 19200 includes wheels 19250 to facilitate conveyance of the raft 19100. In some cases, the arm 19200 can be attached to or is able to vertically slide up and down along the end face of the growing shelves. The raft 19100 and reciprocating arm 19200 can be put on horizontal rails if not attached to the ends of the shelves. Once the arm 19200 reaches the level of the desired growing layer, the arm 19200 can either tilt down or flipper at the end of the arm is released, such that the raft 19100 slides down into the ponds.

FIG. 19B shows a schematic of the arm 19200 attached to a growing shelf 19300, which includes a ramp 19500 to receive the rafts 19100. The ramp 19500 includes a set of underwater rails inside the inner edge of the pond in the growing shelf 19300 to prevent the top of raft 19100 from dipping underwater. The arm 19200 of the vertical reciprocating conveyor with rails can have free spinning wheels 19250 for the raft to slide across. If the pond has multiple lanes, then the arm 19200 can be designed to carry multiple rafts 19100 (the same as the number of lanes). The arm 19200 can also be hinged on the side closest to the growing shelves 19300, such that they can be rotated upwards for storage when not in use, thus allowing walkway access.

Loading Rafts into the Ponds

In some cases, moving rafts into the pond can be different from moving rafts out of the ponds because the plants typically have only just sprouted in the former case. Accordingly, the plants are usually smaller but more delicate at the loading stage, compared to the plants at the unloading stage. Plants at this stage also typically lack large root systems protruding from the bottom of the raft. The short height of the raft and sprouted plants (if any), as well as the lack of any protruding roots, means that moving rafts into the ponds can be less complex than moving them out.

Several physiological and food safety requirements can be used as parameters for this component or step, including: (a) avoiding mechanical damage to the plants and/or the structure of the growing media; (b) avoiding dipping the top of the raft into the water; and (c) preventing the raft from getting water onto the top of other rafts, for example, through dipping or splashing.

Depending on the implementation, loading rafts into the ponds can be accomplished by several methods. In one example, a ramp can be used to load the raft into the pond (see, FIG. 19B). In some cases, the ramp can be powered and function as a conveyor. In some other cases, the ramp can be non-powered and function as a slide such that raft can slide into the pond under gravity force.

In another example, a robotic arm can be used to lift the rafts over the lip of and into the pond. In some cases, the robotic arm can lift the rafts from below. In some cases, the robotic arm can squeeze the raft from the side, in which case the raft can be placed on a rail leading to the ponds. In some cases, the robotic arm can lift the rafts from above via, for example, using suction forces.

In yet another example, the raft can be loaded into the ponds via a weir. These techniques can offer substantial, material improvements compared to manual methods, as they can increase both the speed of the operation and reduce the possibility of human errors. The danger of human error usually leads to a wider gap between vertical growing layers in order to accommodate variations in the manual placement of rafts into the ponds while respecting parameters (a), (b), and (c) above.

Moving Rafts Through the Pond

In some cases, moving rafts through the ponds is employed to fill the ponds with rafts. In this case, a new raft is loaded into the pond via one end and another raft in the pond can be removed from the other end of the pond. This end loading and unloading allow the use of small spacing between vertical growing layers because there is typically no need to handle the rafts from the side of the shelves.

Various techniques can be used to move the rafts along the length of the growing shelf, as well as to prevent the raft from moving backwards in the pond and from rotating in an unwanted way. In one example, the raft can be moved along the pond via flows of the growth culture in the pond. To this end, a water pump can be used to drive the flow with desired velocity and volume. The water pump can induce the flow at the beginning of the pond where rafts are loaded into the pond) to push the rafts. Alternatively or additionally, the water pump can induce the flow at the end of the pond (i.e., where rafts are unloaded) to drag the rafts.

In some examples, adjacent ponds on the same shelf are connected and water flow can be powered with either two pumps or a reversible pump to cause the net flow of water to increase such that flow rate is high enough for rafts to be floated over a weir.

In another example, the rafts can be moved along the pond using air flows. Similar to water pumps, multiple air pumps can be used to create lengthwise air flows. In some cases, the air flows are at the height of the rafts (not the plants in the rafts) so as to avoid damaging the plants. In some cases, the air flows can induce fluid flows in the pond, which in turn, can also drive the raft along the pond. In some cases the last raft in the sequence can have a sheet of material attached. The sheet of material can act as a sail to catch the air flow, and can also protect the plants from damage due to high air velocities.

In yet another example, a manual pusher or an automatic pusher can be used to push new rafts into the ponds to drive those rafts already in the pond. This method can also be used to remove rails from the end of the pond, as new ponds are pushed into the pond.

In yet another example, a mechanical pusher can be used to move rafts in the desired direction (see, e.g., FIG. 8). In yet another example, the rafts can be linked together (e.g., via hooks) back to back such that removal of rafts from the far end can pull other rafts along the length of the pond.

In some cases, additional devices or components can be used to prevent the rafts from moving backwards and/or rotating. In one example, dividing walls or cables can be used to separate the ponds into multiple rows (or lanes). Each row or lane can have a width substantially equal to the width of the rafts such that the rafts may not rotate in the lane. In another example, a material having the property of asymmetric friction along a single axis can be used (i.e., one friction along the forward direction and a different friction along the opposite direction). This material can be attached to the side walls of the ponds and/or to any dividing walls in the pond. For example, a set of angled bristles running the length of the side walls can be disposed in the pond to prevent backward floating of rafts.

Figure 20:
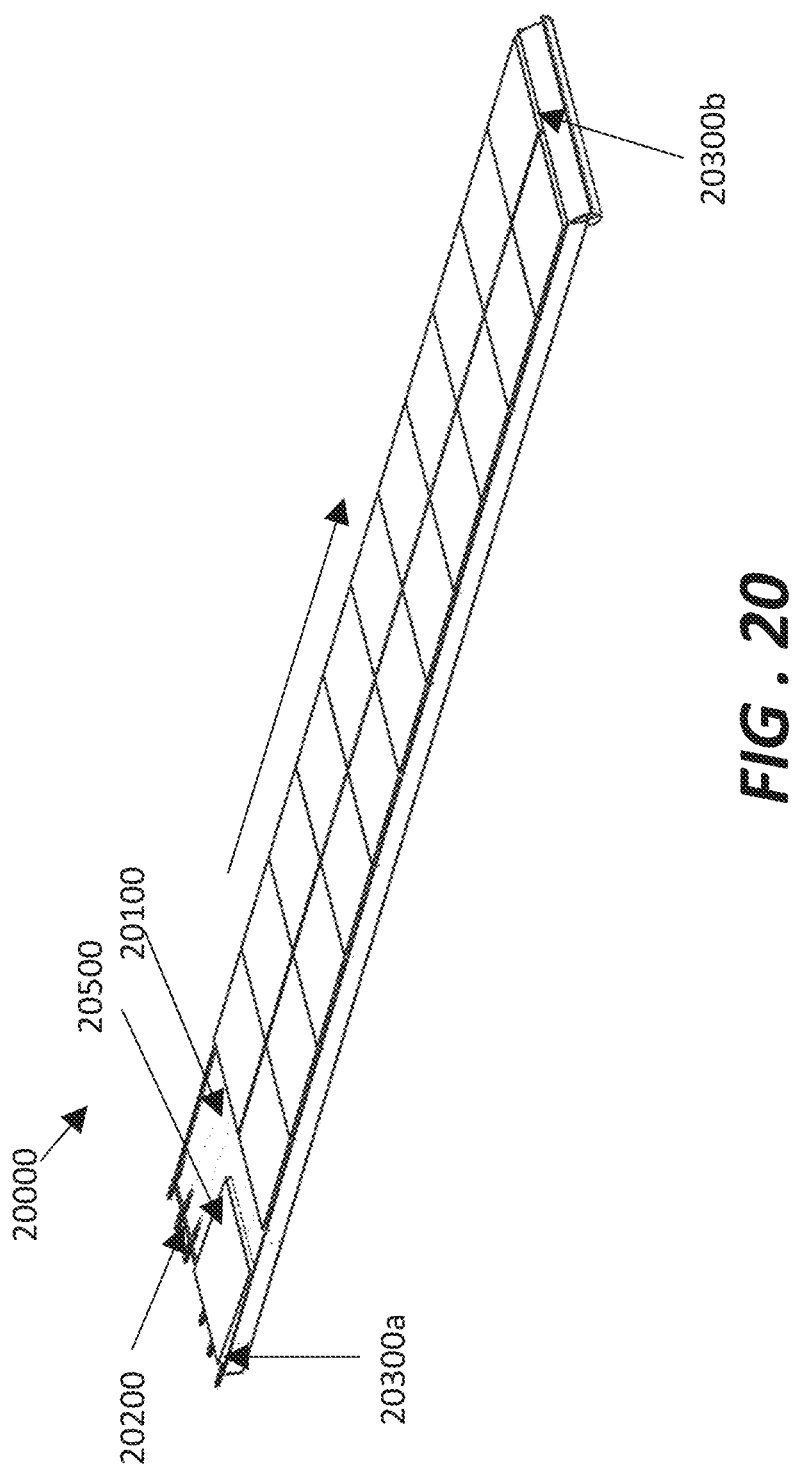
FIG. 20 shows a schematic of a system including a pond filled with rafts loaded from one end of the pond and unloaded from the other end of the pond.

FIG. 20 shows a schematic of a system 20000 including a pond 20100 filled with rafts 20500 loaded from one end (also referred to as the receiving end) of the pond 20100 and unloaded from the other end of the pond 20100. The pond 20100 includes a ramp 20200 at the receiving end to facilitate loading of rafts 20500. The pond 20100 also includes two end walls 20300a and 20300b. The end wall 20300a is higher than the end wall 20300b, in which case rafts 20500 can be removed from the pond 20100 by floating out of the pond 20100. In the system 20000, the rafts 20500 can be moved along the length of the pond 20100 (as indicated by the arrow above the pond 20100) using any of the methods described above. In some cases, the water level in the pond 20100 can be adjusted to reveal air gaps between the rafts 20500 and the pond 20100. In one example, this can be done by having the raft 20500 suspend themselves above the lowered water level and stand on their own feet. In another example, the rafts 20500 can stay on some rails.

Unloading Rafts Out of the Ponds

Moving rafts out of the pond properly can have significant influence on the farming system including the yield and sanitary conditions of the crops. This process is different from moving the rafts into the ponds because the plants are typically much taller and can have extensive root systems protruding from the bottom. There are several parameters for moving the rafts out of the pond, including: (a) avoiding damage to the plants to maintain product quality; (b) avoiding damage to the roots to maintain turgidity of plants and subsequent ability to harvest with automated equipment; (c) avoiding dipping the plants or the top of the raft into the water to maintain food safety standards; and (d) preventing the raft from getting water onto the plants of another raft (for example through dripping or splashing) to maintain food safety standards.

Figure 21:
FIG. 21 is a photo of a mature tray of baby greens with roots hanging through the raft.

FIG. 21 shows a mature tray of baby greens with roots hanging through the raft. Methods and systems described herein can protect the roots from damages to maintain turgidity and thus harvestability of the plants.

Figure 22:
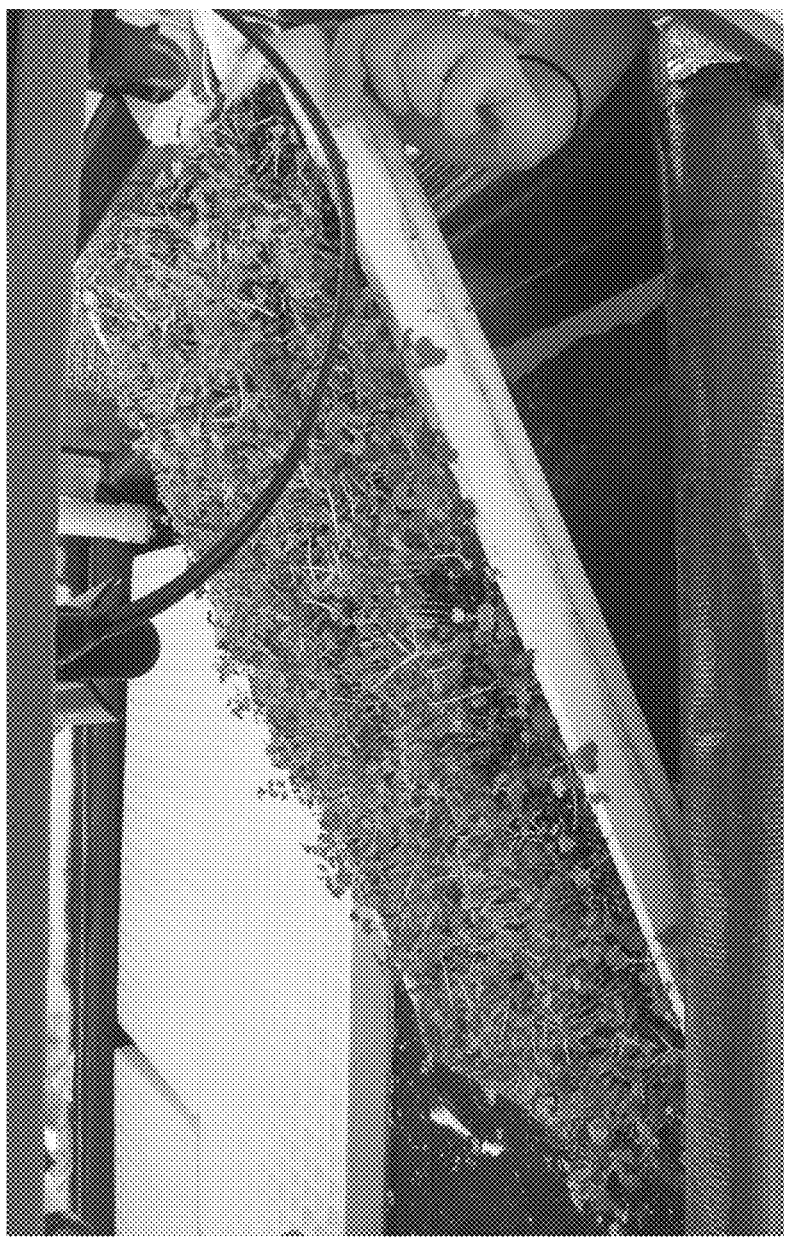
FIG. 22 is a photo of a tray of micro greens being removed from one end of a pond with a portion of the top of the raft and plants dipping into the plant nutrient solution to illustrate the risk of food contamination.

FIG. 22 shows a tray of micro greens being removed from one end of a pond. As can be seen, when removed manually, there is a great risk of dipping the backside (left side in FIG. 23) of the tray into the water due to the density of the shelves. If the leaves touch the pond water, food safety is compromised, and they are no longer a harvestable product.

Figure 23:
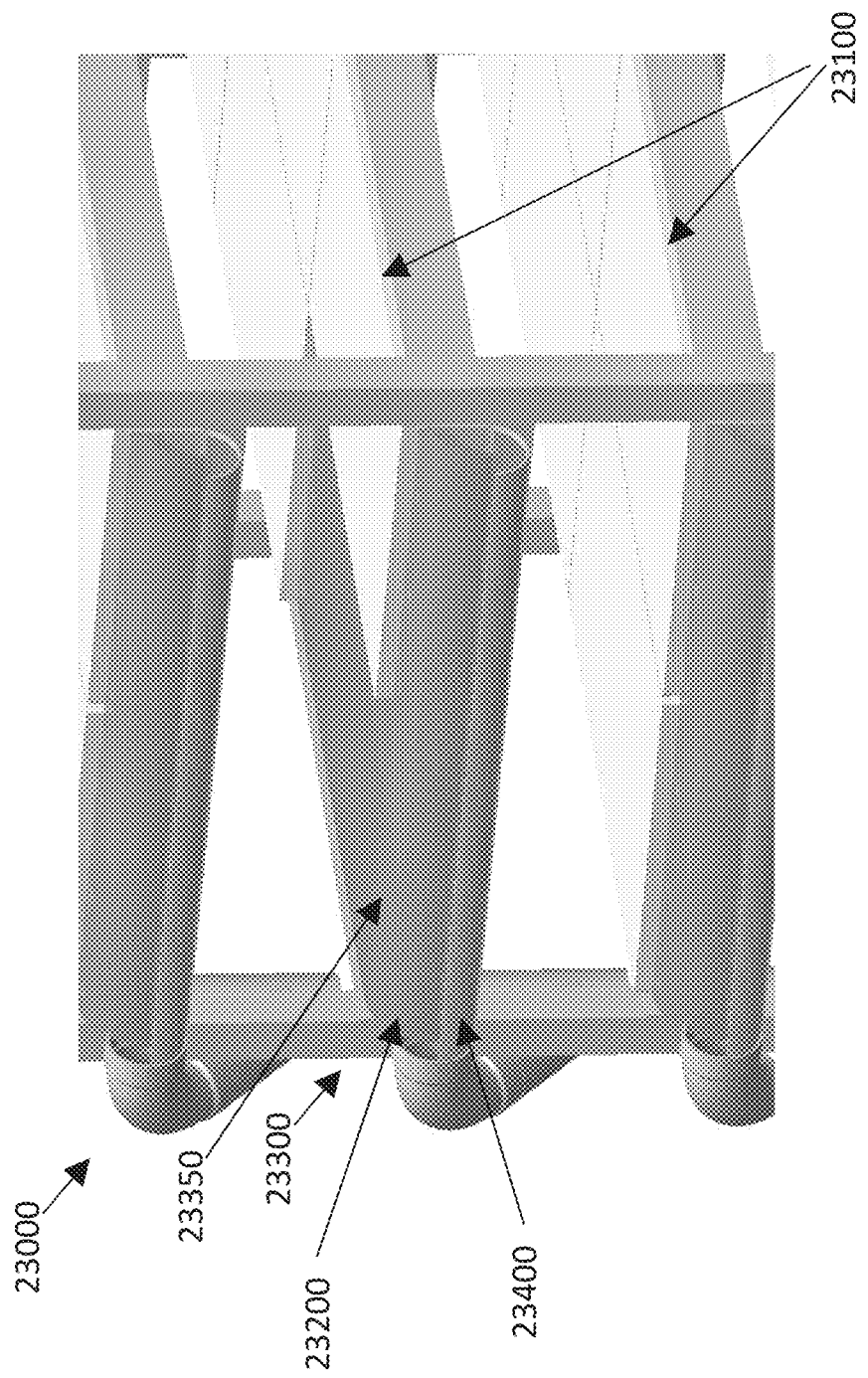
FIG. 23 shows a schematic of a growing shelf including a weir structure to unload rafts from a growing pond in the growing shelf.

FIG. 23 shows a schematic of a system 23000 using a weir structure 23200 to unload rafts 23100 from water ponds 23350 in a growing shelf 23300. In the system 23000, the side walls of the pond 23350 are higher than the end wall over which the rafts 23100 are conveyed. A catchment area 23400 on the outside of the pond 23350 can be used to collect and divert the water.

In some examples, the flow rate of the water can be increased in order to allow the rafts to float over the weir without contacting the weir. In some examples, the flow can be kept at a level such that there is a minimum overflow of water above the weir. In these examples, the purpose of the shortened wall of the weir is to reduce the distance a raft is raised in order to be removed from the pond.

In some examples, a processor can be used to manage water level so as to facilitate the unloading of the rafts 23100, as there can be a substantial amount of calculations to determine the amount of water added to the pond 23350 per unit time in order to optimally raise the level of the water above the height of the weir 23200. To keep rafts from moving past the weir 23200, a gate (not shown in FIG. 23) can be used. The gate may go across the entire width of the raft 23100, or may go across only part of the raft 23100. In some cases, the gate may be mechanized or spring loaded for opening and returning to original positions once a raft 23100 is removed.

When the rafts 23100 is pushed through (e.g., by some pushing or pulling component or means), the particular raft 23100 moving out of the pond 23350 can be pushed onto arms or onto a holding rack, allowing the water to pour over the weir 23200 into the catchment area 23400, while the raft remains level. In one example, these arms can be stationary and attached to each shelf to receive the raft 23100. In another example, these arms can be mobile and attached to a vertical track on the end of the shelving system, allowing the arms to move up and down to pick up a raft from any of the shelves.

In some examples, rafts can be removed by maintaining the water level and retracting or removing a gate to allow horizontal movement. The gate can, for example, retract like the doors of an elevator, or it can retract by flipping open. There can be a substantial amount of calculations to determine how deep the gate may retract and how much water, if any, should be added to the pond per unit time in order to optimize the unloading process. Accordingly, in some cases, a processor and one or more sensors can be used to perform the calculation. The sensors can include, for example, water level sensors and root-length sensors. In some cases, a second gate, and associated arms or holding rack, as described above, can be used for the purpose of controlling when rafts move past the first gate.

In some examples, rafts can be removed by a ramp, either powered like a conveyor or non-powered like a slide. The ramp can be substantially the same as the ramp 19500 shown in FIG. 19. Additionally, in some examples, the operator or a mechanized solution can introduce rafts at the loading side that push the rafts on the offloading side up the ramp. In some examples, rafts can be removed by a robotic arm that lifts the rafts over the lip of and out of the pond, either by lifting from below, squeezing from the sides, or using suction from above.

The unloading techniques described herein are advantageous over manual unloading because they can reduce or eliminate human error and increase speed. The danger of human error usually leads to a wider gap between shelves, and therefore a lower yield per area and volume of real estate. In particular, usage of a weir or similar method does not require the raft to move upwards to go over the pond wall or come out of the water, thereby eliminating the risk of splashing or dripping onto other rafts and also eliminating the need to increase the space between shelves for the lifting action.

Moving Rafts from Different Shelf Heights to the Height of Harvesting

In some cases, moving the rafts from multiple different heights to a single common height, without the use of manual methods such as human workers on a scissor lift, can be helpful to reduce the operating costs of the farming system. Parameters for moving the rafts from multiple levels to one level include not damaging any part of the plant, either the leaves or the roots. The leaves are the salable product, so any damage can reduce yields. Damage to the roots can cause the plants to lose turgidity, which cause the leaves to droop and may prevent the harvesting machine from harvesting them. Another parameter is that the roots of one raft may not drip onto the plants of another raft, to preserve food safety and avoid contamination.

In some examples, dual use of vertical arms for both catchment of rafts and conveying of rafts to another vertical level can be utilized (see, e.g., FIGS. 15A and 15B). The arms described above to catch rafts as they pass over a weir can also be used to convey the rafts down or up to a different level. The arms can be attached to or are able to vertically slide up and down the end face of the growing shelf Once a raft has been deposited via the weir onto the arms, the arms can slide up and down to move the raft to a different vertical level. In some examples, the pond can have multiple lanes. In this case, the arms can be configured to hold multiple rafts. Once the arms reach the level of the harvesting machine, the raft can be discharged, for example, by tilting downwards or by opening a set of flippers at the ends of the arms, into a flume conveyor (see, e.g., FIGS. 24A and 24B).

In some examples, a set of underwater rails can be used to prevent the rafts from dipping too deep into the flume. The arms can, in sonic implementations, have free spinning wheels for the raft to slide across (e.g., like the rails 19200 shown in FIG. 19B). In some cases, the arms can be hinged on the side closest to the growing shelves, such that they can be rotated upwards for storage when not in use, thus allowing walkway access.

In some examples, a solid, open-bottomed conveyor can be used as the horizontal conveyor instead of the flume. In this case, extra supports within the body of the horizontal conveyor may be used to discharge the raft into the conveyor. Alternatively, a non-reciprocating vertical conveyor can be used to move the rafts between levels, passing through the horizontal conveyor and coming up via a circular motion. In this instance, the non-reciprocating vertical conveyor can be installed in addition to the catchment arms.

Other methods and systems for moving the rafts from multiple different heights to a single common height according to the disclosure include a reciprocating or non-reciprocating vertical conveyor, or an inclined conveyor or inclined flume between levels. Using a vertical conveyor saves space compared to an incline conveyor. The vertical conveyor is also capable of reaching each level with a single device and motion, and has the ability to move rafts from lower shelves up and from higher shelves down with the same motion. The vertical conveyor can be placed on a horizontal track shuttling the conveyor to the ends of different growing systems. The vertical conveyor(s) can be freestanding or attached to each shelf.

Yet another example may utilize manual unloading (while standing on a lift) and a reciprocating or non-reciprocating vertical conveyor. Both the lift and the reciprocating conveyor can be placed on a horizontal track shuttling them as a unit to the ends of different growing systems. In some cases, drip trays can be used during unloading and vertically conveying rafts. The purpose of drip trays is both to prevent the roots from one raft dripping onto rafts or other items below, and also to keep the roots hydrated and moist during their transit from the growing ponds to the harvester and processing area. Drip trays can be designed to hold one or more rafts, and can be designed to leave a gap between the bottom of the drip tray and the bottom of the raft so that there is space for roots. This gap can be achieved with features either on the raft (such as feet) or on the drip tray (such as ridges). Drip trays can either be permanently attached to a vertical conveyor, or there can be a new drip tray associated with each row or rows of rafts exiting the ponds.

Moving Rafts from the Growing Area to the Harvesting Machine

In some examples, moving the rafts from the growing area to the harvesting machine is the last step and, done properly, ensures the quality of the harvested product. This step can have the same parameters as above: not damaging any part of the plant, either the leaves or the roots, and the roots of one raft must also not drip onto the plants of another raft.

Figure 24A:
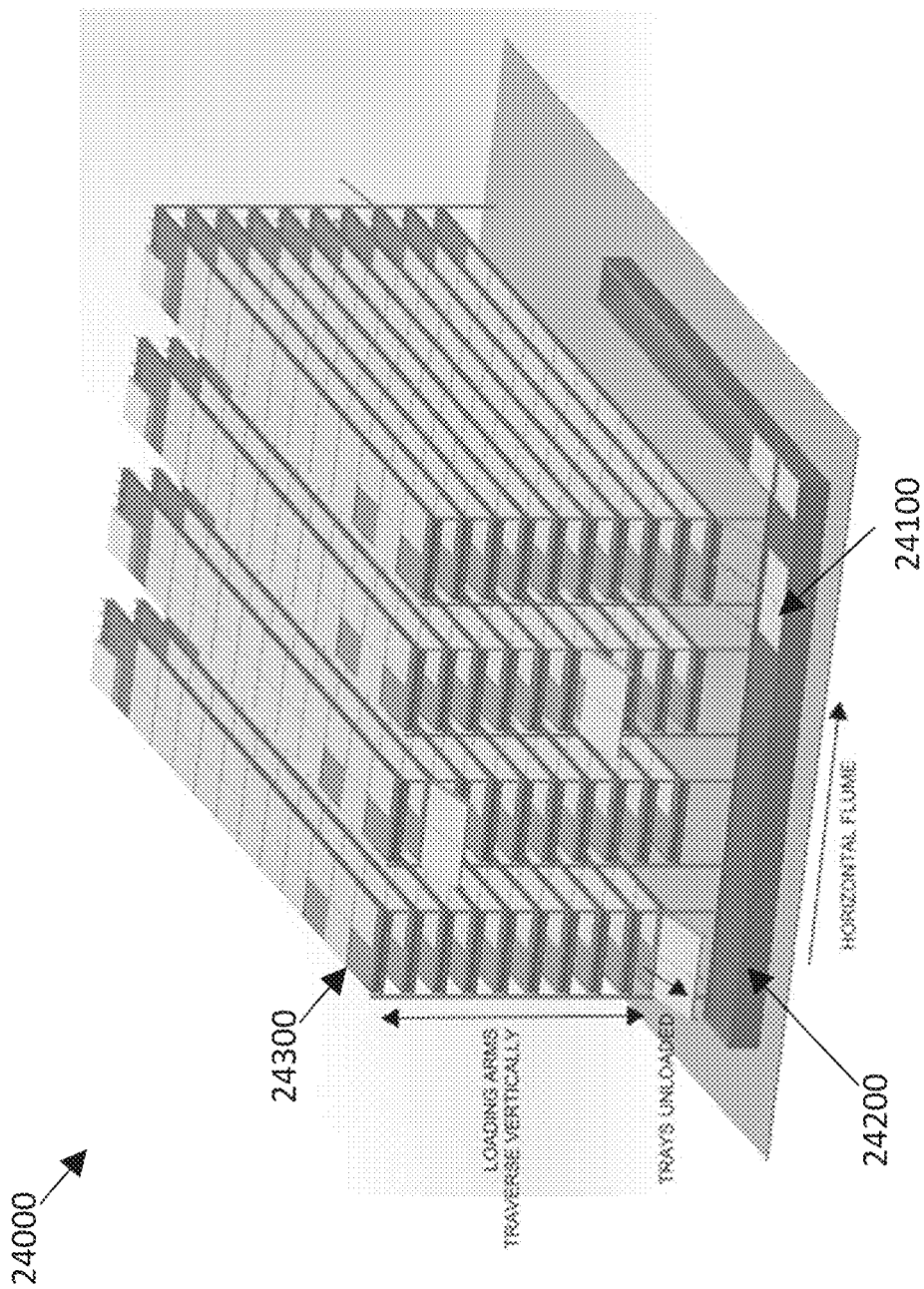
FIGS. 24A and 24B illustrate a schematic of a growing system using a flume for raft conveyance.
Figure 24B:
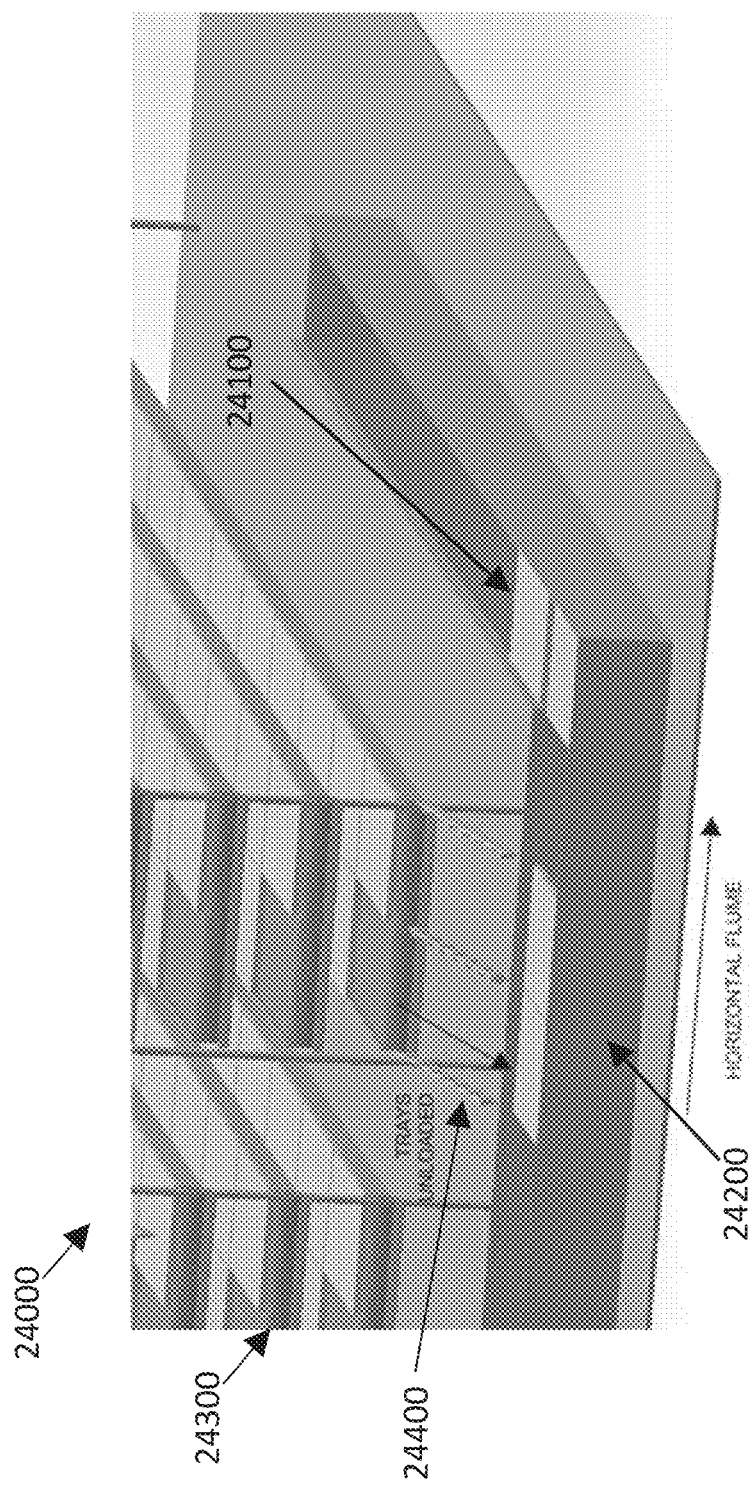

FIGS. 24A and 24B show a schematic of a growing system 24000 using a flume 24200 for raft conveyance. The system 24000 includes multiple growing shelves 24300 where rafts 24100 are placed for growing plants. Rafts 24100 with mature plants are unloaded (e.g., via rails 24400 shown in FIG. 24B) to the flume 24200, which conveys the rafts 24100 toward, for example, a harvesting machine using water flows. Element/components discussed above (e.g., the weir, the ramp, and the brushes) can be additionally or alternatively utilized here. The flume 24200 can be configured with an accumulation section or feature to accommodate mismatched throughput rates of the mechanism to remove rafts from the ponds and of the harvesting machine.

Myceliated Feed

In some examples, myceliated feed can be used. Due to the rapid growth cycles of the crops according to the disclosure, there can be a high turnover of growing media, which can result in a bloated waste stream. The spent grow media traditionally can be converted into compost on site, which would take labor and space to create an end product that may not be ultimately usable onsite, or it can be shipped via a contracted service to an industrial composter. Either way, the spent grow media is converted into a less valuable product—compost.

In some examples, the use of myceliated grain, and other agricultural byproducts, as feed stock for cattle and poultry can increase the health and growth rate of the livestock. The use of the spent growing media according to the disclosure as substrate for mycelial growth can generate the far more valuable product of fish feed, which typically accounts for 50% of the revenue generated from the sale of the fish. By replacing fish feed with myceliated growing media, a system according to the disclosure can improve operating margins by reducing fish feed costs, husband healthier and faster growing fish, and reduce the cost of waste management. An adjacent benefit is the potential to use the $CO_2$ generated by the mycelium to increase the $CO_2$ levels in the plant growing area, which can increase photosynthesis rates and the resultant yield.

The use of spent growing media, comprising of any or all of coconut coir, vermiculite, perlite, peat moss, plant roots and stems, etc., as the growing substrate from mushroom mycelium, can be used to accomplish the following: reduce fish feed costs, improve fish health and growth rates, reduce waste management costs, and generate $CO_2$ for increased plant growth.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at leak one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of" and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A vertically-stacked growing system, comprising:
   a plurality of vertical beams; and
   a plurality of horizontal shelves mechanically coupled to the plurality of vertical beams and respectively arranged on different vertical levels of the growing system, each horizontal shelf of the plurality of horizontal shelves having a length and a width and comprising:
   a plurality of horizontal structural supports coupled to at least some of the plurality of vertical beams;
   decking, coupled to the plurality of horizontal structural supports;
   a plurality of walls to form a shallow pond when each of the horizontal shelves contains a plant nutrient water culture, thereby constituting a growing layer of the growing system, the plurality of walls comprising:

two side walls along the length of each of the horizontal shelves; and two end walls along the width of each of the horizontal shelves, and at least one ramp, disposed proximate to at least one end wall of the two end walls and above the decking, to facilitate loading and/or unloading of a plurality of rafts into and/or out of the shallow pond when each of the horizontal shelves contains the plant nutrient water culture, wherein respective rafts of the plurality of rafts include a plurality of germinated plants, wherein:

at least a first horizontal shelf of the plurality of horizontal shelves further comprises a raft conveyance system to move at least a first raft of the plurality of rafts through a first shallow pond contained in the first horizontal shelf when the first shallow pond and the first raft are present in the growing system;

the raft conveyance system comprises a mechanical pusher to move the first raft through the first shallow pond;

the first horizontal shelf further comprises a catchment area to collect and divert the plant nutrient water culture, when the horizontal shelf contains the plant nutrient water culture;

at least some of the horizontal shelves further comprise a plurality of lights embedded between at least some of the plurality of horizontal structural supports; and the at least one ramp comprises:

a first ramp disposed proximate to a first end wall of the two end walls and above the decking, to facilitate loading respective rafts of the plurality of rafts into the shallow pond when the horizontal shelf contains the plant nutrient water culture, the first ramp comprising a plurality of first underwater rails inside an inner edge of the first end wall to prevent tops of the respective rafts from dipping under the plant nutrient water culture during the loading of the plurality of rafts into the shallow pond, wherein at least some of the plurality of first underwater rails include a first angled portion to facilitate loading of the respective rafts into the shallow pond; and a second ramp disposed proximate to a second end wall of the two end walls and above the decking, to facilitate unloading of the respective rafts out of the shallow pond when the horizontal shelf contains the plant nutrient water culture, the second ramp comprising a plurality of second underwater rails inside an inner edge of the second end wall to prevent the tops of the respective rafts from dipping under the plant nutrient water culture during the unloading of the plurality of rafts out of the shallow pond, wherein at least some of the plurality of second underwater rails include a second angled portion to facilitate unloading of the respective rafts out of the shallow pond.

2. The growing system of claim 1, wherein the side walls of the horizontal shelf are higher than at least one end wall of the two end walls of the horizontal shelf.

3. The growing system of claim 1, wherein at least the first horizontal shelf further comprises:

a plurality of sensors disposed so as to be exposed to the plant nutrient water culture when present in the first horizontal shelf so as to measure a nutrient level in the plant nutrient water culture; and a plurality of actuators to control nutrients added to the plant nutrient water culture via a plurality of nutrient apertures, based at least in part on the measured nutrient level from the plurality of sensors.

4. The growing system of claim 1, wherein the plurality of lights are water-cooled lights, and wherein the system further comprises a heat removal system to couple the water-cooled lights to at least one of:

respective shallow ponds of the at least some of the horizontal shelves; and at least one nutrient culture tank to provide the plant nutrient growth culture, wherein the heat removal system routes heated water, when present, from the water-cooled lights to the at least one of the respective shallow ponds and the at least one nutrient culture tank.

5. The growing system of claim 4, wherein the at least one nutrient culture tank includes at least one fish tank comprising fish.

6. The growing system of claim 1, wherein each horizontal shelf contains the plant nutrient water culture to form the shallow pond constituting the growing layer of the growing system.

7. The growing system of claim 6, wherein a depth of the shallow pond in each growing layer is less than six inches.

8. The growing system of claim 7, wherein the depth of the shallow pond in each growing layer is approximately three inches.

9. The growing system of claim 6, further comprising the plurality of rafts in the shallow pond of at least some of the horizontal shelves of the plurality of horizontal shelves.

10. The growing system of claim 1, wherein a vertical spacing between a first horizontal shelf of the plurality of horizontal shelves and a second horizontal shelf of the plurality of horizontal shelves immediately above the first horizontal shelf is less than or equal to twelve inches.

11. The growing system of claim 1, wherein a vertical spacing between a first horizontal shelf of the plurality of horizontal shelves and a second horizontal shelf of the plurality of horizontal shelves immediately above the first horizontal shelf is less than or equal to eighteen inches.

12. The growing system of claim 1, wherein the width of each horizontal shelf is at least four feet and less than or equal to five feet.

13. The growing system of claim 1, wherein at least the first horizontal shelf of the plurality of horizontal shelves further comprises at least one robotic arm, disposed proximate to at least one end wall of the two end walls and above the decking, to facilitate loading and/or unloading of a plurality of rafts into and/or out of at least the first shallow pond.

14. The growing system of claim 1, further comprising at least one conveyor apparatus including at least one arm to facilitate loading and/or unloading of the plurality of rafts into and/or out of respective shallow ponds on the different vertical levels of the growing system.

15. The growing system of claim 14, wherein the at least one conveyor apparatus facilitates loading of the plurality of rafts into respective first ends of the respective shallow ponds on the different vertical levels of the growing system, and wherein the at least one arm vertically slides up and down the growing system along the respective first ends of the respective shallow ponds.

16. The growing system of claim 15, wherein the at least one conveyor apparatus comprises a reciprocating vertical conveyor.

17. The growing system of claim 15, wherein the at least one conveyor apparatus comprises a non-reciprocating vertical conveyor.

18. The growing system of claim 15, wherein the at least one arm is attached to the growing system.

19. The growing system of claim 15, wherein the at least one arm is tiltable or includes releasable flippers to facilitate sliding of the respective rafts of the plurality of rafts into the respective first ends of the respective shallow ponds on the different vertical levels of the growing system.

20. The growing system of claim 15, wherein the at least one arm includes a plurality of free spinning wheels to facilitate sliding of the respective rafts.

21. The growing system of claim 15, wherein the at least one arm includes a hinge to facilitate storage of the arm.

22. The growing system of claim 14, wherein the at least one conveyor apparatus facilitates unloading of the plurality of rafts from respective second ends of the respective shallow ponds on the different vertical levels of the growing system.

23. The growing system of claim 22, wherein the at least one arm vertically slides up and down the growing system along the respective second ends of the respective shallow ponds.

24. The growing system of claim 22, wherein the at least one conveyor apparatus comprises a reciprocating vertical conveyor.

25. The growing system of claim 22, wherein the at least one conveyor apparatus comprises a non-reciprocating vertical conveyor.

26. The growing system of claim 22, wherein the at least one arm is attached to the growing system.

27. The growing system of claim 22, wherein the at least one arm is tiltable or includes releasable flippers to facilitate sliding of the respective rafts of the plurality of rafts out of the respective second ends of the respective shallow ponds on the different vertical levels of the growing system.

28. The growing system of claim 22, wherein the at least one arm includes a plurality of free spinning wheels to facilitate sliding of the respective rafts.

29. The growing system of claim 22, wherein the at least one arm includes a hinge to facilitate storage of the arm.

30. The growing system of claim 22, further comprising a horizontal flume, wherein the at least one conveyor apparatus facilitates transfer of the plurality of rafts from the respective second ends of the respective shallow ponds on the different vertical level of the growing system to the horizontal flume.

31. The growing system of claim 1, further comprising:
at least one rail proximate to and/or above at least some adjacent horizontal shelves of the plurality of horizontal shelves; and
at least one sensor assembly coupled to the at least one rail so as to move along the at least one rail throughout multiple horizontal shelves of the at least some adjacent horizontal shelves.

32. The growing system of claim 31, wherein the at least one sensor assembly comprises at least one of:
at least one thermal imaging sensor;
at least one fluorescent imaging sensor;
at least one hyperspectral sensor;
at least one multispectral sensor;
at least one RGB sensor;
at least one Light Detection and Ranging (LIDAR) sensor;
at least one distance sensor;
at least one air chemistry sensor to measure at least one of temperature, humidity, and carbon dioxide ($CO_2$);
at least one location sensor;
at least one light sensor; and
at least one communication device.

33. The growing system of claim 1, further comprising:
a mechanical ventilation system comprising a plurality of fans or duct openings disposed along the length of each horizontal shelf.

34. The growing system of claim 33, wherein:
one end wall of the two end walls of the first horizontal shelf constitutes a weir for the first shallow pond.

35. The growing system of claim 1, wherein:
one end wall of the two end walls of the first horizontal shelf constitutes a weir for the first shallow pond.

36. A vertically-stacked growing system, comprising:
a plurality of vertical beams;
a plurality of horizontal shelves mechanically coupled to the plurality of vertical beams and respectively arranged on different vertical levels of the growing system, each horizontal shelf of the plurality of horizontal shelves having a length and a width and comprising:
a plurality of horizontal structural supports coupled to at least some of the plurality of vertical beams;
decking, coupled to the plurality of horizontal structural supports;
a plurality of walls to form a shallow pond when the horizontal shelf contains a plant nutrient water culture, thereby constituting a growing layer of the growing system, the plurality of walls comprising:
two side walls along the length of the horizontal shelf; and
two end walls along the width of the horizontal shelf, and
at least one ramp, disposed proximate to at least one end wall of the two end walls and above the decking, to facilitate loading and/or unloading of a plurality of rafts into and/or out of the shallow pond when the horizontal shelf contains the plant nutrient water culture, wherein respective rafts of the plurality of rafts include a plurality of germinated plants; and
a mechanical ventilation system comprising a plurality of fans or duct openings disposed along the length of each horizontal shelf,
wherein:
at least a first horizontal shelf of the plurality of horizontal shelves further comprises a raft conveyance system to move at least a first raft of the plurality of rafts through a first shallow pond contained in the first horizontal shelf when the first shallow pond and the first raft are present in the growing system;
the raft conveyance system comprises a mechanical pusher to move the first raft through the first shallow pond;
one end wall of the two end walls of the first horizontal shelf constitutes a weir for the first shallow pond;
the first horizontal shelf further comprises a catchment area proximate to the weir to collect and divert the plant nutrient water culture, when present, flowing freely over a top of the weir; and
at least some of the horizontal shelves further comprise a plurality of lights embedded between at least some of the plurality of horizontal structural supports,
wherein the at least one ramp comprises:
a first ramp disposed proximate to a first end wall of the two end walls and above the decking, the first ramp comprising a plurality of first underwater rails inside an inner edge of the first end wall, wherein at least some of the plurality of first underwater rails include a first angled portion.

37. The growing system of claim 36, wherein the side walls of the horizontal shelf are higher than at least one end wall of the two end walls of the horizontal shelf.

38. The growing system of claim 36, wherein the at least one ramp comprises:
a second ramp disposed proximate to a second end wall of the two end walls and above the decking, the second ramp comprising a plurality of second underwater rails inside an inner edge of the second end wall, wherein at least some of the plurality of second underwater rails include a second angled portion.

39. The growing system of claim 38, wherein the side walls of the horizontal shelf are higher than at least one end wall of the two end walls of the horizontal shelf.

40. The growing system of claim 36, wherein at least the first horizontal shelf further comprises:
a plurality of sensors disposed so as to be exposed to the plant nutrient water culture when present in the first horizontal shelf so as to measure a nutrient level in the plant nutrient water culture; and
a plurality of actuators to control nutrients added to the plant nutrient water culture via a plurality of nutrient apertures, based at least in part on the measured nutrient level from the plurality of sensors.

41. The growing system of claim 36, wherein the plurality of lights are water-cooled lights, and wherein the system further comprises a heat removal system to couple the water-cooled lights to at least one of:
respective shallow ponds of the at least some of the horizontal shelves; and
at least one nutrient culture tank to provide the plant nutrient growth culture,
wherein the heat removal system routes heated water, when present, from the water-cooled lights to the at least one of the respective shallow ponds and the at least one nutrient culture tank.

42. The growing system of claim 41, wherein the at least one nutrient culture tank includes at least one fish tank comprising fish.

43. The growing system of claim 36, wherein each horizontal shelf contains the plant nutrient water culture to form the shallow pond constituting the growing layer of the growing system.

44. The growing system of claim 43, wherein a depth of the shallow pond in each growing layer is less than six inches.

45. The growing system of claim 44, wherein the depth of the shallow pond in each growing layer is approximately three inches.

46. The growing system of claim 43, further comprising the plurality of rafts in the shallow pond of at least some of the horizontal shelves of the plurality of horizontal shelves.

47. The growing system of claim 36, wherein a vertical spacing between a first horizontal shelf of the plurality of horizontal shelves and a second horizontal shelf of the plurality of horizontal shelves immediately above the first horizontal shelf is less than or equal to twelve inches.

48. The growing system of claim 36, wherein a vertical spacing between a first horizontal shelf of the plurality of horizontal shelves and a second horizontal shelf of the plurality of horizontal shelves immediately above the first horizontal shelf is less than or equal to eighteen inches.

49. The growing system of claim 36, wherein the width of each horizontal shelf is at least four feet and less than or equal to five feet.

50. The growing system of claim 36, wherein at least the first horizontal shelf of the plurality of horizontal shelves further comprises at least one robotic arm, disposed proximate to at least one end wall of the two end walls and above the decking, to facilitate loading and/or unloading of a plurality of rafts into and/or out of at least the first shallow pond.

51. The growing system of claim 36, further comprising at least one conveyor apparatus including at least one arm to facilitate loading and/or unloading of the plurality of rafts into and/or out of respective shallow ponds on the different vertical levels of the growing system.

52. The growing system of claim 51, wherein the at least one conveyor apparatus facilitates loading of the plurality of rafts into respective first ends of the respective shallow ponds on the different vertical levels of the growing system, and wherein the at least one arm vertically slides up and down the growing system along the respective first ends of the respective shallow ponds.

53. The growing system of claim 52, wherein the at least one conveyor apparatus comprises a reciprocating vertical conveyor.

54. The growing system of claim 52, wherein the at least one conveyor apparatus comprises a non-reciprocating vertical conveyor.

55. The growing system of claim 52, wherein the at least one arm is attached to the growing system.

56. The growing system of claim 52, wherein the at least one arm is tiltable or includes releasable flippers to facilitate sliding of the respective rafts of the plurality of rafts into the respective first ends of the respective shallow ponds on the different vertical levels of the growing system.

57. The growing system of claim 52, wherein the at least one arm includes a plurality of free spinning wheels to facilitate sliding of the respective rafts.

58. The growing system of claim 52, wherein the at least one arm includes a hinge to facilitate storage of the arm.

59. The growing system of claim 51, wherein the at least one conveyor apparatus facilitates unloading of the plurality of rafts from respective second ends of the respective shallow ponds on the different vertical levels of the growing system.

60. The growing system of claim 59, wherein the at least one arm vertically slides up and down the growing system along the respective second ends of the respective shallow ponds.

61. The growing system of claim 59, wherein the at least one conveyor apparatus comprises a reciprocating vertical conveyor.

62. The growing system of claim 59, wherein the at least one conveyor apparatus comprises a non-reciprocating vertical conveyor.

63. The growing system of claim 59, wherein the at least one arm is attached to the growing system.

64. The growing system of claim 59, wherein the at least one arm is tiltable or includes releasable flippers to facilitate sliding of the respective rafts of the plurality of rafts out of the respective second ends of the respective shallow ponds on the different vertical levels of the growing system.

65. The growing system of claim 59, wherein the at least one arm includes a plurality of free spinning wheels to facilitate sliding of the respective rafts.

66. The growing system of claim 59, wherein the at least one arm includes a hinge to facilitate storage of the arm.

67. The growing system of claim 59, further comprising a horizontal flume, wherein the at least one conveyor apparatus facilitates transfer of the plurality of rafts from the respective second ends of the respective shallow ponds on the different vertical level of the growing system to the horizontal flume.

68. The growing system of claim 36, further comprising:
at least one rail proximate to and/or above at least some adjacent horizontal shelves of the plurality of horizontal shelves; and
at least one sensor assembly coupled to the at least one rail so as to move along the at least one rail throughout multiple horizontal shelves of the at least some adjacent horizontal shelves.

69. The growing system of claim 68, wherein the at least one sensor assembly comprises at least one of:
at least one thermal imaging sensor;
at least one fluorescent imaging sensor;
at least one hyperspectral sensor;
at least one multispectral sensor;
at least one RGB sensor;
at least one Light Detection and Ranging (LIDAR) sensor;
at least one distance sensor;
at least one air chemistry sensor to measure at least one of temperature, humidity, and carbon dioxide ($CO_2$);
at least one location sensor;
at least one light sensor; and
at least one communication device.

70. A method for handling the plurality of rafts of germinated plants in the vertically-stacked growing system of claim 9, the method comprising:
A) loading and/or unloading the plurality of rafts into and/or out of at least the first shallow pond, via the at least one ramp, from the two end walls of the first shallow pond and not the two side walls of the first shallow pond; and
B) moving at least a first raft of the plurality of rafts through at least the first shallow pond of the plurality of shallow ponds, where B) comprises using the mechanical pusher to move at least the first raft through the first elongated shallow pond,
wherein A) comprises:
A1) loading respective rafts of the plurality of rafts into the first elongated shallow pond via the first ramp; and
A2) unloading the respective rafts out of the first shallow pond via the second ramp.

71. The method of claim 70, wherein:
A2) comprises unloading the respective rafts out of the first shallow pond via the second ramp, wherein the respective rafts move up the second ramp and over the second end wall.

72. The method of claim 70, wherein the plurality of lights further comprises a plurality of water-cooled lights, and wherein the method further comprises:
routing heated water, when present, from the plurality of water-cooled lights to at least one of at least one nutrient culture tank or fish tank that provides the plant nutrient water culture, and respective shallow ponds of the plurality of horizontal shelves.

73. The method of claim 70, where A) comprises:
sliding the respective rafts of the plurality of rafts into the first shallow pond via the plurality of first underwater rails.

74. The method of claim 73, wherein each of the plurality of first underwater rails includes the angled portion to facilitate the sliding of the respective rafts into and/or out of the first elongated shallow pond.

75. The method of claim 70, further comprising:
vertically conveying respective rafts of the plurality of rafts between at least the first shallow pond and a ground level via at least one conveyor apparatus including a plurality of arms to facilitate loading and/or unloading of the respective rafts into and/or out of the first shallow pond.

76. The method of claim 70, further comprising:
C) adding the plant nutrient water culture to at least the first shallow pond via one or more nutrient apertures in at least the first shallow pond, wherein C) comprises:
C1) measuring a nutrient level in the plant nutrient water culture in at least the first shallow pond via a plurality of sensors disposed so as to be exposed to the plant nutrient water culture; and
C2) controlling nutrients added to the plant nutrient water culture in at least the first shallow pond by the one or more nutrient apertures via one or more actuators, based at least in part on C1).

77. A method for handling a plurality of rafts of germinated plants in a vertically-stacked growing system, the vertically-stacked growing system including a plurality of elongated shallow ponds of plant nutrient water culture respectively arranged on different vertical levels of the vertically-stacked growing system, wherein at least a first elongated shallow pond of the plurality of elongated shallow ponds has a length and a width smaller than the length and comprises:
two side walls along the length of the elongated shallow pond;
two end walls along the width of the elongated shallow pond, and
at least one ramp, disposed proximate to at least one end wall of the two end walls, to facilitate loading and/or unloading of the plurality of rafts into and/or out of the elongated shallow pond,
the method comprising:
A) loading and/or unloading the plurality of rafts into and/or out of at least the first elongated shallow pond, via the at least one ramp, from the two end walls of the first elongated shallow pond and not the two side walls of the first elongated shallow pond;
B) moving at least a first raft of the plurality of rafts through at least the first elongated shallow pond of the plurality of elongated shallow ponds, wherein B) comprises using a mechanical pusher to move at least the first raft through the first elongated shallow pond; and
C) ventilating the germinated plants in the respective rafts of the plurality of rafts in at least the first elongated shallow pond via a plurality of fans or duct openings disposed along the length of the first elongated shallow pond,
wherein:
the at least one ramp includes a first ramp disposed proximate to a first end wall of the two end walls of the first elongated shallow pond;
a second end wall of the two end walls includes a catchment area constituting a weir for the first elongated shallow pond, wherein the plant nutrient water culture flows freely over a top of the weir and into the catchment area; and
A) comprises:
A1) loading respective rafts of the plurality of rafts into the first elongated shallow pond via the first ramp; and
A2) unloading the respective rafts out of the first elongated shallow pond via the weir, wherein:
the at least one ramp includes a plurality of first underwater rails inside an inner edge of the at least one end wall of the two end walls;
A) comprises sliding the respective rafts of the plurality of rafts into and/or out of the first elongated shallow pond via the plurality of first underwater rails, and
at least some of the plurality of first underwater rails include an angled portion.

78. The method of claim 77, wherein:
the at least one ramp includes a second ramp disposed proximate to the second end wall of the two end walls of the first elongated shallow pond; and
A2) comprises unloading the respective rafts out of the first elongated shallow pond via the second ramp, wherein the respective rafts move up the second ramp and over the weir.

79. The method of claim 77, wherein at least the first elongated shallow pond further comprises a plurality of water-cooled lights, and wherein the method further comprises:
D) routing heated water, when present, from the plurality of water-cooled lights to at least one of at least one nutrient culture tank or fish tank that provides the plant nutrient water culture, and respective elongated shallow ponds of the plurality of elongated shallow ponds.

80. The method of claim 77, further comprising:
E) vertically conveying respective rafts of the plurality of rafts between at least the first elongated shallow pond and a ground level via at least one conveyor apparatus including a plurality of arms to facilitate loading and/or unloading of the respective rafts into and/or out of the first elongated shallow pond.

81. The method of claim 77, further comprising:
F) adding the plant nutrient water culture to at least the first elongated shallow pond via one or more nutrient apertures in at least the first elongated shallow pond, wherein F) comprises:
F1) measuring a nutrient level in the plant nutrient water culture in at least the first elongated shallow pond via a plurality of sensors disposed so as to be exposed to the plant nutrient water culture; and
F2) controlling nutrients added to the plant nutrient water culture in at least the first elongated shallow pond by the one or more nutrient apertures via one or more actuators, based at least in part on F1).

* * * * *